United States Patent
Fujikawa

(10) Patent No.: US 12,259,607 B2
(45) Date of Patent: Mar. 25, 2025

(54) LIQUID CRYSTAL APPARATUS AND ELECTRONIC DEVICE

(71) Applicant: SEIKO EPSON CORPORATION, Tokyo (JP)

(72) Inventor: Shinsuke Fujikawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/620,975

(22) Filed: Mar. 28, 2024

(65) Prior Publication Data

US 2024/0329440 A1    Oct. 3, 2024

(30) Foreign Application Priority Data

Mar. 30, 2023   (JP) .................. 2023-054899

(51) Int. Cl.
  *G02F 1/13*    (2006.01)
  *G02F 1/1343*  (2006.01)

(52) U.S. Cl.
  CPC ...... *G02F 1/1309* (2013.01); *G02F 1/134309* (2013.01)

(58) Field of Classification Search
  CPC ............ G02F 1/1309; G02F 1/134309; G09G 2310/0289; G09G 2300/043; G09G 2320/0233; H10K 59/131
  See application file for complete search history.

(56) References Cited

U.S. PATENT DOCUMENTS

| | | | |
|---|---|---|---|
| 2009/0267614 A1 | 10/2009 | Inoue et al. | |
| 2010/0073341 A1* | 3/2010 | Toyooka | G09G 3/3614 345/55 |
| 2011/0065349 A1 | 3/2011 | Lee et al. | |
| 2015/0049071 A1 | 2/2015 | Kaneko | |
| 2021/0293866 A1* | 9/2021 | Sugawa | G01R 31/2812 |
| 2021/0325702 A1 | 10/2021 | Tomikawa et al. | |
| 2021/0343243 A1* | 11/2021 | Takahashi | G09G 3/3258 |
| 2022/0189428 A1* | 6/2022 | Kitagawa | G09G 3/3674 |

FOREIGN PATENT DOCUMENTS

| | | |
|---|---|---|
| JP | H04215048 | 8/1992 |
| JP | H09243979 | 9/1997 |
| JP | 3281763 | 5/2002 |
| JP | 2010152061 | 7/2010 |
| JP | 2010156916 | 7/2010 |
| JP | 2011059660 | 3/2011 |
| JP | 2021170079 | 10/2021 |
| WO | 2008090786 | 7/2008 |
| WO | 2013154039 | 10/2013 |

* cited by examiner

*Primary Examiner* — Jonathan Y Jung

(74) *Attorney, Agent, or Firm* — JCIPRNET

(57) ABSTRACT

A liquid crystal apparatus includes a first electrode, a liquid crystal layer, a second electrode, and a measurement circuit, and the measurement circuit supplies a first potential to the first electrode and supplies a second potential higher than the first potential to the second electrode in a first period, supplies the first potential to the first electrode, and supplies a third potential higher than the first potential and lower than the second potential to the second electrode in a second period, supplies a fourth potential higher than the third potential and lower than the second potential to the first electrode and supplies a third potential to the second electrode in a third period, and stops the supply of the potential to the first electrode and supplies the third potential to the second electrode in a fourth period.

15 Claims, 13 Drawing Sheets

LIQUID CRYSTAL APPARATUS AND ELECTRONIC DEVICE

The present application is based on, and claims priority from JP Application Serial Number 2023-054899, filed Mar. 30, 2023, the disclosure of which is hereby incorporated by reference herein in its entirety.

BACKGROUND

1. Technical Field

The present disclosure relates to a liquid crystal apparatus and an electronic device.

2. Related Art

Liquid crystal used in a liquid crystal apparatus deteriorates due to long-term application of a DC voltage component. Further, when the liquid crystal apparatus is used as a light valve of a projector, the liquid crystal also deteriorates due to a chemical action caused by incidence of high-intensity light and heat. The deterioration of the liquid crystal is, for example, a phenomenon in which the number of mobile ions including anions and cations increase in the liquid crystal and thus insulation of the liquid crystal decreases. The decrease in insulation appears, for example, as a decrease in voltage holding rate of the liquid crystal and is visually recognized as a display defect such as stains or unevenness in a liquid crystal panel. JP-A-4-215048 discloses a method of accelerating and evaluating such a deterioration phenomenon in liquid crystal. In this method, a pair of electrodes for deterioration evaluation are provided outside a display region of the liquid crystal panel to perform an accelerated test on the liquid crystal panel for 100 hours, a voltage of 5 V is applied between the electrodes for deterioration evaluation for 50 μs, and then, a voltage holding rate after 16.7 ms is measured for evaluation of deterioration of the liquid crystal.

According to the present applicant's research, it has been found that, for example, when an acceleration test with incidence of high-intensity light is performed using a liquid crystal panel, there are a stage in which the number of mobile ions in liquid crystal increases relatively moderately and a stage in which the number of mobile ions in the liquid crystal increases rapidly thereafter. Further, when, for example, UV light other than visible light is incident on the liquid crystal panel, a chemical action is intensified due to high energy of the UV light, and deterioration of the liquid crystal progresses rapidly.

When the number of mobile ions in the liquid crystal becomes larger, occurrence of a problem such as deterioration of display quality of the liquid crystal panel cannot be avoided, and thus from the viewpoint of preventive maintenance, there has been a demand for ascertaining that the liquid crystal panel is reaching an end of its life before the liquid crystal panel reaches the end of the life.

However, the method disclosed in JP-A-4-215048 has a problem that it is difficult to perform preventive maintenance. Specifically, according to the present applicant's verification results, in the method disclosed in JP-A-4-215048, it is difficult to observe a situation in which the number of mobile ions in the liquid crystal gradually increases at a stage in which the number of mobile ions increase relatively moderately.

SUMMARY

A liquid crystal apparatus according to an aspect of the present disclosure including: a first electrode; a liquid crystal layer; a second electrode facing the first electrode via the liquid crystal layer, and a measurement circuit configured to supply a potential to each of the first electrode and the second electrode and measure a potential of the first electrode, wherein the measurement circuit supplies a first potential to the first electrode, and supplies a second potential higher than the first potential to the second electrode in a first period, supplies the first potential to the first electrode and supplies a third potential higher than the first potential and lower than the second potential to the second electrode in a second period after the first period, supplies a fourth potential higher than the third potential and lower than the second potential to the first electrode and supplies the third potential to the second electrode in a third period after the second period, and stops supply of the potential to the first electrode and supplies the third potential to the second electrode in a fourth period after the third period.

An electronic device according to an aspect of the present disclosure includes the liquid crystal apparatus according to the aspect.

DESCRIPTION OF EMBODIMENTS

Hereinafter, embodiments of the present disclosure are described with reference to the drawings. Here, in each drawing to be described below, sizes of respective members may be different from the actual sizes in order to make each member a recognizable size. Further, in each drawing below, when necessary, XYZ axes are used as coordinate axes orthogonal to each other, and in each drawing, a direction indicated by each arrow along the axis is set as a +direction, and a direction opposite to the +direction is set as a −direction.

Also, a +X direction may be referred to as rightward or a right side, and a −X direction may be referred to as leftward or a left side. A +Z direction may also be referred to as upward and a −Z direction may also be referred to as downward, and viewing in the +Z direction is referred to as a plan view or planar. Further, in the following description, for example, for a substrate, the description of "on a substrate" indicates any one of a case of being disposed in contact with the substrate, a case of being disposed over the substrate via another structure, and a case of being partially disposed in contact with the substrate and partially disposed via another structure.

1. First Embodiment

1.1. Outline of Configuration of Liquid Crystal Panel 100

Figure 1:
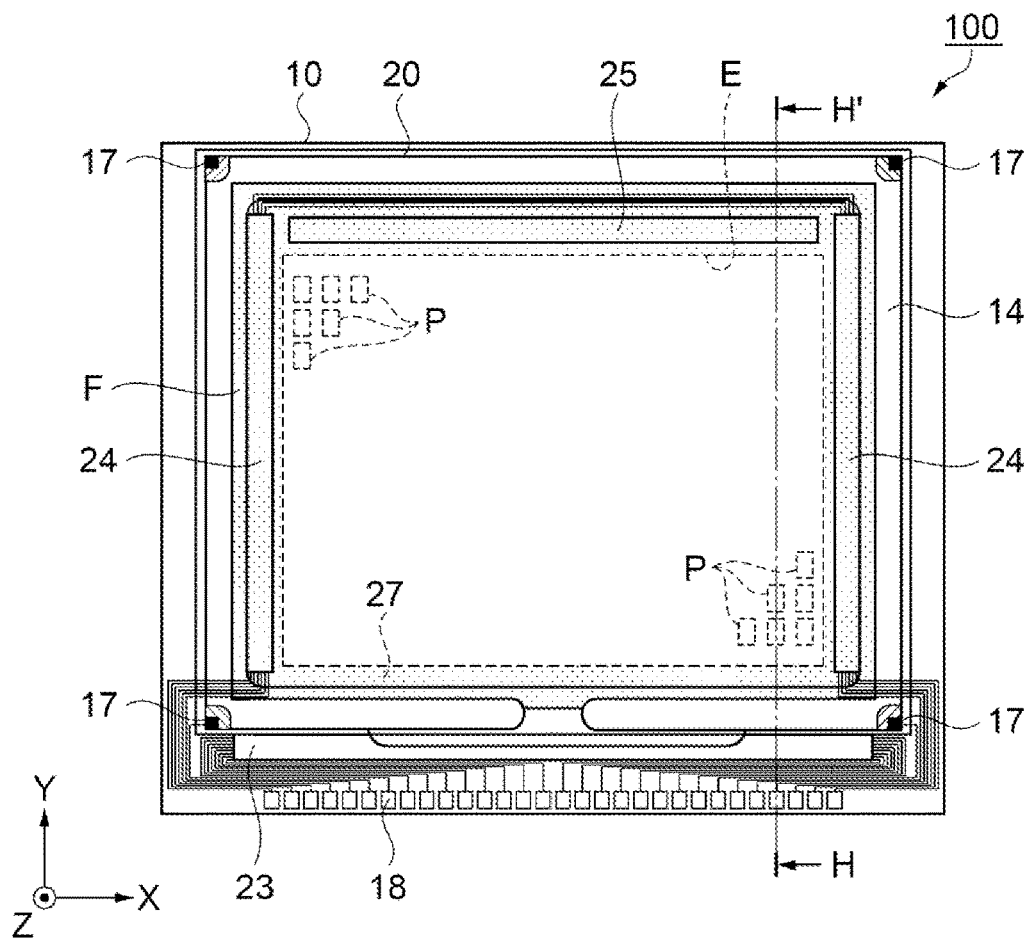
FIG. 1 is a plan view illustrating a schematic configuration of a liquid crystal panel used in a liquid crystal apparatus according to a first embodiment.

FIG. 1 is a plan view illustrating a schematic configuration of a liquid crystal panel 100 used in a liquid crystal apparatus 1000 of a first embodiment. In addition, for example, the liquid crystal panel 100 according to this embodiment is an active drive liquid crystal panel provided with a thin film transistor (TFT) 11 as a pixel switching element for each pixel P. The liquid crystal panel 100 constitutes the liquid crystal apparatus 1000 in combination with a measurement circuit 200 which will be described below, and can be appropriately used as a light modulation apparatus in a projection-type display apparatus serving as an electronic device, or the like.

The liquid crystal panel 100 includes an element substrate 10 and a counter substrate 20. All of the components indicated by solid lines on the inner side of an outline of the facing substrate 20 are components disposed between the facing substrate 20 and the element substrate 10.

A seal material 14 is provided in a frame shape along an outer edge of the counter substrate 20. A parting portion 27 indicated by dots is formed of a light shielding film, and is disposed on the inner side the sealing material 14 to surround the display region E along an outer edge of the display region E. The seal material 14 is an adhesive made of photocurable resin, thermosetting resin, or the like, and contains a gap material such as glass fibers or glass beads for setting a gap between the element substrate 10 and the counter substrate 20 to a predetermined size.

In the display region E, pixels P are disposed in a matrix shape. Peripheral circuits such as a scanning line driving circuit 24 and a precharge circuit 25 are disposed in a peripheral region F between the display region E and the sealing material 14. Further, a data line driving circuit 23 and a plurality of external coupling terminals 18 are disposed in a portion of the element substrate 10 outside the sealing material 14, which protrudes from the facing substrate 20 to the lower side in the drawing, that is, in a −Y direction.

Inter-substrate conduction portions 17 are disposed to establish electrical conduction between the element substrate 10 and the facing substrate 20 in correspondence to four corners of the facing substrate 20.

Figure 2:
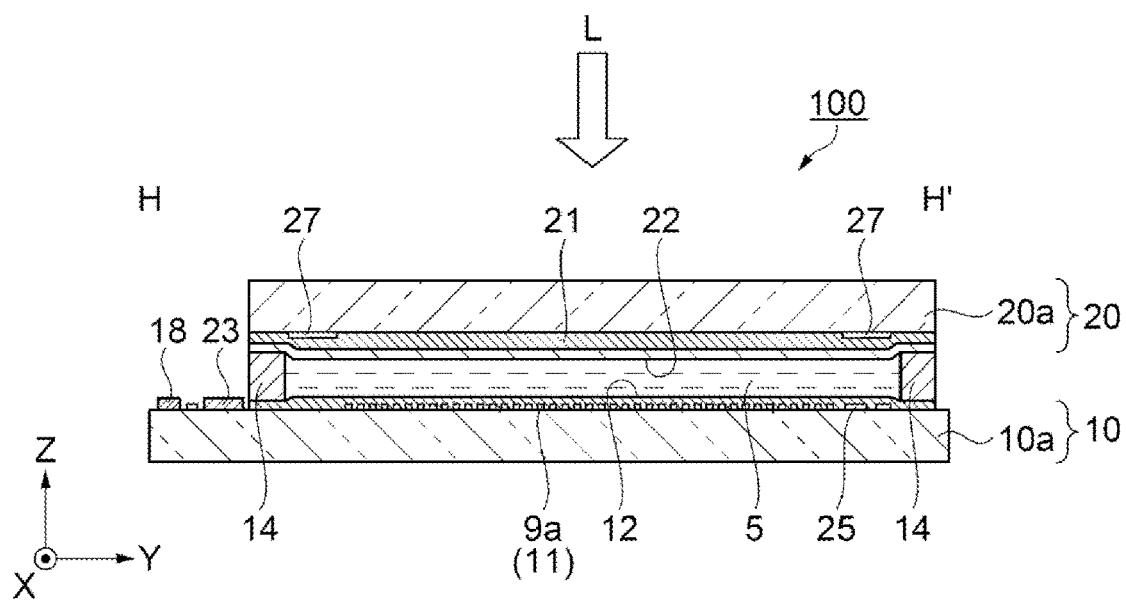
FIG. 2 is a cross-sectional view taken along line H-H' of FIG. 1.

FIG. 2 is a cross-sectional view showing a schematic configuration of the liquid crystal panel 100 taken along line H-H' in FIG. 1. The element substrate 10 and the counter substrate 20 are disposed via the sealing material 14, and a liquid crystal layer 5 is disposed between the element substrate 10 and the counter substrate 20.

The element substrate 10 includes, between a substrate 10a thereof and the liquid crystal layer 5, a pixel electrode 9a having optical transparency provided for each pixel P, a TFT 11 as a pixel switching element disposed to correspond to the pixel electrode 9a, and a first alignment film 12 disposed to cover the pixel electrode 9a.

The facing substrate 20 includes the parting portion 27, a common electrode 21, and a second alignment film 22 disposed to cover the common electrode 21 between a substrate 20a thereof and the liquid crystal layer 5.

The parting portion 27 is provided at a position overlapping with the scanning line driving circuit 24 in plan view. The parting portion 27 serves to block light L from a laser light source (not illustrated) incident from the facing substrate 20 side so that the light L is not incident on peripheral circuits including the scanning line driving circuit 24, thereby preventing malfunction of the peripheral circuits due to the light L.

The pixel electrodes 9a and the common electrode 21 are made of a transparent conductive material such as indium tin oxide (ITO), for example. Each of the substrate 10a and the substrate 20a is a light-transmissive substrate, and for example, a glass substrate or a quartz substrate is used. The first alignment film 12 and the second alignment film 22 are made of an inorganic material such as silicon oxide. The liquid crystal layer 5 is configured of, for example, liquid crystal having negative dielectric anisotropy.

1.2. Outline of Configuration of Liquid Crystal Device 1000

Figure 3:
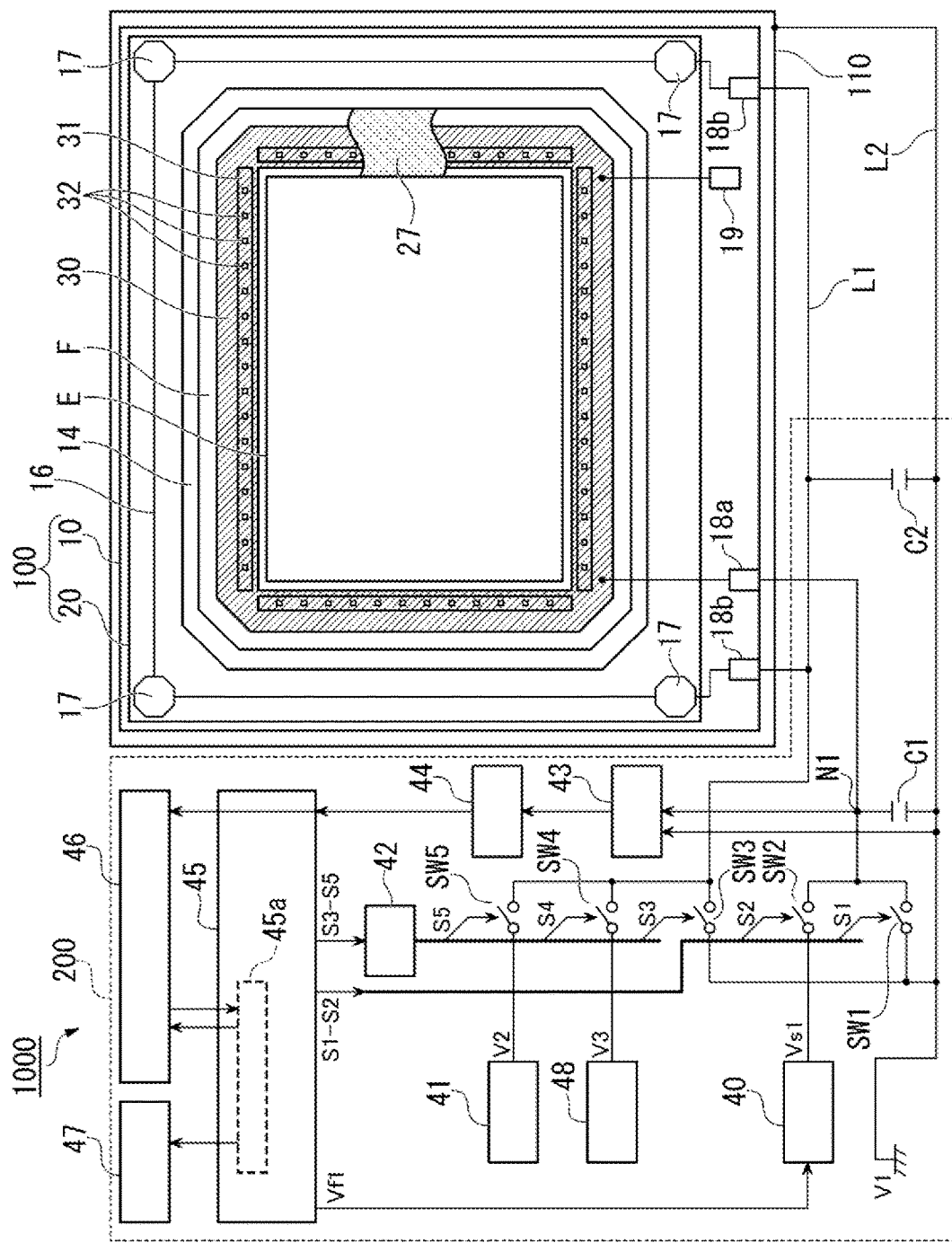
FIG. 3 is an illustrative diagram illustrating a schematic configuration of the liquid crystal apparatus of the first embodiment.

FIG. 3 is an illustrative diagram illustrating a schematic configuration of the liquid crystal apparatus 1000. The liquid crystal device 1000 includes the liquid crystal panel 100 and the measurement circuit 200. Although not illustrated in FIGS. 1 and 2, the liquid crystal panel 100 includes a detection electrode 30 disposed in the peripheral region F between the sealing material 14 and the display region E. The detection electrode 30 is one of electrodes provided on the element substrate 10 and is made of a transparent conductive material such as ITO, for example, like the pixel electrodes 9a. The detection electrode 30 is disposed immediately below the parting portion 27 to surround the display region E, for example. Only a part of the parting portion 27 is illustrated for description. Further, the sealing material 14 is simply illustrated as a form in which the sealing material 14 is applied in a substantially frame shape.

The detection electrode 30 may be formed in a so-called solid film pattern or may be formed by coupling a plurality of pixel electrodes 9a. When the detection electrode 30 is formed of an ITO film, a lower wiring layer 31 mainly formed of aluminum disposed under the ITO film may be added as an auxiliary wiring in order to improve a potential response of the detection electrode 30. The detection electrode 30 is electrically coupled to the lower wiring layer 31 via a plurality of contact holes 32.

The detection electrode 30 is electrically coupled to a first electrode coupling terminal 18a, which is one of a plurality of external coupling terminals 18. The detection electrode 30 is electrically coupled to the measurement circuit 200 via the first electrode coupling terminal 18a. Further, the detection electrode 30 is electrically coupled to a conduction inspection terminal 19. The conduction inspection terminal 19 is disposed in a region between the external coupling terminal 18 and the facing substrate 20 on a surface of the element substrate 10. The electrical coupling between the first electrode coupling terminals 18a and the detection electrode 30 can be inspected by measuring an electrical resistance between the first electrode coupling terminals 18a and the conduction inspection terminals 19.

The inter-substrate conduction portions 17 are disposed in correspondence to the four corners of the facing substrate 20, and are electrically coupled to each other via the common potential line 16. The common potential line 16 is electrically coupled to, for example, second electrode coupling terminals 18b located at the left end and the right end among the plurality of external coupling terminals 18. That is, the common electrode 21 of the counter substrate 20 is electrically coupled to the second electrode coupling terminals 18b via the common potential line 16 and the inter-substrate conducting portions 17. The common electrode 21 is electrically coupled to the measurement circuit 200 via the second electrode coupling terminals 18b.

As understood from the configuration described above, the liquid crystal layer 5 is disposed between the detection electrode 30 and the common electrode 21 in the peripheral region F of the liquid crystal panel 100. The common electrode 21 faces the detection electrode 30 via the liquid crystal layer 5. The liquid crystal panel 100 includes the pixel electrode 9a provided in the display region E, and the detection electrode 30 is provided outside the display region E. In the present embodiment, the detection electrode 30 corresponds to the first electrode, and the common electrode 21 corresponds to the second electrode.

The measurement circuit 200 supplies a potential to each of the detection electrode 30 and the common electrode 21, and measures the potential of the detection electrode 30 as a detection electrode potential Vd. The measurement circuit 200 includes a first feeder circuit 40, a second feeder circuit 41, a third feeder circuit 48, a level shifter 42, an amplification circuit 43, an A/D converter 44, a central control circuit 45, a measured value storage circuit 46, a display information generation circuit 47, a first switch SW1, a second switch SW2, a third switch SW3, a fourth switch SW4, a fifth switch SW5, a first capacitor C1, a second capacitor C2, a common electrode line L1, a first potential line L2, and a first node N1.

The common electrode line L1 is electrically coupled to the second electrode coupling terminals 18b of the liquid crystal panel 100. That is, the common electrode line L1 is electrically coupled to the common electrode 21 via the second electrode coupling terminals 18b. In the present embodiment, the common electrode line L1 corresponds to a second electrode line.

The first potential line L2 is a wiring to which a first potential V1 is applied. As an example, the first potential V1 is a ground potential, that is, 0 V. The first potential line L2 is electrically coupled to a ground of a digital circuit system in the liquid crystal apparatus 1000 at one point. With such a configuration, it is possible to achieve an effect of curbing of measurement noise caused by the digital circuit system at the time of measurement which will be described below. The first potential line L2 is electrically coupled to the common electrode line L1 via the second capacitor C2. That is, the second capacitor C2 is electrically coupled between the common electrode line L1 and the first potential line L2. For example, the second capacitor C2 has a capacitance value of 0.1 µF or more. The potential of the common electrode 21 is stabilized by the second capacitor C2. Accordingly, at the time of measurement, which will be described later, measurement noise received by the detection electrode 30 having a coupling capacitance mainly due to the liquid crystal layer 5 between the detection electrode 30 and the common electrode 21 is inhibited. Further, in the liquid crystal apparatus 1000, the liquid crystal panel 100 is held by a holder 110 made of a conductor, and the first potential line L2 is electrically coupled to the holder 110. When the first potential line L2 is electrically coupled to the holder 110, an effect of curbing the measurement noise received by the detection electrode 30 at the time of measurement, which will be described later, is achieved.

The first node N1 in the measurement circuit 200 is electrically coupled to the first electrode coupling terminal 18a of the liquid crystal panel 100. That is, the first node N1 is electrically coupled to the detection electrode 30 via the first electrode coupling terminal 18a. The first node N1 is electrically coupled to the first potential line L2 via the first switch SW1. The first node N1 is electrically coupled to an output terminal of the first feeder circuit 40 via the second switch SW2. The first node N1 is electrically coupled to the first potential line L2 via the first capacitor C1. That is, the first capacitor C1 is electrically coupled between the first node N1 and the first potential line L2. For example, the first capacitor C1 has a capacitance value of about 1 nF to 10 nF. The first capacitor C1 inhibits the measurement noise received by the detection electrode 30 at the time of measurement, which will be described later. In addition, detection sensitivity to an increase in mobile ions can be adjusted by the capacitance value of the first capacitor C1.

A state of the first switch SW1 is controlled by a first control signal S1 output from the central control circuit 45. For example, as the first control signal S1, a logic signal having an amplitude of 5 V is output from the central control circuit 45, and the first switch SW1 comes to an ON state at a logic "H". A state of the second switch SW2 is controlled by a second control signal S2 output from the central control circuit 45. For example, as the second control signal S2, the logic signal having an amplitude of 5 V is output from the central control circuit 45, and the second switch SW2 comes to an ON state at the logic "H". That is, the first switch SW1 and the second switch SW2 are controlled so that the first switch SW1 and the second switch SW2 come to an ON state by the first voltage (5 V).

The common electrode line L1 is electrically coupled to the first potential line L2 via the third switch SW3. The common electrode line L1 is electrically coupled to the output terminal of the third feeder circuit 48 via the fourth switch SW4. The common electrode line L1 is electrically coupled to the output terminal of the second feeder circuit 41 via the fifth switch SW5.

A state of the third switch SW3 is controlled by the third control signal S3 output from the central control circuit 45 via the level shifter 42. For example, the logic signal having an amplitude of 5 V is output from the central control circuit 45 as the third control signal S3, but this logic signal is converted into, for example, the logic signal having an amplitude of 15 V by the level shifter 42. That is, the third control signal S3 having an amplitude of 15 V is output from the level shifter 42, and the third switch SW3 comes to an ON state at the logic "H".

A state of the fourth switch SW4 is controlled by a fourth control signal S4 output from the central control circuit 45 via the level shifter 42. For example, as the fourth control signal S4, the logic signal having an amplitude of 5 V is output from the central control circuit 45, but this logic signal is converted into, for example, the logic signal having an amplitude of 15 V by the level shifter 42. That is, the fourth control signal S4 having an amplitude of 15 V is output from the level shifter 42, and the fourth switch SW4 comes to an ON state at the logic "H".

A state of the fifth switch SW5 is controlled by the fifth control signal S5 output from the central control circuit 45 via the level shifter 42. For example, as the fifth control signal S5, the logic signal having an amplitude of 5 V is output from the central control circuit 45, but this logic signal is converted into the logic signal having an amplitude of 15 V by the level shifter 42. That is, the fifth control signal S5 having an amplitude of 15 V is output from the level shifter 42, and the fifth switch SW5 comes to an ON state at the logic "H".

As described above, the third switch SW3, the fourth switch SW4, and the fifth switch SW5 are controlled so that the third switch SW3, the fourth switch SW4, and the fifth switch SW5 come to the ON state by a second voltage (15 V) higher than the first voltage (5 V).

The first feeder circuit 40 outputs a first measurement potential Vs1 corresponding to the first reference voltage Vf1 output from the central control circuit 45. For example, the first feeder circuit 40 outputs the first measurement potential Vs1 having the same polarity and absolute value as the first reference voltage Vf1. That is, the first measurement potential Vs1 output from the first feeder circuit 40 is variably controlled by the central control circuit 45. The first feeder circuit 40 can be realized by, for example, a voltage follower to which the first reference voltage Vf1 is input.

The second feeder circuit 41 and the third feeder circuit 48 are constant potential generation circuits. The second feeder circuit 41 outputs a second potential V2. As an example, the second potential V2 is +5 V. The third feeder circuit 48 outputs a third potential V3. As an example, the third potential V3 is +1.25 V. For example, a voltage follower to which an output voltage of a constant voltage circuit using a shunt regulator is input can be used as the second feeder circuit 41 and the third feeder circuit 48. Alternatively, as the second feeder circuit 41 and the third feeder circuit 48, a voltage follower to which a voltage generated by a resistance voltage division circuit is input can be used.

The amplifier circuit 43 amplifies a potential of the first node N1 electrically coupled to the detection electrode 30. In the following description, the potential of the first node N1 may be referred to as a first node potential. The amplification circuit 43 outputs the amplified first node potential to the A/D converter 44. The A/D converter 44 converts the first node potential amplified by the amplification circuit 43 into a digital value. The A/D converter 44 outputs the digital value of the first node potential to the central control circuit 45 as a measured value of the detection electrode potential Vd. Thus, in the present embodiment, the amplification circuit 43 and the A/D converter 44 correspond to a potential measurement circuit that measures the potential of the first node N1 as the potential of the detection electrode 30.

For example, the amplification circuit 43 is a non-inverting amplification circuit using an operational amplifier. A ground terminal of the amplification circuit 43 is electrically coupled to the first potential line L2 to which the holder 110, the first capacitor C1, and the second capacitor C2 are electrically coupled. Thus, the ground terminal of the amplification circuit 43 is electrically coupled to the first potential line L2, thereby curbing superimposition of noise components involved in an operation of the digital circuit system constituting the measurement circuit 200 on the measured value of the detection electrode potential Vd.

Further, as understood from a configuration of the amplification circuit 43, the measured value of the detection electrode potential Vd obtained from the A/D converter 44 is a value corresponding to a potential difference between the first node potential, that is, the potential of the detection electrode 30 and the first potential V1.

The central control circuit 45 controls each circuit included in the measurement circuit 200 at the time of measuring the state of deterioration of the liquid crystal layer 5. Specifically, the central control circuit 45 outputs the first reference voltage Vf1 to the first feeder circuit 40. The central control circuit 45 outputs the first control signal S1 to the first switch SW1 and outputs the second control signal S2 to the second switch SW2. The central control circuit 45 outputs the third to fifth control signals S3 to S5 to the third switch SW3 to the fifth switch SW5 via the level shifter 42. Thus, the central control circuit 45 according to the present embodiment corresponds to a control circuit that outputs the first reference voltage Vf1 to the first feeder circuit 40 and controls the first to fifth switches SW1 to SW5.

The central control circuit 45 stores the measured value of the detection electrode potential Vd output from the A/D converter 44, in the measured value storage circuit 46. The measured value storage circuit 46 stores the measured value of the detection electrode potential Vd under the control of the central control circuit 45. The central control circuit 45 includes a determination circuit 45a. The determination circuit 45a determines the state of deterioration of the liquid crystal layer 5 based on the measured value stored in the measured value storage circuit 46. The display information generation circuit 47 generates display information of the state of deterioration of the liquid crystal layer 5 based on the measured value and the determination results.

Further, each circuit forming the measurement circuit 200 may be configured such that some or all of functions realized by the respective circuits are realized by, for example, a control program of the central control circuit 45. Further, the measurement circuit 200 may be one integrated circuit (IC) or may be divided into a plurality of ICs.

Although not shown, the liquid crystal apparatus 1000 may include a panel control circuit that controls the liquid crystal panel 100 in addition to the measurement circuit 200. The panel control circuit is a circuit that performs the normal driving of the liquid crystal panel 100. In other words, the panel control circuit is a circuit that causes the liquid crystal panel 100 to operate as an optical modulation apparatus. The panel control circuit outputs a timing signal, an image signal, a control signal, and the like to the data line driving circuit 23, the scanning line driving circuit 24, and the precharge circuit 25 via the external coupling terminals 18 other than the first electrode coupling terminals 18a and the second electrode coupling terminals 18b among the external coupling terminals 18 of the liquid crystal panel 100.

The data line driving circuit 23, the scanning line driving circuit 24, and the precharge circuit 25 are controlled by the panel control circuit, and thus a scanning signal for switching the TFT 11 of each pixel P to the on state is supplied to each scanning line (not shown), and a potential applied to the pixel electrode 9a of each pixel P is supplied to each data line (not shown). As a result, a light transmittance of each pixel P becomes a value determined by a potential difference between the pixel electrode 9a and the common electrode 21. In this way, a state in which the light transmittance of each pixel P is controlled by the panel control circuit and thus the liquid crystal panel 100 operates as a light modulation device to display an image is referred to as during the normal driving of the liquid crystal panel 100. In addition, in each pixel P, AC driving is performed during the normal driving in which an image is displayed, and a polarity of a voltage applied to the liquid crystal layer 5 of each pixel P is inverted for each one frame period in which update of a transmittance state of the pixel P included in the display region E is completed.

In the normal driving of the liquid crystal panel 100, the central control circuit 45 outputs the first reference voltage Vf1 of +5 V to the first feeder circuit 40. Thus, the first measurement potential Vs1 of +5 V is output from the first feeder circuit 40 at the time of the normal driving. Further, at the time of the normal driving, the central control circuit 45 controls the second switch SW2 and the fifth switch SW5 so that the second switch SW2 and the fifth switch SW5 come to the ON state, and controls the first switch SW1, the third switch SW3, and the fourth switch SW4 so that the first switch SW1, the third switch SW3, and the fourth switch SW4 come to an OFF state. Thus, at the time of the normal driving, the output terminal of the first feeder circuit 40 is electrically coupled to the detection electrode 30 via the first node N1, and an output terminal of the second feeder circuits 41 is electrically coupled to the common electrode 21 via the common electrode line L1.

Therefore, at the time of the normal driving, the first measurement potential Vs1 of +5 V is supplied to the detection electrode 30, and the second potential V2 of +5 V is supplied to the common electrode 21. That is, at the time of the normal driving, the potential of the detection electrode 30 is +5 V, which is the same as the potential of the common electrode 21. In the normal driving, the second potential V2 output from the second feeder circuit 41 is used as the common potential. Although the common potential has been described as +5 V in the present embodiment, the common potential is not limited thereto and may be set to, for example, +7 V. In this case, the first switch SW1 and the second switch SW2 may be controlled by the 7 V signal. At the same time, the first feeder circuit 40 and the second feeder circuit 41 also corresponds to the +7 V output. The first reference voltage Vf1 output by the central control circuit 45 also corresponds to the +7 V output.

Further, in a non-operation in which the normal driving, and physical property measurement of the liquid crystal layer 5 to be described later are not performed, the central control circuit 45 controls the first switch SW1 and the third switch SW3 so that the first switch SW1 and the third switch SW3 come to the ON state, and controls the second switch SW2, the fourth switch SW4, and the fifth switch SW5 so that the second switch SW2, the fourth switch SW4, and the fifth switch SW5 come to the OFF state. Accordingly, in the non-operation, the detection electrode 30 and the common electrode 21 are electrically coupled to the first potential line L2. Therefore, in the non-operation, the potential of each of the detection electrode 30 and the common electrode 21 becomes the first potential V1, that is, 0 V.

In the liquid crystal apparatus 1000, the measurement circuit 200 and the panel control circuit may be disposed on the same substrate, or the measurement circuit 200 and the panel control circuit may be disposed on a plurality of different substrates. For example, the substrate on which the measurement circuit 200 and the panel control circuit are disposed is a rigid substrate or a flexible printed circuit (FPC) substrate.

1.3. Outline of Method for Measuring Physical Properties of Liquid Crystal Layer 5

Figure 4:
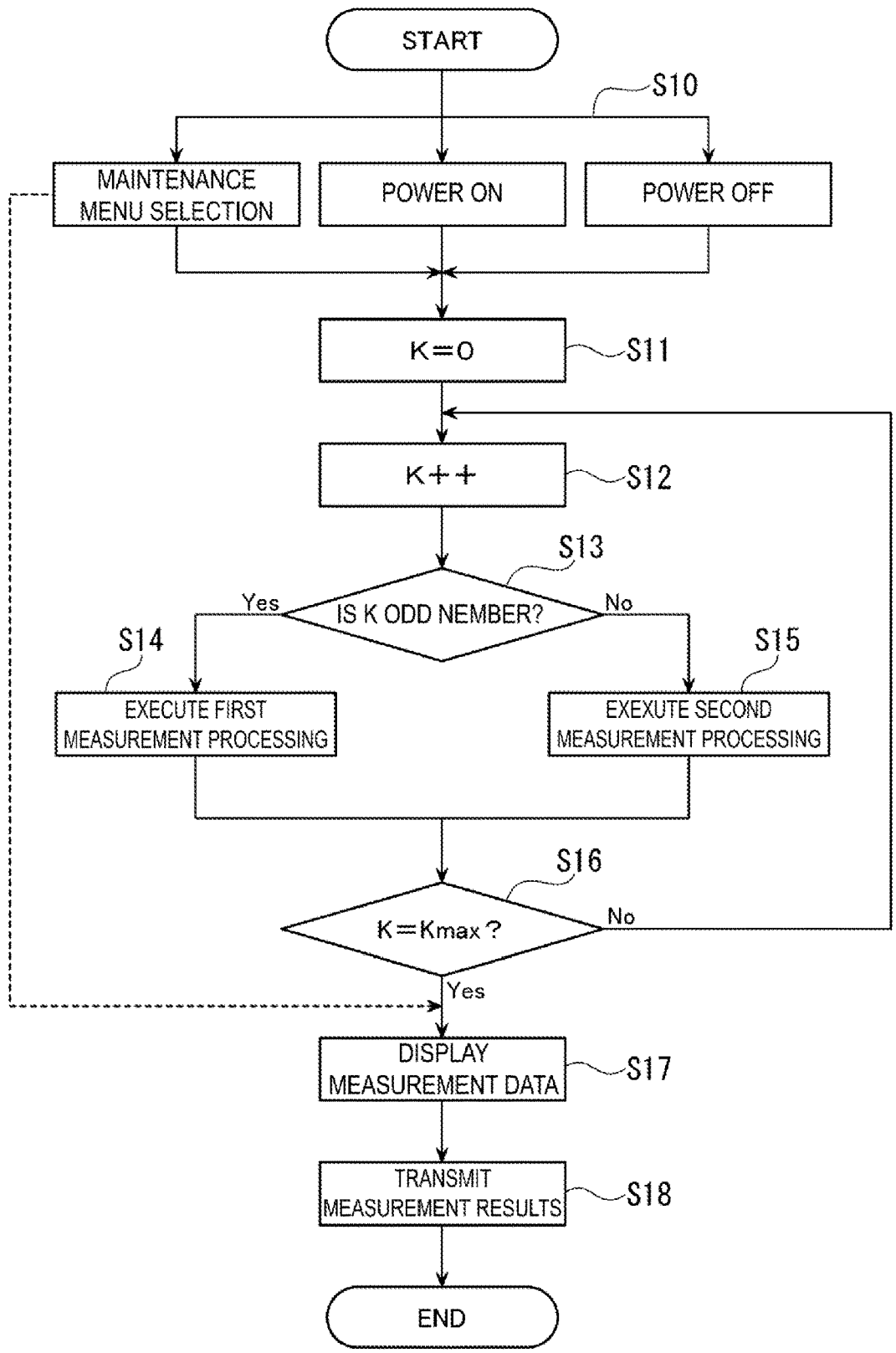
FIG. 4 is a schematic flowchart illustrating a method of measuring a physical property of a liquid crystal layer.

FIG. 4 is a schematic flowchart showing a method for measuring physical properties of the liquid crystal layer 5 of the liquid crystal panel 100. A method for measuring physical properties of the liquid crystal layer 5 will be described below with reference to FIG. 4.

As shown in FIG. 4, in step S10, when a predetermined event occurs, the liquid crystal device 1000 shifts from a normal driving mode in which the normal driving is performed to a measurement mode in which measurement of physical properties of the liquid crystal layer 5 is performed and starts measuring the physical properties of the liquid crystal layer 5. Here, the predetermined event includes power-on and power-off of a projection-type display apparatus using the liquid crystal apparatus 1000, a measurement instruction from a maintenance menu selection in the projection-type display apparatus using the liquid crystal apparatus 1000, and the like, and a measurement start command from the projection-type display apparatus is transmitted due to occurrence of these events. When the central control circuit 45 of the measurement circuit 200 receives the measurement start command from the projection display device, it starts measuring the physical properties of the liquid crystal layer 5.

Further, step S10 shows a concept of a measurement mode transition event. In practice, for example, an instruction from the maintenance menu selection is an interrupt processing instruction, and the projection-type display apparatus using the liquid crystal apparatus 1000 is powered on. Further, in the measurement mode transition event, all of the illustrated "maintenance menu selection", "power-on", and "power-off" are not mandatory. Further, in the present disclosure, measurement of the physical properties of the liquid crystal layer 5 is performed, for example, while a light source of the projection display device is off. Alternatively, the present disclosure is implemented as a configuration in which light from the light source is shielded by a mechanical light shielding mechanism. At the time of measuring the physical properties of the liquid crystal layer 5, if the light source of the projection display device is in a non-lighting state, no problem occurs in display of the projection display device.

When the measurement start command is received, the central control circuit 45 first resets a count value K indicating the number of times of execution of measurement processing, which will be described below, to "0" (step S11). Subsequently, the central control circuit 45 adds "1" to the count value K (step S12). Subsequently, the central control circuit 45 determines whether or not the count value K is an odd number (step S13).

When the count value K is an odd number (step S13: Yes), the central control circuit 45 executes first measurement processing (step S14). On the other hand, when the count value K is an even number (step S13: No), the central control circuit 45 executes second measurement processing (step S15). Specific content of the first measurement processing and the second measurement processing will be described below.

After the central control circuit 45 executes the first measurement processing or the second measurement processing, the central control circuit 45 determines whether or not the count value K is equal to an upper limit value Kmax (step S16). When the count value K is not equal to the upper limit value Kmax (step S16: No), the central control circuit 45 returns to step S12. On the other hand, when the count value K is equal to the upper limit value Kmax (step S16: Yes), the central control circuit 45 proceeds to step S17, which will be described below. Further, the upper limit value Kmax is set in advance in a control program of the measurement circuit 200. Alternatively, a numerical value may be set by an input means (not illustrated). The input means is, for example, an input key included in the measurement circuit 200, a PC coupled to the projection display device using the liquid crystal device 1000 in a wired or wireless manner, or the like. When the upper limit value Kmax is set to 2 or more, it is possible to calculate an average value of a plurality of measurement results of the first measurement processing or the second measurement processing and obtain data with good reproducibility. In a detailed measurement example, which will be described below, the upper limit value Kmax=20, and an average value in ten times of second measurement processing is calculated.

As understood from the description of the processing from step S11 to step S16, the central control circuit 45 alternately executes the first measurement processing and the second measurement processing until the count value K becomes equal to the upper limit value Kmax. For example, when the upper limit value Kmax is "10", each of the first measurement processing and the second measurement processing is executed five times. Hereinafter, the first measurement processing and the second measurement processing will be described in detail with reference to FIGS. 5 and 6.

Figure 5:
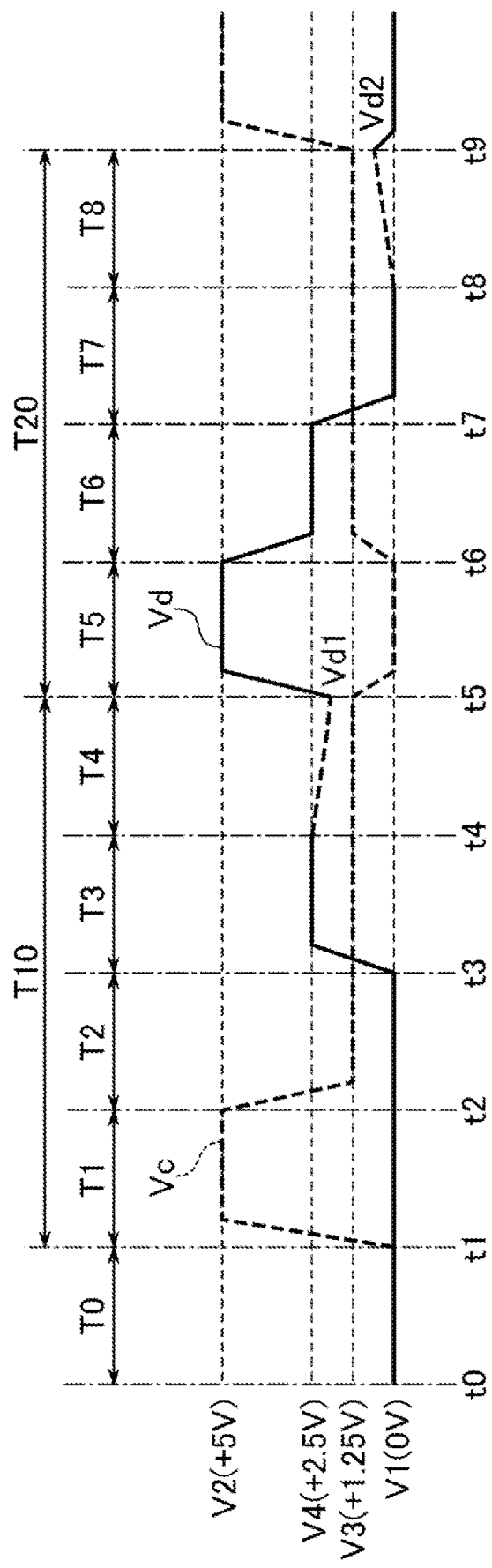
FIG. 5 is a diagram illustrating a change over time in potential of each of a detection electrode and a common electrode in the first embodiment.

FIG. 5 is a diagram showing a change over time in potential of the detection electrode 30 and the common electrode 21 at the time of execution of the first measurement processing and the second measurement processing. In FIG. 5, a horizontal axis represents time, and a vertical axis represents voltage. In FIG. 5, the detection electrode potential Vd, which is the potential of the detection electrode 30, is indicated by a solid line with some exceptions, and a common electrode potential Vc, which is the potential of the common electrode 21, is indicated by a dotted line.

Figure 6:
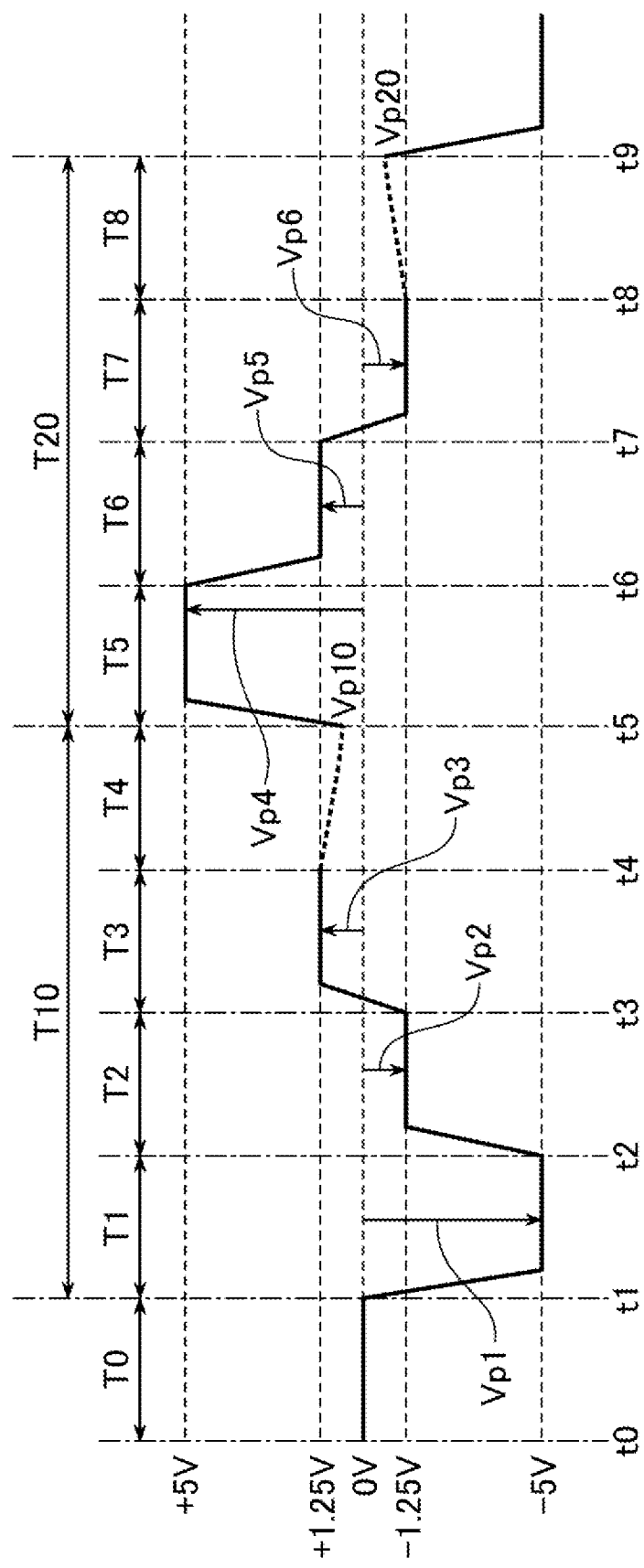
FIG. 6 is a diagram illustrating a change over time in potential difference between the detection electrode and the common electrode at the time of execution of first measurement processing and second measurement processing in the first embodiment.

FIG. 6 is a diagram showing a change over time in potential difference between the detection electrode 30 and the common electrode 21 at the time of execution of the first measurement processing and the second measurement processing. In FIG. 6, the horizontal axis is time, and the vertical axis is a voltage of the detection electrode 30 when the common electrode 21 is used as a reference. In other words, it is a voltage applied to the liquid crystal layer 5 in the detection electrode 30. In FIG. 6, a polarity of a potential difference when the detection electrode potential Vd is higher than the common electrode potential Vc is defined as a positive polarity.

In FIGS. 5 and 6, the first measurement processing is executed in a period T10 from time t1 to time t5. In the following description, the period T10 in which the first measurement processing is executed may be referred to as a first measurement period T10. The first measurement period T10 includes a first reverse sweep period T1, a first relaxation period T2, a first charging period T3, and a first discharging period T4. The first reverse sweep period T1 is a period from time t1 to time t2. The first relaxation period T2 is a period from time t2 to time t3. The first charging period T3 is a period from time t3 to time t4. The first discharging period T4 is a period from time t4 to time t5.

In FIGS. 5 and 6, the second measurement processing is executed in a period T20 from time t5 to time t9. In the following description, the period T20 in which the second measurement processing is executed may be referred to as a second measurement period T20. The second measurement period T20 includes a second reverse sweep period T5, a second relaxation period T6, a second charging period T7, and a second discharging period T8. The second reverse sweep period T5 is a period from time t5 to time t6. The second relaxation period T6 is a period from time t6 to time t7. The second charging period T7 is a period from time t7 to time t8. The second discharging period T8 is a period from time t8 to time t9.

In FIGS. 5 and 6, a period TO from time t0 to time t1 is a reset period inserted before the start of the first measurement period T10. In this reset period TO, the central control circuit 45 controls the first switch SW1 and the third switch SW3 so that the first switch SW1 and the third switch SW3 come to the ON state, and controls the second switch SW2, the fourth switch SW4, and the fifth switch SW5 so that the second switch SW2, the fourth switch SW4, and the fifth switch SW5 come to the OFF state. Accordingly, in the reset period TO, the detection electrode 30 and the common electrode 21 are electrically coupled to the first potential line L2. Therefore, in the reset period TO, the potential of each of the detection electrode 30 and the common electrode 21 becomes the first potential V1, that is, 0 V.

First, the first measurement processing performed in the first measurement period T10 will be described.

In the first reverse sweep period T1, the measurement circuit 200 supplies the first potential V1 to the detection electrode 30 and supplies the second potential V2 higher than the first potential V1 to the common electrode 21. The first reverse sweep period T1 corresponds to a first period.

Specifically, in the first reverse sweep period T1, the central control circuit 45 controls the first switch SW1 and the fifth switch SW5 so that the first switch SW1 and the fifth switch SW5 come to the ON state, and controls the second switch SW2, the third switch SW3, and the fourth switch SW4 so that the second switch SW2, the third switch SW3, and the fourth switch SW4 come to the OFF state.

In the first reverse sweep period T1, the central control circuit 45 controls the first to fifth switches SW1 to SW5 as described above, so that a detection electrode 30 is electrically coupled to the first potential line L2, and the common electrode 21 is electrically coupled to the output terminal of the second feeder circuit 41. Accordingly, in the first reverse sweep period T1, the first potential V1 of 0 V is supplied to the detection electrode 30, and the second potential V2 of +5 V is supplied to the common electrode 21. As a result, as illustrated in FIG. 5, in the first reverse sweep period T1, the detection electrode potential Vd becomes 0 V, and the common electrode potential Vc becomes +5 V. Further, as illustrated in FIG. 6, in the first reverse sweep period T1, the potential difference Vp1 between the detection electrode 30 and the common electrode 21 becomes −5 V.

In the first relaxation period T2 after the first reverse sweep period T1, the measurement circuit 200 supplies the first potential V1 to the detection electrode 30, and supplies the third potential V3 higher than the first potential V1 and lower than the second potential V2 to the common electrode 21. The first relaxation period T2 corresponds to a second period.

Specifically, in the first relaxation period T2, the central control circuit 45 controls the first switch SW1 and the fourth switch SW4 so that the first switch SW1 and the fourth switch SW4 come to the ON state, and controls the second switch SW2, the third switch SW3, and the fifth switch SW5 so that the second switch SW2, the third switch SW3, and the fifth switch SW5 come to the OFF state.

In the first relaxation period T2, the central control circuit 45 controls the first to fifth switches SW1 to SW5 as described above, so that the detection electrode 30 is electrically coupled to the first potential line L2, and the common electrode 21 is electrically coupled to the output terminal of the third feeder circuit 48. Accordingly, in the first relaxation period T2, the first potential V1 of 0 V is supplied to the detection electrode 30, and the third potential V3 of +1.25 V is supplied to the common electrode 21. As a result, as illustrated in FIG. 5, in the first relaxation period T2, the detection electrode potential Vd becomes 0 V, and the common electrode potential Vc becomes +1.25 V. Further, as illustrated in FIG. 6, in the first relaxation period T2, the potential difference Vp2 between the detection electrode 30 and the common electrode 21 becomes −1.25 V.

In the first charging period T3 after the first relaxation period T2, the measurement circuit 200 supplies the fourth potential V4 higher than the third potential V3 and lower than the second potential V2 to the detection electrode 30 and supplies the third potential V3 to the common electrode 21. The first charging period T3 corresponds to a third period.

Specifically, in the first charging period T3, the central control circuit 45 outputs, for example, the first reference voltage Vf1 of +2.5 V to the first feeder circuit 40. Accordingly, the first measurement potential Vs1 of +2.5 V is output from the first feeder circuit 40. Further, in the first charging period T3, the central control circuit 45 controls the second switch SW2 and the fourth switch SW4 so that the second switch SW2 and the fourth switch SW4 come to the ON state, and controls the first switch SW1, the third switch SW3, and the fifth switch SW5 so that the first switch SW1, the third switch SW3, and the fifth switch SW5 come to the OFF state.

In the first charging period T3, the central control circuit 45 controls the first to fifth switches SW1 to SW5 as described above, so that the detection electrode 30 is electrically coupled to the output terminal of the first feeder circuit 40, and the common electrode 21 is electrically coupled to the output terminal of the third feeder circuit 48. Accordingly, in the first charging period T3, the first measurement potential Vs1 of +2.5 V is supplied to the detection electrode 30 as the fourth potential V4, and the third potential V3 of +1.25 V is supplied to the common electrode 21. As a result, as illustrated in FIG. 5, in the first charging period T3, the detection electrode potential Vd becomes +2.5 V, and the common electrode potential Vc becomes +1.25 V. Further, as illustrated in FIG. 6, in the first charging period T3, the potential difference Vp3 between the detection electrode 30 and the common electrode 21 becomes +1.25 V.

In the first discharging period T4 after the first charging period T3, the measurement circuit 200 stops supplying the potential to the detection electrode 30 and supplies the third potential V3 to the common electrode 21 to measure the detection electrode potential Vd at least once, for example, at the time of the end of the first discharging period T4. The first discharging period T4 corresponds to a fourth period.

To be specific, in the first discharging period T4, the central control circuit 45 controls the fourth switch SW4 so that the fourth switch SW4 comes to the ON state, and also controls the first switch SW1, the second switch SW2, the third switch SW3, and the fifth switch SW5 so that the first switch SW1, the second switch SW2, the third switch SW3, and the fifth switch SW5 come to the OFF state.

In the first discharging period T4, the central control circuit 45 controls the first to fifth switches SW1 to SW5 as described above, so that the detection electrode 30 is electrically decoupled from both the first feeder circuit 40 and the first potential line L2, and the common electrode 21 is electrically coupled to the output terminal of the third feeder circuit 48. Accordingly, in the first discharging period T4, the third potential V3 of +1.25 V is continuously supplied to the common electrode 21, but since the supply of the potential to the detection electrode 30 is stopped, the liquid crystal layer 5 discharges charge accumulated the first charging period T3. As a result, as illustrated in FIG. 5, in the first discharging period T4, the detection electrode potential Vd gradually changes from the fourth potential V4 to the third potential V3 applied to the common electrode 21 and reaches the potential Vd1 at time t5. The value of the detection electrode potential Vd1 depends on an amount of mobile ions contained in the liquid crystal layer 5. Accordingly, as will be described later, the state of deterioration of the liquid crystal layer 5 can be determined by measuring the detection electrode potential Vd1 at the end of the first discharging period T4.

As illustrated in FIG. 6, the detection electrode potential Vd1 at the end of the first discharging period T4 corresponds to a potential difference Vp10 with the common electrode 21 as a reference.

For example, the central control circuit 45 measures the detection electrode potential Vd1 at time t5 when the first discharging period T4 ends. Specifically, the detection electrode potential Vd1 is amplified by the amplification circuit 43, and an output of the amplification circuit 43 is input to the A/D converter 44. The central control circuit 45 acquires a digital value output from the A/D converter 44 at time t5 as the measured value of the detection electrode potential Vd1. The central control circuit 45 stores the measured value of the detection electrode potential Vd1 obtained at time t5 in the measured value storage circuit 46.

The first measurement processing has been described above.

The first reverse sweep period T1 is preferably longer than one frame period of the display region E. For example, when the one frame period is about 16 ms, the first reverse sweep period T1 is equal to or longer than 20 ms. Further, in the above description, a case where the potential difference Vp1 between the detection electrode 30 and the common electrode 21 in the first reverse sweep period T1 is −5 V has been illustrated, but it is preferable for an absolute value of the potential difference Vp1 to be equal to or higher than a maximum applied voltage of the liquid crystal layer 5 of the pixel P in the normal driving. In other words, it is preferable for the absolute value of the potential difference Vp1 to be equal to or greater than the maximum applied voltage of the liquid crystal layer 5 in the display region E. A reason that a length of the first reverse sweep period T1 and the absolute value of the potential difference Vp1 are set as described above will be described below.

In the above explanation, the case where the potential difference Vp2 between the detection electrode 30 and the common electrode 21 in the first relaxation period T2 is −1.25 V has been illustrated, but it is preferable for the absolute value of the potential difference Vp2 to be greater than 0 V and lower than a threshold voltage Vth of the liquid crystal layer 5. For example, in a vertical alignment (VA) liquid crystal panel 100, when a gap is about 2.6 μm, the threshold voltage Vth of the liquid crystal layer 5 is about 2.1 V. Also, the threshold voltage Vth of the liquid crystal layer 5 is a driving voltage at which a transmittance or brightness of the liquid crystal layer 5 becomes about 10% at its maximum gradation ratio, and more preferably a voltage immediately before the liquid crystal molecules start to move or a voltage immediately before an alignment state of the liquid crystal molecules starts to change. In this embodiment, since the liquid crystal panel 100 is a normally black type, and thus the threshold voltage Vth of the liquid crystal layer 5 is defined as described above. In the case of a normally white type liquid crystal panel 100, for example, the threshold voltage Vth of the liquid crystal layer 5 can be defined as a driving voltage at which the transmittance or brightness of the liquid crystal layer 5 is about 90% at its maximum gradation ratio. A reason that the absolute value of the potential difference Vp2 in the first relaxation period T2 is set as described above will be described below.

The first charging period T3 is preferably shorter than one frame period of the display region E. For example, when the one frame period is about 16 ms, the first charging period T3 is 5 ms. Further, in the above description, a case where the potential difference Vp3 between the detection electrode 30 and the common electrode 21 in the first charging period T3 is +1.25 V has been illustrated, but it is preferable for an absolute value of the potential difference Vp3 to be greater than 0 V and smaller than the threshold voltage Vth of the liquid crystal layer 5. A reason that a length of the first charging period T3 and the absolute value of the potential difference Vp3 are set as described above will be described below.

Next, the second measurement processing performed in the second measurement period T20 will be described.

In the second reverse sweep period T5 after the first discharging period T4, the measurement circuit 200 supplies the second potential V2 to the detection electrode 30 and supplies the first potential V1 to the common electrode 21. The second reverse sweep period T5 corresponds to a fifth period.

Specifically, in the second reverse sweep period T5, the central control circuit 45 outputs, for example, the first reference voltage Vf1 of +5 V to the first feeder circuit 40. Accordingly, the first measurement potential Vs1 of +5 V is output from the first feeder circuit 40. In the second reverse sweep period 15, the central control circuit 45 controls the second switch SW2 and the third switch SW3 so that the second switch SW2 and the third switch SW3 come to the ON state and controls the first switch SW1, the fourth switch SW4, and the fifth switch SW5 so that the first switch SW1, the fourth switch SW4, and the fifth switch SW5 come to the OFF state.

In the second reverse sweep period T5, the central control circuit 45 controls the first to fifth switches SW1 to SW5 as described above, so that the detection electrode 30 is electrically coupled to the output terminal of the first feeder circuit 40, and the common electrode 21 is electrically coupled to the first potential line L2. Thus, in the second reverse sweep period T5, the first measurement potential Vs1 of +5 V is supplied to the detection electrode 30 as the second potential V2, and the first potential V1 of 0 V is supplied to the common electrode 21. As a result, as illustrated in FIG. 5, in the second reverse sweep period T5, the detection electrode potential Vd becomes +5 V, and the common electrode potential Vc becomes 0 V. Further, as illustrated in FIG. 6, in the second reverse sweep period T5, the potential difference Vp4 between the detection electrode 30 and the common electrode 21 becomes +5 V.

In the second relaxation period T6 after the second reverse sweep period T5, the measurement circuit 200 supplies the fourth potential V4 to the detection electrode 30 and supplies the third potential V3 to the common electrode 21. The second relaxation period T6 corresponds to a sixth period.

Specifically, in the second relaxation period T6, the central control circuit 45 outputs, for example, the first reference voltage Vf1 of +2.5 V to the first feeder circuit 40. Accordingly, the first measurement potential Vs1 of +2.5 V is output from the first feeder circuit 40. Further, in the second relaxation period T6, the central control circuit 45 controls the second switch SW2 and the fourth switch SW4 so that the second switch SW2 and the fourth switch SW4 come to the ON state, and controls the first switch SW1, the third switch SW3, and the fifth switch SW5 so that the first switch SW1, the third switch SW3, and the fifth switch SW5 come to the OFF state.

In the second relaxation period T6, the central control circuit 45 controls the first to fifth switches SW1 to SW5 as described above, so that the detection electrode 30 is electrically coupled to the output terminal of the first feeder circuit 40, and the common electrode 21 is electrically coupled to the output terminal of the third feeder circuit 48 Accordingly, in the second relaxation period T6, the first measurement potential Vs1 of +2.5 V is supplied to the detection electrode 30 as the fourth potential V4, and the third potential V3 of +1.25 V is supplied to the common electrode 21. As a result, as illustrated in FIG. 5, in the second relaxation period T6, the detection electrode potential Vd becomes +2.5 V, and the common electrode potential Vc becomes +1.25 V. Further, as illustrated in FIG. 6, in the second relaxation period T6, the potential difference Vp5 between the detection electrode 30 and the common electrode 21 becomes +1.25 V.

In the second charging period T7 after the second relaxation period T6, the measurement circuit 200 supplies the first potential V1 to the detection electrode 30 and supplies the third potential V3 to the common electrode 21. The second charging period T7 corresponds to a seventh period.

Specifically, in the second charging period T7, the central control circuit 45 controls the first switch SW1 and the fourth switch SW4 so that the first switch SW1 and the fourth switch SW4 come to the ON state, and controls the second switch SW2, the third switch SW3, and the fifth switch SW5 so that the second switch SW2, the third switch SW3, and the fifth switch SW5 come to the OFF state.

In the second charging period T7, the central control circuit 45 controls the first to fifth switches SW1 to SW5 as described above, so that the detection electrode 30 is electrically coupled to the first potential line L2, and the common electrode 21 is electrically coupled to the output terminal of the third feeder circuit 48. Accordingly, in the second charging period T7, the first potential V1 of 0 V is supplied to the detection electrode 30, and the third potential V3 of +1.25 V is supplied to the common electrode 21. As a result, as illustrated in FIG. 5, in the second charging period T7, the detection electrode potential Vd becomes 0 V, and the common electrode potential Vc becomes +1.25 V. Further, as illustrated in FIG. 6, in the second charging period T7, the potential difference Vp6 between the detection electrode 30 and the common electrode 21 becomes −1.25 V.

In the second discharging period T8 after the second charging period T7, the measurement circuit 200 stops supplying the potential to the detection electrode 30 and supplies the third potential V3 to the common electrode 21 to measure the detection electrode potential Vd at least once, for example, at the time of the end of the second discharging period T8. The second discharging period T8 corresponds to an eighth period.

Specifically, in the second discharging period T8, the central control circuit 45 controls the fourth switch SW4 so that the fourth switch SW4 comes to the ON state, and also controls the first switch SW1, the second switch SW2, the third switch SW3, and the fifth switch SW5 so that the first switch SW1, the second switch SW2, the third switch SW3, and the fifth switch SW5 come to the OFF state.

In the second discharging period T8, the central control circuit 45 controls the first to fifth switches SW1 to SW5 as described above, so that the detection electrode 30 is electrically decoupled from both the first feeder circuit 40 and the first potential line L2, and the common electrode 21 is electrically coupled to the output terminal of the third feeder circuit 48. Accordingly, in the second discharging period T8, the third potential V3 of +1.25 V continues to be supplied to the common electrode 21, but since supply of the potential to the detection electrode 30 is stopped, the liquid crystal layer 5 discharges charge accumulated in the second charging period T7. As a result, as illustrated in FIG. 5, in the second discharging period T8, the detection electrode potential Vd gradually changes from the first potential V1 to the third potential V3 applied to the common electrode 21 and reaches the potential Vd2 at time t9. A value of a detection electrode potential Vd2 depends on the number of mobile ions contained in the liquid crystal layer 5. Accordingly, as will be described later, the state of deterioration of the liquid crystal layer 5 can be determined by measuring the detection electrode potential Vd2 at the end of the second discharging period T8.

As illustrated in FIG. 6, the detection electrode potential Vd2 at the end of the second discharging period T8 corresponds to a potential difference Vp20 with the common electrode 21 as a reference.

The central control circuit 45, for example, measures the detection electrode potential Vd2 at time t9 when the second discharging period T8 ends. Specifically, the detection electrode potential Vd2 is amplified by the amplification circuit 43, and the output of the amplification circuit 43 is input to the A/D converter 44. In view of a driving power supply voltage (for example, 5 V) of the measurement circuit 200, high amplification is difficult. For example, when +2.4 V which is 0.1 V lower than +2.5 V, is obtained as Vd1, an amplification factor that can be set is limited to about twice. On the other hand, when +0.1 V which is increased by 0.1 V from 0 V is obtained as Vd2, a possible amplification factor can be 20 times or more. Accordingly, it is preferable to use the detection electrode potential Vd2 obtained by the second measurement processing for a determination of deterioration of the liquid crystal layer 5 from the viewpoint of detection sensitivity. The central control circuit 45 acquires a digital value output from the A/D converter 44 at time t9 as the measured value of the detection electrode potential Vd2. The central control circuit 45 stores the measured value of the detection electrode potential Vd2 obtained at time t9 in the measured value storage circuit 46.

In the description, the detection electrode potential Vd (Vd1 or Vd2) is measured in each of the first measurement processing and the second measurement processing, but the measurement may be performed in at least one of the first measurement processing and the second measurement processing.

The second measurement processing has been described above.

The second reverse sweep period T5 is preferably longer than one frame period of the display region E. For example, when the one frame period is about 16 ms, the second reverse sweep period T5 is equal to or longer than 20 ms. Further, in the above description, a case where the potential difference Vp4 between the detection electrode 30 and the common electrode 21 in the second reverse sweep period T5 is +5 V has been illustrated, but it is preferable for an absolute value of the potential difference Vp4 to be equal to or higher than the maximum applied voltage of the liquid crystal layer 5 of the pixel P in the normal driving. In other words, it is preferable for the absolute value of the potential difference Vp4 to be equal to or greater than the maximum applied voltage of the liquid crystal layer 5 in the display region E. A reason that a length of the second reverse sweep period T5 and the absolute value of the potential difference Vp4 are set as described above will be described below.

In the above description, the case where the potential difference Vp5 between the detection electrode 30 and the common electrode 21 in the second relaxation period T6 is +1.25 V has been illustrated, but it is preferable for the absolute value of the potential difference Vp5 to be greater than 0 V and smaller than the threshold voltage Vth of the liquid crystal layer 5. As described above, for example, when the liquid crystal panel 100 is a VA liquid crystal panel and the gap is about 2.6 μm, the threshold voltage Vth of the liquid crystal layer 5 is about 2.1 V. A reason that the absolute value of the potential difference Vp5 in the second relaxation period T6 is set as described above will be described below.

The second charging period T7 is preferably shorter than one frame period of the display region E. For example, when the one frame period is about 16 ms, the second charging period T7 is 5 ms. Further, in the above description, a case where the potential difference Vp6 between the detection electrode 30 and the common electrode 21 in the second charging period T7 is −1.25 V has been illustrated, but it is preferable for the absolute value of the potential difference Vp6 to be greater than 0 V and smaller than the threshold voltage Vth of the liquid crystal layer 5. The reason that a length of the second charging period T7 and the absolute value of the potential difference Vp6 are set as described above will be described later.

As understood from FIG. 6, the liquid crystal layer 5 in a region of the detection electrode 30 is AC-driven by alternately repeating the first measurement processing and the second measurement processing as described above. Thus, it is possible to inhibit deterioration of the liquid crystal layer 5 due to application of a DC voltage to the liquid crystal layer 5 at the time of measuring the physical properties of the liquid crystal layer 5.

Hereinafter, the description will be continued with reference to FIG. 4.

As already described above, the central control circuit 45 alternately executes the first measurement processing and the second measurement processing until the count value K becomes equal to the upper limit value Kmax. When the count value K is equal to the upper limit value Kmax (step S16: Yes), the central control circuit 45 proceeds to step S17, which will be described below.

After all the measurement processing are completed, for example, the central control circuit 45 outputs the first reference voltage Vf1 of +5 V to the first feeder circuit 40. Accordingly, the first measurement potential Vs1 of +5 V is output from the first feeder circuit 40. Further, the central control circuit 45 controls the second switch SW2 and the fifth switch SW5 so that the second switch SW2 and the fifth switch SW5 come to the ON state, and controls the first switch SW1, the third switch SW3, and the fourth switch SW4 so that the first switch SW1, the third switch SW3, and the fourth switch SW4 come to the OFF state. Accordingly, the detection electrode 30 is electrically coupled to the output terminal of the first feeder circuit 40, and the common electrode 21 is electrically coupled to the output terminal of the second feeder circuit 41. As a result, the first measurement potential Vs1 of +5 V is supplied to the detection electrode 30, and the second potential V2 of +5 V is supplied to the common electrode 21.

In step S17, the display information generation circuit 47 creates display data indicating a state of deterioration of the liquid crystal layer 5 based on the measured values of the detection electrode potentials Vd1 and Vd2 stored in the measured value storage circuit 46. At the time of the normal driving of the liquid crystal panel 100, the central control circuit 45 displays the display data generated by the display information generation circuit 47 in the display region E of the liquid crystal panel 100 via a panel control circuit. Also, display of the state of deterioration of the liquid crystal layer 5 may be performed only when a user needs to be notified, such as when the liquid crystal panel 100 approaches the end of its life and the measured values of the detection electrode potentials Vd1 and Vd2 reach a preset threshold Vd_th.

In addition, the display indicating the state of deterioration of the liquid crystal layer 5 may be performed by a projection display device using the liquid crystal device 1000, which will be described later. For example, when the projection-type display apparatus is a three-panel type projection-type display apparatus including three liquid crystal apparatuses 1000 corresponding to RGB, the projection-type display apparatus may be configured to display deterioration situations of the liquid crystal panels 100 of the three liquid crystal apparatuses 1000 in an integrally manner instead of the liquid crystal apparatus 1000 individually displaying the deterioration situation of the liquid crystal layer 5.

In step S18, the central control circuit 45 transmits data regarding the measurement results to the projection-type display apparatus using the liquid crystal apparatus 1000. Based on the data indicating the state of deterioration of the liquid crystal layer 5, the projection display device performs necessary processing such as notifying processing using a notifying means such as an audio device or a warning lamp. Further, step S18 may be omitted depending on a specification of the projection-type display apparatus using the liquid crystal apparatus 1000.

The measurement results of the state of deterioration of the liquid crystal layer 5 can also be displayed from a maintenance menu of the projection display device using the liquid crystal device 1000. The maintenance menu is implemented, for example, as a part of a setting menu in the projection-type display apparatus. In step S10, when the central control circuit 45 receives a measurement result display instruction command from the projection-type display apparatus using the liquid crystal apparatus 1000, the central control circuit 45 proceeds to step S17 and displays the measurement results in the display region E of the liquid crystal panel 100.

1.4. Outline of Relationship Between Usage Time and Discharging Characteristics of Liquid Crystal Panel 100

Figure 7:
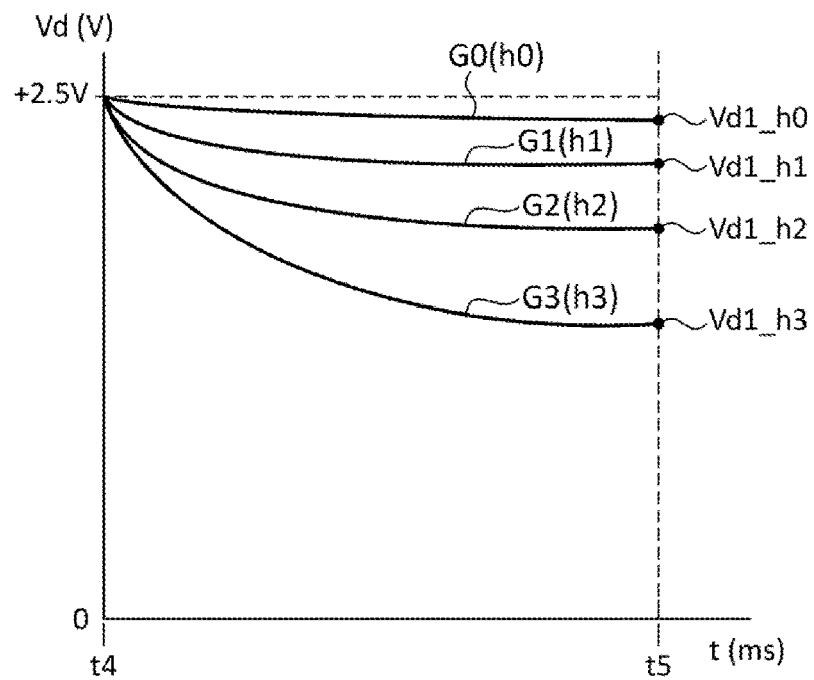
FIG. 7 is a diagram illustrating a relationship between a usage time and discharging characteristics.

FIG. 7 is a graph showing a relationship between a usage time and discharging characteristics of the liquid crystal panel 100. The usage time is, for example, a cumulative usage time. In a projection-type display apparatus, the usage time corresponds to, for example, a cumulative lighting time. Since an enormous amount of time is required to verify the cumulative usage time (lighting time) through an experiment, description will be given with data obtained when a continuous acceleration test with an incident light intensity or temperature higher than an actual usage condition is performed. Specifically, the discharging characteristics are, for example, change over time of the detection electrode potential Vd in the first discharging period T4 illustrated in FIG. 5. A vertical axis in FIG. 7 represents the detection electrode potential Vd in the first discharging period T4. A horizontal axis in FIG. 7 represents time in the first discharging period T4. In FIG. 7, time t4 corresponds to time t4 illustrated in FIG. 5, that is, a start time of the first discharging period T4. Further, in FIG. 7, time t5 corresponds to time t5 illustrated in FIG. 5, that is, an end time of the first discharging period T4. For example, time t5 is a time after 150 ms from time t4. Therefore, when the horizontal axis represents elapsed time from the start of discharging, time t4 is zero and time t5 is 150.

In FIG. 7, a discharging curve G0 indicates a discharging curve at the start of usage of the liquid crystal panel 100, that is, at a usage time h0 when the usage time is 0, and a discharging curve G3 indicates a discharging curve at a usage time h3 immediately before the liquid crystal panel 100 reaches the end of life. A discharging curve G1 indicates a discharging curve at a point in time when a usage time h1 has elapsed from the start of usage of the liquid crystal panel 100, and a discharging curve G2 indicates a discharging curve at a point in time when a usage time h2 has elapsed from the start of usage of the liquid crystal panel 100. Here, a relationship between the usage times is h0<h1<h2<h3.

In each discharging curve, the detection electrode potential Vd at time t4 is close to +2.5 V, but the detection electrode potential Vd at time t5, that is, the detection electrode potential Vd1 differs. That is, the detection electrode potential Vd1 decreases with progress of the test under the continuous acceleration test.

Thus, when the usage time of the liquid crystal panel 100 increases, the detection electrode potential Vd1 at time t5 decreases. This is because the mobile ions in the liquid crystal layer 5 increase due to a chemical reaction caused by incidence of high-intensity light along with the usage time of the liquid crystal panel 100, and the discharging curve changes. In the present embodiment, the determination circuit 45a determines the deterioration situation of the liquid crystal layer 5 based on the measured value of the detection electrode potential Vd1 stored in the measured value storage circuit 46.

Figure 8:
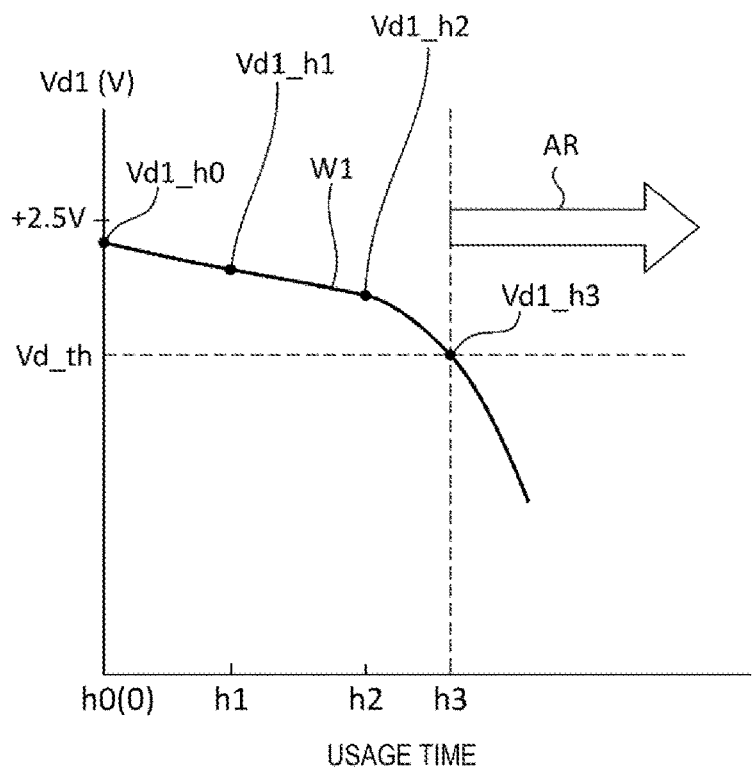
FIG. 8 is a diagram illustrating a relationship between the usage time and a measured value.

FIG. 8 is a graph showing a relationship between the usage time of the liquid crystal panel 100 and the detection electrode potential Vd1 at time t5. A vertical axis represents the detection electrode potential Vd1 at time t5, and a horizontal axis represents the usage time of the liquid crystal panel 100.

As illustrated in FIG. 8, the value of the detection electrode potential Vd1 at time t5 changes depending on lengths of the usage times h0, h1, h2, and h3 of the liquid crystal panel 100, and transitions along a transition line W1. Typically, a value indicated by the transition line W1 gradually decreases as the usage time increases. That is, the detection electrode potential Vd1 gradually decreases in an order of Vd1 h0, Vd1 h1, Vd1 h2, and Vd1 h3 In a value indicated by the transition line W1, when a ratio of a decrease in the measured value Vd1 to an increase in the usage time increases rapidly from the vicinity exceeding the usage time h3 and exceeds the usage time h3, the number of mobile ions in the liquid crystal layer 5 rapidly increases and the liquid crystal panel 100 reaches the end of the life. Thus, the transition line W1 changes nonlinearly with respect to the usage time of the liquid crystal panel 100. For display quality, it has been confirmed that, after a time indicated by an arrow AR beyond the usage time h3, occurrence of stains or unevenness on a display screen becomes noticeable, a corresponding decrease in brightness also occurs, and thus the display quality is degraded.

In the determination circuit 45a, when the measured value of the detection electrode potential Vd1 falls below the threshold Vd_th, a control program for the central control circuit 45 is set up to report to the user or an administrator that the liquid crystal panel 100 is reaching the end of its life. Alternatively, as will be described below, the control program for the central control circuit 45 that can confirm a relationship between the usage time of the liquid crystal panel 100 up to now and the detection electrode potential Vd1 is set up.

The measured value of the detection electrode potential Vd1 to be compared with the threshold Vd_th may be an average value of a plurality of measured values. Further, the threshold Vd_th may be changed depending on a situation in which the liquid crystal panel 100 is used. For example, when higher display quality is required or when maintenance of the liquid crystal panel 100 takes time, the threshold Vd_th may be set to a detection electrode potential Vd1 h2 corresponding to the usage time h2 so that the report can be made early.

Further, the determination circuit 45a may determine the deterioration situation of the liquid crystal panel 100 based on the measured value of the detection electrode potential Vd2 obtained at the time of the end of the second discharging period T8. In this case, the threshold Vd_th to be compared with the measured value of the detection electrode potential Vd2 obtained at the time of the end of the second discharging period T8 may be set to a value different from the threshold Vd_th to be compared with the measured value of the detection electrode potential Vd1 obtained at the time of the end of the first discharging period T4.

1.5. Operations and Effects of First Reverse Sweep Period T1 and Second Reverse Sweep Period T5

As described above, in the present embodiment, the first reverse sweep period T1 is inserted at the beginning of the first measurement period T10, and the second reverse sweep period T5 is inserted at the beginning of the second measurement period T20. Thus, the mobile ions contained in the liquid crystal layer 5 can be effectively initially disposed in either the common electrode 21 or the detection electrode 30 immediately after the start of the first measurement period T10 and immediately after the start of the second measurement period T20. By adjusting an initial arrangement of the mobile ions in this manner, measurement reproducibility is easily obtained. Since the influence of an internal electric field due to the mobile ions is also reflected in the measured value, an increase in the mobile ions is likely to appear as a change in the measured value.

Each of the first reverse sweep period T1 and the second reverse sweep period T5 is preferably longer than one frame period. For example, each of the first reverse sweep period T1 and the second reverse sweep period T5 is equal to or longer than 20 ms. Thus, among the mobile ions contained in the liquid crystal layer 5, mobile ions having low mobility can also be effectively initially disposed. The mobile ions having low mobility are less likely to move in the liquid crystal layer 5. For that reason, when the first reverse sweep period T1 and the second reverse sweep period T5 are normal frame periods, it is difficult to control the initial arrangement of mobile ions having low mobility within the normal frame periods. Even if the measured value is obtained while the initial arrangement of mobile ions having low mobility cannot be controlled, sufficient measurement reproducibility may not be obtained.

Figure 9:
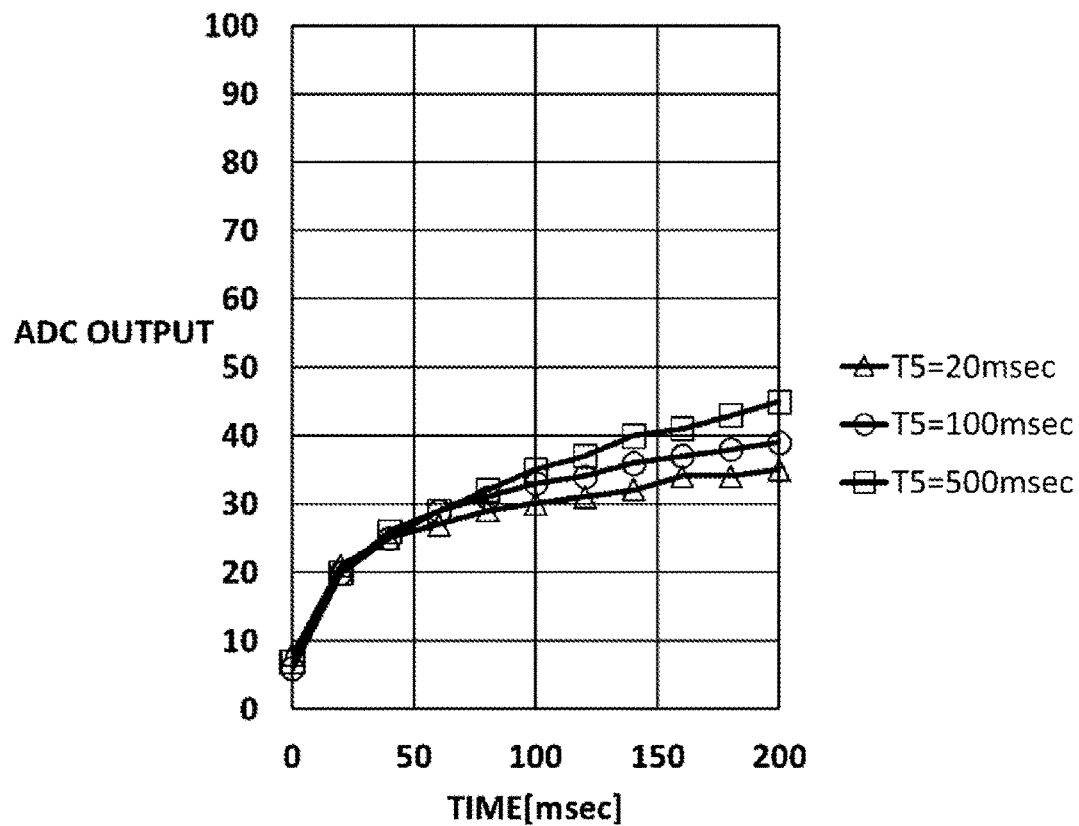
FIG. 9 is a diagram illustrating an effect of a reverse sweep period.

FIG. 9 is a diagram illustrating effects of the first reverse sweep period T1 and the second reverse sweep period T5. Detailed actual measurement data illustrated in FIG. 9 and subsequent figures is basically the result obtained by applying the voltage illustrated in FIG. 6 to the liquid crystal layer 5, and there is no problem in describing an action of the first reverse sweep period T1 or the like. FIG. 9 illustrates results of measuring the detection electrode potential Vd in the second discharging period T8 for each of a case where the second reverse sweep period T5 is 20 ms, a case where the second reverse sweep period T5 is 100 ms, and a case where the second reverse sweep period T5 is 500 ms. More specifically, the results illustrated in FIG. 9 are results of amplifying the detection electrode potential Vd in the second discharging period T8 by 11 times and performing measurement for each of the three cases at a very initial stage of a deterioration test of the liquid crystal panel 100.

In FIG. 9, a horizontal axis represents time from the start of discharging in the second discharging period T8, and a vertical axis represents the measured value of the detection electrode potential Vd in the second discharging period T8. The second discharging period T8 is 200 ms. In FIG. 9, a vertical axis represents the measured value of the detection electrode potential Vd as a digital value output from the A/D converter 44. In this measurement, an A/D converter with 10-bit specification is used as s, and a measured value 1023 corresponds to about 2.5 V.

As illustrated in FIG. 9, when the second reverse sweep period T5 is longer, the measured value at the time of the end of the second discharging period T8 becomes greater. The reason for this is considered to be, particularly, a result of effectively initially disposing the mobile ions having low mobility on one of the common electrode 21 and the detection electrode 30 by inserting the second reverse sweep period T5 at the beginning of the second measurement period T20. These results suggest that, by lengthening the first reverse sweep period T1 and the second reverse sweep period T5, progress of deterioration of the liquid crystal layer 5 can be tracked with higher sensitivity from the beginning of usage of the liquid crystal panel 100 Further, although FIG. 9 illustrates a difference at a very initial stage of the continuous acceleration test, effects of the second reverse sweep period T5 can be confirmed also in the measurement at the end of the test. The discharging characteristics clearly changed between the case where the second reverse sweep period T5 was 20 ms and the case where the second reverse sweep period T5 was 100 ms. Specifically, when the second reverse sweep period T5 was set to 100 ms, the measured value of the detection electrode potential Vd was clearly higher than that when the second reverse sweep period T5was set to 20 ms.

Figure 10:
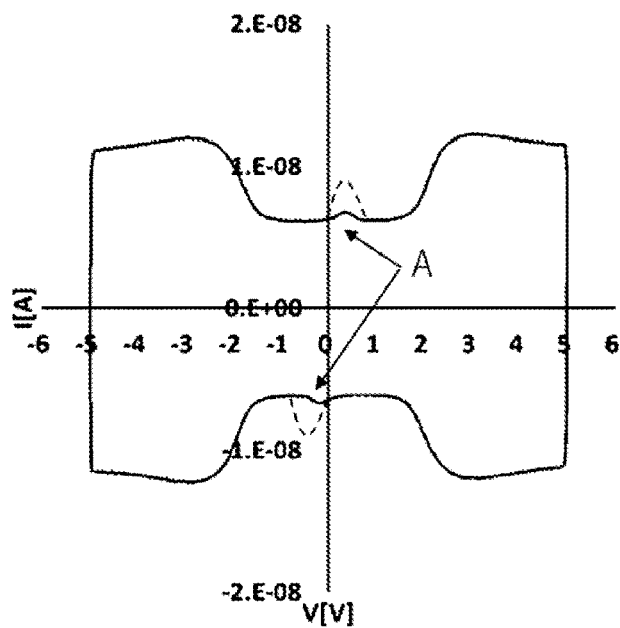
FIG. 10 is a diagram of electrical characteristics of the liquid crystal layer.

FIG. 10 is a diagram of electrical characteristics of the liquid crystal layer 5. The horizontal axis represents a voltage applied to the liquid crystal layer 5, and the vertical axis represents a current. The electrical characteristics can be obtained, for example, by measuring the current when a triangular wave voltage of +5 V of 0.1 Hz is applied to the liquid crystal layer 5. This scheme is a measurement method generally referred to as cyclic voltammetry. As indicated by reference sign A in FIG. 10, the current due to the mobile ions typically appears as an incremental current with respect to a charging current of the liquid crystal layer 5 and exhibits a peak current at a relatively small voltage. As the deterioration of the liquid crystal layer 5 progresses, this peak current appears as a large peak as indicated by a broken line, for example. In the above-described method, presence of mobile ions can be quantitatively evaluated using a dedicated precision measuring instrument, but it is not realistic in terms of cost to implement such a function in a projection display device using the liquid crystal device 1000. However, according to the configuration of the present application, the state of deterioration of the liquid crystal layer 5 can be quantified with a relatively simple circuit configuration.

A voltage applied to the liquid crystal layer 5 during the first reverse sweep period T1 and the second reverse sweep period T5 is preferably equal to or higher than the maximum applied voltage during the normal driving of the liquid crystal panel 100. In other words, it is preferable for the absolute value of the potential difference Vp1 in the first reverse sweep period T1 and the absolute value of the potential difference Vp4 in the second reverse sweep period T5 to be equal to or greater than the maximum applied voltage at the time of the normal driving of the liquid crystal panel 100. Thus, the measurement can be performed in a state in which the influence of a display state of the liquid crystal panel 100 before the measurement is performed has been curbed. The detection electrode 30 is provided along the outer edge of the display region E and observes the mobile ions diffusing from the display region E along a surface of the substrate. Incidentally, in each pixel P, movement of the mobile ions may be limited by a driving voltage. That is, whether the mobile ions exist on the common electrode 21 side or the detection electrode 30 side depends on the driving voltage of the pixel P and is uncontrolled. However, in the first reverse sweep period T1 and the second reverse sweep period T5, if the voltage applied to the liquid crystal layer 5 in the detection electrode 21 is set to be equal to or higher than the maximum applied voltage applied to the liquid crystal layer 5 during the normal driving in each pixel P, mobile ions that cannot be moved by normal driving can be controlled and initially disposed. Further, if the first reverse sweep period T1 and the second reverse sweep period T5 are set to be longer than one frame, moving distances of the mobile ions become longer than that during normal driving, which is effective for the initial arrangement. The voltage applied to the liquid crystal layer 5 in the first reverse sweep period T1 and the second reverse sweep period T5 may be equal to or higher than the threshold voltage Vth of the liquid crystal layer 5.

Figure 11:
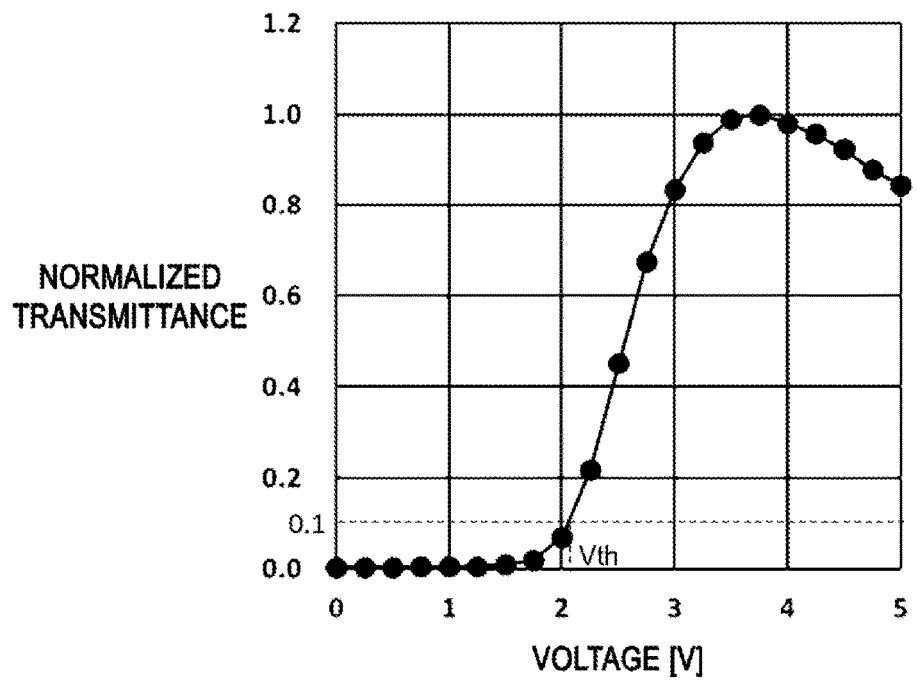
FIG. 11 is a diagram illustrating a relationship between a normalized transmittance of the liquid crystal layer and a voltage.

FIG. 11 is a graph showing a relationship between a normalized transmittance of the liquid crystal layer 5 and an applied voltage. Characteristics of the transmittance vary depending on a gap of the liquid crystal layer 5 and the liquid crystal material, but for example, when the liquid crystal panel 100 is a normally black type VA liquid crystal panel and the gap of the liquid crystal layer 5 is about 2.6 μm, the transmittance of the liquid crystal layer 5 becomes maximum when a voltage slightly lower than the 4 V is applied, as shown in FIG. 11. Accordingly, in the pixel P in a holding state during the normal driving of the liquid crystal panel 100, the maximum applied voltage of the liquid crystal layer 5 is set to a value slightly lower than 4 V. In this case, it is unknown whether mobile ions that move at a voltage of about 4 V applied to the liquid crystal layer 5, for example, during one frame period during the normal driving of the liquid crystal panel 100, in other words, during a polarity holding period of the pixel P are located on the common electrode 21 or the detection electrode 30. However, in the first reverse sweep period T1 and the second reverse sweep period T5, by applying a voltage of +5 V, which is equal to or higher than the maximum applied voltage during the normal driving of the liquid crystal panel 100, to the liquid crystal layer 5 for a period longer than one frame period, even the mobile ions that move at about 4 V can be effectively initially disposed on either the common electrode 21 or the detection electrode 30. Further, the maximum applied voltage may be determined by observing the potential supplied to the data line. For example, when the common electrode 21 is driven for display with a fixed potential, the maximum applied voltage is approximately half an amplitude of a data line supply potential when the liquid crystal panel 100 is displayed at the maximum gradation. In another example, when the potential of the common electrode 21 is inverted in accordance with the display polarity, the maximum applied voltage is approximately close to the amplitude of the data line supply potential when the liquid crystal panel 100 is set to the maximum gradation display.

Further, from FIG. 9, it is possible to pick up measured values in which the effects of the first reverse sweep period T1 and the second reverse sweep period T5 are not much reflected. Specifically, as illustrated in FIG. 9, in a period from a start point in time of the second discharging period T8 to about 50 ms, there is substantially no difference between the measured values obtained in the three cases. That is, in the second discharging period T8, there are two stages including a first stage from the start point in time of the second discharging period T8 to about 50 ms, and a second stage from about 50 ms to an end point in time of the second discharging period T8. It can be considered that the measured value in the first stage reflects behaviors of mobile ions having relatively high mobility, and the measured value in the second stage reflects behaviors of mobile ions having relatively low mobility.

Accordingly, when the mobile ions having relatively high mobility are focused, the measured value in the first stage may be adopted. On the other hand, when the mobile ions having relatively low mobility are focused, a difference between measured values obtained at two different times in the second stage may be adopted. For example, this is a difference between a measured value obtained at a point in time when 50 ms has elapsed from the start point in time of the second discharging period T8 and the measured value obtained at the end point in time of the second discharging period T8. Accordingly, the measured value may not be a measured value at the time of the end of the first discharging period T4 or the second discharging period T8.

1.6. Effects of First Relaxation Period T2 and Second Relaxation Period T6

As described above, in the present embodiment, the first relaxation period T2 is inserted between the first reverse sweep period T1 and the first charging period T3 in the first measurement period T10, and the second relaxation period T6 is inserted between the second reverse sweep period T5 and the second charging period T7 in the second measurement period T20. Thus, the influence of the dielectric anisotropy of the liquid crystal layer 5 can be avoided, and the measurement can be performed without moving the accumulated mobile ions.

As described above, for example, the threshold voltage Vth of the liquid crystal layer 5 is about 2.1 V. That is, if the voltage applied to the liquid crystal layer 5 during the first relaxation period T2 and the second relaxation period T6 is smaller than the threshold voltage Vth, the measurement can be performed while inhibiting the influence of the dielectric anisotropy of the liquid crystal layer 5. In other words, when the absolute value of the potential difference Vp2 in the first relaxation period T2 and the absolute value of the potential difference Vp5 in the second relaxation period T6 are greater than 0 V and smaller than the threshold voltage Vth, it is possible to perform the measurement while curbing the influence of the dielectric anisotropy of the liquid crystal layer 5. In other words, during the first charging period T3 and the second charging period T7, it is possible to inhibit movement of the mobile ions having high mobility. Also, when the liquid crystal layer 5 is charged and discharged at a low voltage, the mobile ions having high mobility can be efficiently captured and measured.

As described above, in the present embodiment, when the transition occurs from the first reverse sweep period T1 to the first relaxation period T2, a voltage applied to the liquid crystal layer 5 is switched from −5 V to −1.25 V without change in the polarity. Further, when transition occurs from the second reverse sweep period T5 to the second relaxation period T6, the voltage applied to the liquid crystal layer 5 is switched from +5 V to +1.25 V without change in the polarity. For that reason, lengths of the first relaxation period T2 and the second relaxation period T6 are set in consideration of a response time of the liquid crystal layer 5. In consideration of the response time of the liquid crystal layer 5, the first relaxation period T2 and the second relaxation period T6 are preferably set to be longer than one frame period. For example, the first relaxation period T2 and the second relaxation period T6 are 20 ms, 50 ms, or the like. In the case of a liquid crystal material having a rapid response, the time may be set to be shorter than 20 ms.

1.7. Effects of First Charging Period T3 and Second Charging Period T7

Basically, the first charging period T3 and the second charging period T7 are preferably as short as possible. The reason for this is that, when the first charging period T3 and the second charging period T7 are shortened, the action of the mobile ions having high mobility is easily captured as a change in the measured value. For example, the first charging period T3 and the second charging period T7 are preferably shorter than the one frame period at the time of the normal driving of the liquid crystal panel 100.

In this embodiment, the potential supplied to each of the common electrode 21 and the detection electrode 30 is controlled by the measurement circuit 200. The second capacitor C2 electrically coupled to the common electrode 21 has a relatively large capacitance value. Further, the third to fifth switches SW3 to SW5 are electrically coupled to the common electrode line L1. When on-resistances of the third to fifth switches SW3 to SW5 are large, it is difficult to shorten the first charging period T3 and the second charging period T7. For example, in commercially available switch ICs, an on-resistance at the time of 5 V driving is about 1 kΩ. For example, when a capacitance value of the second capacitor C2 is 0.2 μF, 5 τ is 1 ms. When lengths of the first charging period T3 and the second charging period T7 are set to about 5 τ and the amplification circuit 43 that amplifies the detection electrode potential Vd by about 10 times is used, this time constant τ is large enough to affect the measured value.

On the other hand, in the first discharging period T4 and the second discharging period T8, it is required to set off-resistances of the first switch SW1 and the second switch SW2 electrically coupled to the detection electrode 30 to sufficiently large values. When the off-resistances of the first switch SW1 and the second switch SW2 are small, this has an influence on holding of the potential of the first node N1, that is, the detection electrode potential Vd. Further, when the off-resistances of the first switch SW1 and the second switch SW2 vary greatly, this is likely to affect the measured value.

Thus, in the present embodiment, a configuration in which a relatively high second voltage of, for example, 15 V is applied to the third to fifth switches SW3 to SW5 is adopted in order to reduce the on-resistances of the third to fifth switches SW3 to SW5. On the other hand, in the present embodiment, a configuration in which a relatively low first voltage of, for example, 5 V is applied to the first switch SW1 and the second switch SW2 in order to increase the off-resistances of the first switch SW1 and the second switch SW2 is adopted. Further, driving the first switch SW1 and the second switch SW2 with the first voltage of 5 V means that the on-resistance of each switch increases. However, since the first capacitor C1 electrically coupled to a node of the detection electrode 30 has the capacitance value smaller than that of the second capacitors C2 electrically coupled to a node of the common electrode 21, it can be handled without problems in terms of time constant.

Also, in this embodiment, in consideration of responsiveness of the common electrode 21 during the normal driving of the liquid crystal panel 100, a configuration in which the fifth switch SW5 is also supplied with a relatively large second voltage of 15 V is adopted. For example, commercially available switch ICs can be used for the first to fifth switches SW1 to SW5. That is, a driving voltage of 5 V or 15 V is applied to switch ICs used as the first to fifth switches SW1 to SW5.

Figure 12:
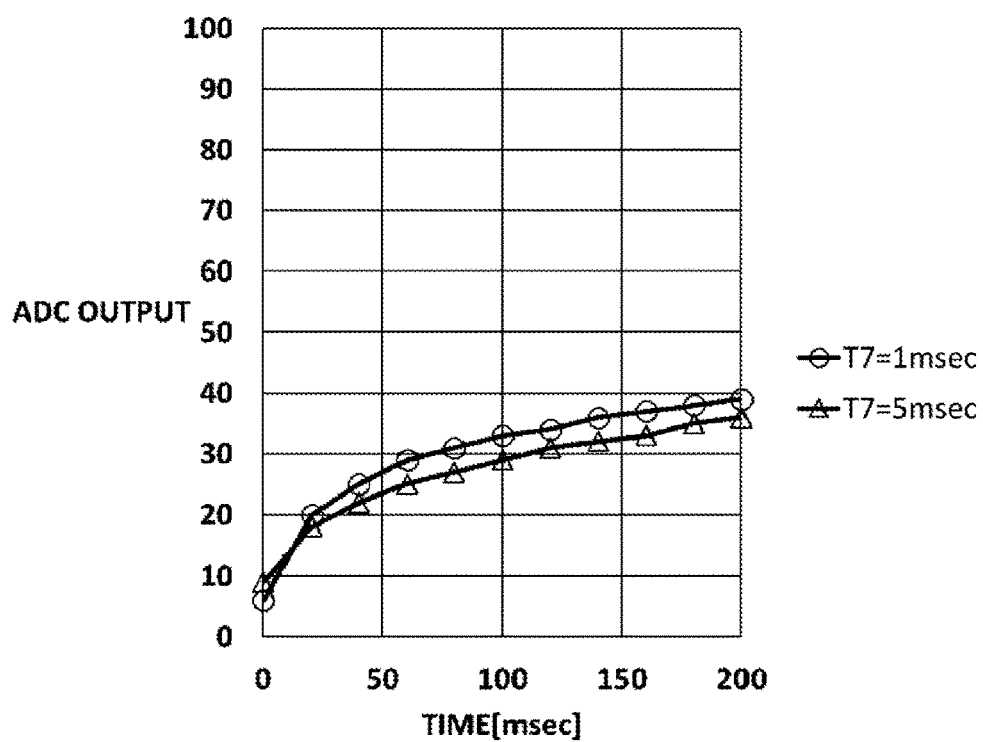
FIG. 12 is a diagram illustrating an effect of a charging period.

FIG. 12 is a diagram illustrating effects of the first charging period T3 and the second charging period T7. FIG. 12 illustrates results of measuring the detection electrode potential Vd in the second discharging period T8 for each of a case where the second charging period T7 is 1 ms and a case where the second charging period T7 is 5 ms. More specifically, the results are results of amplifying the detection electrode potential Vd in the second discharging period T8 by 11 times and performing the measurement for each of the two cases at the very initial stage of the deterioration test of the liquid crystal panel 100.

In FIG. 12, a horizontal axis represents time from the start of discharging in the second discharging period T8, and a vertical axis represents the measured value of the detection electrode potential Vd in the second discharging period T8. As an example, the second discharging period T8 is 200 ms. Further, in FIG. 12, the vertical axis represents the measured value of the detection electrode potential Vd as a digital value output from the A/D converter 44. In this measurement, an A/D converter with 10-bit specification is used as the A/D converter 44, and a measured value 1023 corresponds to about 2.5 V.

As illustrated in FIG. 12, when the second charging period T7 is shorter, the measured value at the time of the end of the second discharging period T8 is greater. The reason for this is considered to be a result of shortening of the second charging period T7 for curbing of the movement of the mobile ions in the second charging period T7 and efficient reflection of the action of the mobile ions having high mobility. These results suggest that, by shortening the first charging period T3 and the second charging period T7, the progress of deterioration of the liquid crystal layer 5 can be tracked with higher sensitivity from the beginning of usage of the liquid crystal panel 100.

When the results illustrated in FIG. 12 are observed in detail, the measured values obtained in the two cases appear to move substantially parallel to each other after 50 ms has elapsed from the start point in time of the second discharging period T8. That is, as described above, such a difference between the measured values is considered to be caused by the action of the mobile ions having relatively high mobility. Thus, lengths of the first reverse sweep period T1 and the second reverse sweep period T5, and the first charging period T3 and the second charging period T7 have different effects on the measured value.

1.8. Tracking of Progress of Deterioration of Liquid Crystal Layer 5

Figure 13:
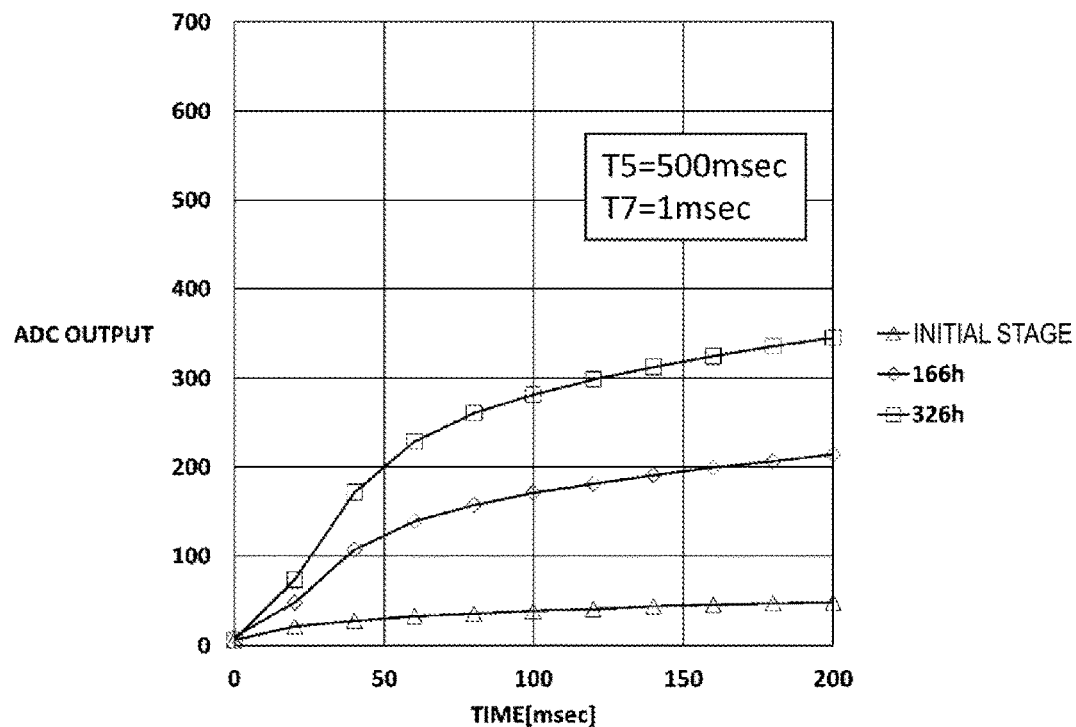
FIG. 13 is a first diagram illustrating results of tracking progress of deterioration of a liquid crystal layer.
Figure 14:
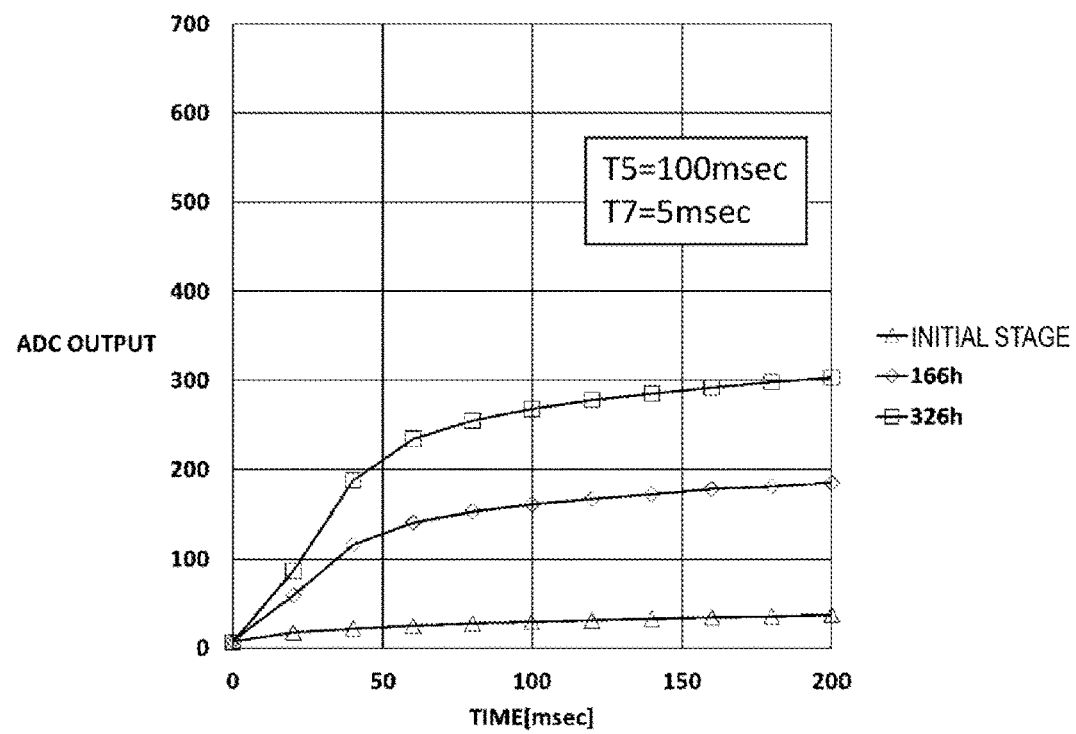
FIG. 14 is a second diagram illustrating results of tracking progress of deterioration of the liquid crystal layer.

FIG. 13 is a first diagram showing tracking results of the progress of deterioration of the liquid crystal layer 5. FIG. 14 is a second diagram showing tracking results of the progress of deterioration of the liquid crystal layer 5. Specifically, a continuous acceleration test in which the display region E was irradiated with blue light of 12 W/Cm2 for a predetermined time while the liquid crystal panel 100 is cooled to a condition of about 65° C. was performed. FIGS. 13 and 14 illustrate results of measuring the detection electrode potential Vd in the second discharging period T8 for each of a case where an irradiation time is 0 hours (initial), a case where the irradiation time is 166 hours, and a case where the irradiation time is 326 hours. Further, the results illustrated in FIG. 13 are results of measuring the detection electrode potential Vd in the second discharging period T8 under the condition that the second reverse sweep period T5 is set to 500 ms and the second discharging period T8 is set to 1 ms. The results illustrated in FIG. 14 are results of measuring the detection electrode potential Vd in the second discharging period T8 under the condition that the second reverse sweep period T5 is set to 100 ms and the second charging period T7 is set to 5 ms.

In FIGS. 13 and 14, a horizontal axis represents time from the start of discharging in the second discharging period T8, and a vertical axis represents the measured value of the detection electrode potential Vd in the second discharging period T8. The second discharging period T8 is 200 ms. Further, in FIGS. 13 and 14, the vertical axis represents the measured value obtained by amplifying the detection electrode potential Vd by 11 times as a digital value output from the A/D converter 44. In this measurement, an A/D converter with 10-bit specification is used as the A/D converter 44, and a measured value 1023 corresponds to about 2.5 V.

As shown in FIGS. 13 and 14, according to this embodiment, it can be seen that the progress of deterioration of the liquid crystal layer 5 can be tracked with higher sensitivity from the start of irradiation of the liquid crystal panel 100 with blue light, that is, from an initial stage of usage of the liquid crystal panel 100. In addition, in the liquid crystal panel 100 used in experiments, power supply wiring and the like of the peripheral circuit and the like are also disposed to reflect actual products, and thus the experimental results shown in FIGS. 13 and 14 are experimental results in which the influence of a parasitic capacitance of the detection electrode 30 is taken into consideration.

Accordingly, from the experimental results shown in FIGS. 13 and 14, it can be said that the liquid crystal device 1000 of this embodiment has sufficient practicability so that the progress of deterioration of the liquid crystal layer 5 can be detected as a change in voltage value.

1.9. Verification of Measurement Reproducibility

Figure 15:
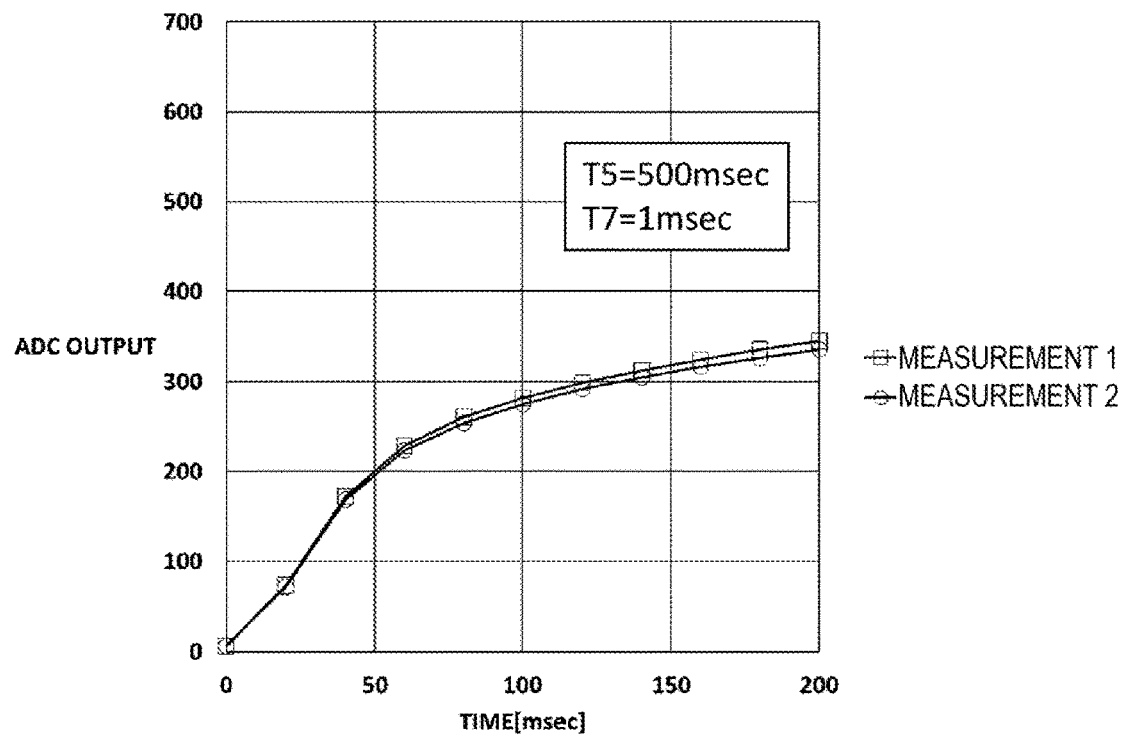
FIG. 15 is a first diagram illustrating results of verification of measurement reproducibility.
Figure 16:
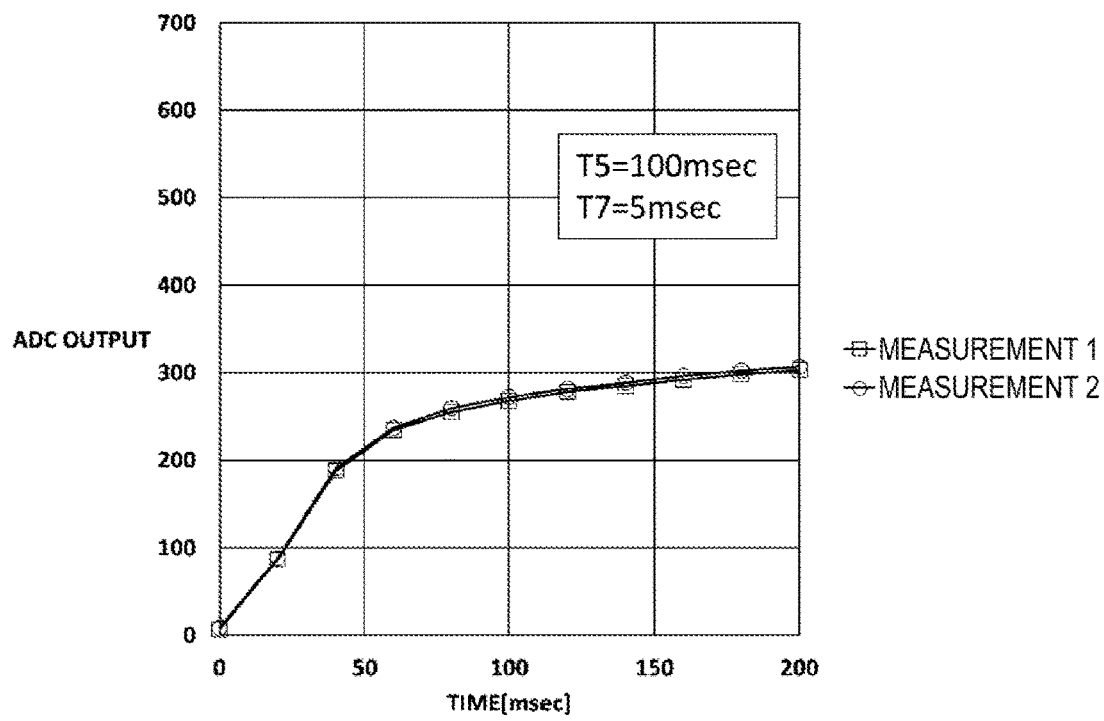
FIG. 16 is a second diagram illustrating results of verifying measurement reproducibility.

FIG. 15 is a first diagram illustrating results of verification of measurement reproducibility. FIG. 16 is a second diagram illustrating results of verifying measurement reproducibility. Specifically, FIG. 15 illustrates results acquired after 326 hours of the continuous acceleration test have elapsed in the experiment illustrated in FIG. 13. Similarly, FIG. 16 illustrates results acquired after 326 hours of the continuous acceleration test have elapsed in the experiment illustrated in FIG. 14. FIGS. 15 and 16 illustrate results of measuring the detection electrode potential Vd twice in the second discharging period T8 under respective measurement conditions. In FIGS. 15 and 16, measurement 1 indicates a first measurement result, and measurement 2 indicates a second measurement result. The second measurement was performed after a predetermined time had passed from the first measurement.

Further, the results illustrated in FIG. 15 are results of measuring the detection electrode potential Vd in the second discharging period T8 under the condition that the second reverse sweep period T5 is set to 500 ms and the second charging period T7 is set to 1 ms. The results illustrated in FIG. 16 are results of measuring the detection electrode potential Vd in the second discharging period T8 under the condition that the second reverse sweep period T5 is set to 100 ms and the second charging period T7 is set to 5 ms.

In FIGS. 15 and 16, a horizontal axis represents time from the start of discharging in the second discharging period T8, and a vertical axis represents the measured value of the detection electrode potential Vd in the second discharging period T8. The second discharging period T8 is 200 ms. Further, in FIGS. 15 and 16, the vertical axis represents the measured value obtained by amplifying the detection electrode potential Vd by 11 times as a digital value output from the A/D converter 44. In this measurement, an A/D converter with 10-bit specification is used as the A/D converter 44, and a measured value 1023 corresponds to about 2.5 V.

As illustrated in FIGS. 15 and 16, according to the present embodiment, it can be seen that the measurement can be performed with sufficient reproducibility. When there is no first reverse sweep period T1 and second reverse sweep period T5, there is a possibility that such measurement reproducibility cannot be obtained depending on what was done electrically to the liquid crystal layer 5 of the liquid crystal panel 100 before the measurement. For example, when the measurement including charging and discharging of +1.25 V (the first charging period T3 and the first discharging period T4 at −1.25 V, and the second charging period T7 and the second discharging period T8 at +1.25 V) in the detection electrode 30 is performed, a phenomenon in which the measured value changes before and after optical characteristics such as voltage-transmittance of the display region E in FIG. 11 are measured may occur.

Effects of First Embodiment

As described above, the liquid crystal apparatus 1000 of the first embodiment includes the detection electrode 30, the liquid crystal layer 5, the common electrode 21 facing the detection electrode 30 via the liquid crystal layer 5, and the measurement circuit 200 that supplies a potential to each of the detection electrode 30 and the common electrode 21 and measures the potential of the detection electrode 30. The measurement circuit 200 supplies the first potential V1 to the detection electrode 30 and supplies the second potential V2 higher than the first potential V1 to the common electrode 21 in the first reverse sweep period T1, supplies the first potential V1 to the detection electrode 30 and supplies the third potential V3 higher than the first potential V1 and lower than the second potential V2 to the common electrode 21 in the first relaxation period T2 after the first reverse sweep period T1, supplies the fourth potential V4 higher than the third potential V3 and lower than the second potential V2 to the detection electrode 30 and supplies the third potential V3 to the common electrode 21 in the first charging period T3 after the first relaxation period T2, and stops the supply of the potential to the detection electrode 30 and supplies the third potential V3 to the common electrode 21 in the first discharging period T4 after the first charging period T3.

As described above, in the present embodiment, the first reverse sweep period T1 is inserted before the first charging period T3 and the first discharging period T4. Thus, in the first reverse sweep period T1, the mobile ions included in the liquid crystal layer 5 can be effectively initially disposed in either the common electrode 21 or the detection electrode 30. For example, positive ions are initially disposed in an electrode to which a negative potential is supplied among the common electrode 21 and the detection electrode 30, and negative ions are initially disposed in an electrode to which a positive potential is supplied among the common electrode 21 and the detection electrode 30. In this way, by adjusting the initial arrangement of the mobile ions before the first charging period T3 starts, it is possible to obtain measurement reproducibility of the measured value of the detection electrode potential Vd obtained during the first discharging period T4. Further, since the influence of the internal electric field due to the mobile ions is also reflected in the measured value, it is easy for an increase in the mobile ions to appear as the change in the measured value. As a result, the progress of deterioration of the liquid crystal layer 5 can be tracked with higher sensitivity from the beginning of use of the liquid crystal panel 100.

Further, in the present embodiment, it is possible to perform transition from the first reverse sweep period T1 to the first charging period T3 without moving the mobile ions initially disposed in the first reverse sweep period T1 by inserting the first relaxation period T2 between the first reverse sweep period T1 and the first charging period T3. Accordingly, according to the present embodiment, the progress of deterioration of the liquid crystal layer 5 can be tracked with higher sensitivity from the initial stage of usage of the liquid crystal panel 100 with higher measurement reproducibility.

The common electrode 21 is often configured to include a stabilizing capacitor having a capacitance value of 0.1 μF or more for potential stabilization at the time of the normal driving. In the present embodiment, a general-purpose switch IC is used to switch the potential of the common electrode 21, but an on-resistance thereof may be about several kΩ. Therefore, when the potential of the common electrode 21 is changed in the first charging period T3, insufficient response may occur due to a large amount of potential change. Therefore, a slight potential variation of the common electrode 21 continues in the first discharging period T4, and a measured value of the potential of the detection electrode 30 is changed due to a coupling capacitance mainly formed of the liquid crystal layer 5.

In this regard, in the present embodiment, as illustrated in FIG. 5, the potential supplied to the common electrode 21 is fixed to the third potential V3 in the first relaxation period T2, the first charging period T3, and the first discharging period T4. In FIG. 5, the potential response from the potential V2 to the potential V3 of the common electrode 21 in the first relaxation period T2 is represented and drawn. This potential response results from change in the potential supplied to the common electrode 21 from the potential V2 to the potential V3. Similarly, the potential response of the common electrode 21 from the potential V1 to the potential V3 in the second relaxation period T6 results from change in the potential supplied to the common electrode 21 from the potential V1 to the potential V3. Therefore, it can be said that the potential supplied to the common electrode 21 is fixed to the third potential V3 in the first relaxation period T2 (second relaxation period T6). Although a time constant itself of the common electrode 21 is not shortened, the constant potential continues to be supplied to the common electrode 21 as described above, and only a slight potential variation due to a coupling capacitance between the detection electrode 30 and, mainly, the liquid crystal layer 5 is received at the time of the charging operation. As a result, a relaxation time until the potential of the common electrode 21 is restored to a predetermined potential (V3) is shortened. Therefore, time until the completion of charging is shortened, time from the start of charging to the start of discharging is shortened, and for example, it is easier for the action of mobile ions having high mobility to be observed. In other words, for example, when the charging time is about 5 ms, the high-mobility ions move during the charging period and the action thereof are likely to be missed, whereas according to the present embodiment, since the charging time can be shortened to 1 ms or less, for example, about 200 μs, present embodiment can be made suitable for observation of the high-mobility ions. For example, when the potential of the common electrode 21 is simply fixed to 5 V, it is necessary to apply a voltage of 10 V to the switch in order to apply a voltage of +5 V to the liquid crystal layer 5. In this case, a leakage current of the switch is likely to adversely affect the measurement when the detection electrode 30 is held.

The liquid crystal apparatus 1000 of the first embodiment further includes a plurality of pixel electrodes 9a disposed in the display region E, and the detection electrode 30 is provided outside the display region E.

Since the detection electrode 30 is adjacent to the vicinity of the display region E, it is easy for the mobile ions generated in the display region E to be detected. Therefore, it is possible to improve the sensitivity to an increase in the mobile ions involved in the deterioration of the liquid crystal layer 5.

In the liquid crystal apparatus 1000 of the first embodiment, the first reverse sweep period T1 is longer than one frame period of the display region E at the time of the normal driving, and the absolute value of the potential differences Vp1 between the detection electrode 30 and the common electrode 21 in the first reverse sweep period T1 is equal to or higher than the maximum applied voltage of the liquid crystal layer 5 in the display region E at the time of the normal driving.

As described above, by setting the first reverse sweep period T1 to be longer than one frame period, in particular, the mobile ions having low mobility can be effectively initially disposed in either the common electrode 21 or the detection electrode 30.

Further, it is possible to effectively initially dispose mobile ions moving at about the maximum applied voltage on one of the common electrode 21 and the detection electrode 30, by setting the absolute value of the potential difference Vp1 in the first reverse sweep period T1, that is, the voltage applied to the liquid crystal layer 5 in the first reverse sweep period T1 to be equal to or higher than the maximum applied voltage of the liquid crystal layer 5 in the display region E at the time of the normal driving.

Accordingly, according to the present embodiment, the progress of deterioration of the liquid crystal layer 5 can be tracked with higher sensitivity from the initial stage of usage of the liquid crystal panel 100 with higher measurement reproducibility.

In the liquid crystal apparatus 1000 of the first embodiment, an absolute value of the potential difference Vp2 between the detection electrode 30 and the common electrode 21 in the first relaxation period T2 is greater than 0 V and smaller than the threshold voltage Vth of the liquid crystal layer 5.

Thus, when the absolute value of the potential difference Vp2 in the first relaxation period T2, that is, the voltage applied to the liquid crystal layer 5 in the first relaxation period T2 is set to be greater than 0 V and smaller than the threshold voltage Vth of the liquid crystal layer 5, the effect of curbing the influence of the dielectric anisotropy of the liquid crystal layer 5 is enhanced.

Accordingly, according to the present embodiment, the progress of deterioration of the liquid crystal layer 5 can be tracked with higher sensitivity from the initial stage of usage of the liquid crystal panel 100 with higher measurement reproducibility.

In the liquid crystal apparatus 1000 of the first embodiment, the first charging period T3 is shorter than one frame period of the display region E at the time of the normal driving, and the absolute value of the potential difference Vp3 between the detection electrode 30 and the common electrode 21 in the first charging period T3 are greater than 0 V and smaller than the threshold voltage Vth of the liquid crystal layer 5.

In this way, by setting the first charging period T3 to be shorter than one frame period, the action of the mobile ions having high mobility can be easily captured as a change in the measured value.

Further, it is possible to set the detection electrode potential Vd in the first discharging period T4 while curbing the influence of the dielectric anisotropy of the liquid crystal layer 5, by setting the absolute value of the potential difference Vp3 in the first charging period T3, that is, the voltage applied to the liquid crystal layer 5 in the first charging period T3 to be greater than 0 V and smaller than the threshold voltage Vth of the liquid crystal layer 5.

Accordingly, according to the present embodiment, the progress of deterioration of the liquid crystal layer 5 can be tracked with higher sensitivity from the initial stage of usage of the liquid crystal panel 100 with higher measurement reproducibility.

In the liquid crystal apparatus 1000 of the first embodiment, the measurement circuit 200 supplies the second potential V2 to the detection electrode 30 and supplies the first potential V1 to the common electrode 21 in the second reverse sweep period T5 after the first discharging period T4, supplies the fourth potential V4 to the detection electrode 30 and supplies the third potential V3 to the common electrode 21 in the second relaxation period T6 after the second reverse sweep period T5, and supplies the first potential V1 to the detection electrode 30 and supplies the third potential V3 to the common electrode 21 in the second charging period T7 after the second relaxation period T6, and stops the supply of the potential to the detection electrode 30 and supplies the third potential V3 to the common electrode 21 in the second discharging period T8 after the second charging period T7.

As described above, in the present embodiment, the second reverse sweep period T5 is inserted before the second charging period T7 and the second discharging period T8. Thus, in the second reverse sweep period T5, the mobile ions included in the liquid crystal layer 5 can be effectively initially disposed in either the common electrode 21 or the detection electrode 30. In this way, by adjusting the initial arrangement of the mobile ions before the second charging period T7 starts, it is possible to obtain measurement reproducibility of the measured value of the detection electrode potential Vd obtained during the second discharging period T8. Further, since the influence of the internal electric field due to the mobile ions is also reflected in the measured value, it is easy for an increase in the mobile ions to appear as the change in the measured value. As a result, the progress of deterioration of the liquid crystal layer 5 can be tracked with higher sensitivity from the beginning of use of the liquid crystal panel 100.

Further, according to the present embodiment, since the liquid crystal layer 5 is AC-driven, it is possible to curb deterioration of the liquid crystal layer 5 caused by application of a DC voltage to the liquid crystal layer 5 at the time of measurement of the detection electrode potential Vd.

In the present embodiment, although the first measurement period T10 corresponding to the first measurement processing and the second measurement period T20 corresponding to the second measurement processing are alternately performed, the first measurement period T10 or the second measurement period T20 may be independently performed when the influence on the liquid crystal layer 5 is slight. Alternatively, the first measurement period T10 or the second measurement period T20 may be repeatedly performed.

In the present embodiment, it is possible to perform transition from the second reverse sweep period T5 to the second charging period T7 without moving the mobile ions initially disposed in the second reverse sweep period T5 by inserting the second relaxation period T6 between the second reverse sweep period T5 and the second charging period T7. Accordingly, according to the present embodiment, the progress of deterioration of the liquid crystal layer 5 can be tracked with higher sensitivity from the initial stage of usage of the liquid crystal panel 100 with higher measurement reproducibility.

In the present embodiment, as illustrated in FIG. 5, the potential supplied to the common electrode 21 is fixed to the third potential V3 in the second relaxation period T6, the second charging period T7, and the second discharging period T8. Therefore, the time until the completion of charging is shortened, the time from the start of charging to the start of discharging is shortened, and as a result, it is easier for the action of mobile ions having high mobility to be observed.

In the liquid crystal apparatus 1000 of the first embodiment, the second reverse sweep period T5 is longer than one frame period of the display region E at the time of the normal driving, and an absolute value of the potential difference Vp4 between the detection electrode 30 and the common electrode 21 in the second reverse sweep period T5 is equal to or higher than the maximum applied voltage of the liquid crystal layer 5 in the display region E at the time of the normal driving.

In this way, by setting the second reverse sweep period T5 to be longer than one frame period, in particular, the mobile ions having low mobility can be effectively initially disposed in either the common electrode 21 or the detection electrode 30. Further, it is possible to effectively initially dispose mobile ions moving at about the maximum applied voltage on one of the common electrode 21 and the detection electrode 30, by setting the absolute value of the potential difference Vp4 in the second reverse sweep period T5, that is, the voltage applied to the liquid crystal layer 5 in the second reverse sweep period T5 to be equal to or higher than the maximum applied voltage of the liquid crystal layer 5 in the display region E at the time of the normal driving.

Accordingly, according to the present embodiment, the progress of deterioration of the liquid crystal layer 5 can be tracked with higher sensitivity from the initial stage of usage of the liquid crystal panel 100 with higher measurement reproducibility.

In the liquid crystal apparatus 1000 of the first embodiment, the absolute value of the potential difference Vp5 between the detection electrode 30 and the common electrode 21 in the second relaxation period T6 is greater than 0 V and smaller than the threshold voltage Vth of the liquid crystal layer 5.

Thus, when the absolute value of the potential difference Vp5 in the second relaxation period T6, that is, the voltage applied to the liquid crystal layer 5 in the second relaxation period T6 is set to be greater than 0 V and smaller than the threshold voltage Vth of the liquid crystal layer 5, the effect of curbing the influence of the dielectric anisotropy of the liquid crystal layer 5 is enhanced.

Accordingly, according to the present embodiment, the progress of deterioration of the liquid crystal layer 5 can be tracked with higher sensitivity from the initial stage of usage of the liquid crystal panel 100 with higher measurement reproducibility.

In the liquid crystal apparatus 1000 of the first embodiment, the second charging period T7 is shorter than one frame period of the display region E at the time of the normal driving, and the absolute value of the potential difference Vp6 between the detection electrode 30 and the common electrode 21 in the second charging period T7 is greater than 0 V and smaller than the threshold voltage Vth of the liquid crystal layer 5.

In this way, by setting the second charging period T7 to be shorter than one frame period, the action of the mobile ions having high mobility can be easily captured as a change in the measured value.

Further, when the absolute value of the potential difference Vp6 in the second charging period T7, that is, the voltage applied to the liquid crystal layer 5 in the second charging period T7 is set to be greater than 0 V and smaller than the threshold voltage Vth of the liquid crystal layer 5, it is possible to measure the detection electrode potential Vd in the second discharging period T8 while curbing the influence of the dielectric anisotropy of the liquid crystal layer 5.

Accordingly, according to the present embodiment, the progress of deterioration of the liquid crystal layer 5 can be tracked with higher sensitivity from the initial stage of usage of the liquid crystal panel 100 with higher measurement reproducibility.

In the liquid crystal apparatus 1000 of the first embodiment, the measurement circuit 200 includes the first node N1 electrically coupled to the detection electrode 30, the common electrode line L1 electrically coupled to the common electrode 21, and the first potential line L2 to which the first potential V1 is applied, the first capacitor C1 electrically coupled between the first node N1 and the first potential line L2, the second capacitor C2 electrically coupled between the common electrode line L1 and the first potential line L2, the first switch SW1, the second switch SW2, the third switch SW3, the fourth switch SW4, the fifth switch SW5, the first feeder circuit 40 that outputs the first measurement potential Vs1 corresponding to the first reference voltage Vf1, the second feeder circuit 41 that outputs the second potential V2, the third feeder circuit 48 that outputs the third potential V3, the central control circuit 45 that outputs the first reference voltage Vs1 to the first feeder circuit 40 and controls the first to fifth switches SW1 to SW5, and the potential measurement circuit (the amplification circuit 43 and the A/D converter 44) that measures the potential of the first node N1 as the potential of the detection electrode 30.

The first node N1 is electrically coupled to the first potential line L2 via the first switch SW1. The first node N1 is electrically coupled to the output terminal of the first feeder circuit 40 via the second switch SW2. The common electrode line L1 is electrically coupled to the first potential line L2 via the third switch SW3. The common electrode line L1 is electrically coupled to the output terminal of the third feeder circuit 48 via the fourth switch SW4. The common electrode line L1 is electrically coupled to the output terminal of the second feeder circuit 41 via the fifth switch SW5.

It is possible to realize functions required for the measurement circuit 200 with a simple circuit configuration and to reduce a noise component included in the measured value of the potential of the detection electrode 30 by using the measurement circuit 200 having the above configuration.

In the liquid crystal apparatus 1000 of the first embodiment, the first switch SW1 and the second switch SW2 are controlled so that the first switch SW1 and the second switch SW2 come to the ON state by the first voltage (5 V), and the third switch SW3, the fourth switch SW4, and the fifth switch SW5 are controlled by the second voltage (15 V) higher than the first voltage so that the third switch SW3, the fourth switch SW4, and the fifth switch SW5 come to the ON state.

Thus, since the third to fifth switches SW3 to SW5 electrically coupled to the common electrode line L1 are controlled by a relatively high second voltage so that the third to fifth switches SW3 to SW5 come to the ON state, the on-resistances of the third to fifth switches SW3 to SW5 can be reduced, and thus, it is possible to improve the responsiveness of the common electrode line L1 and to curb a leakage current from the detection electrode 30.

As a result, since the first charging period T3 and the second charging period T7 can be shortened, the action of the mobile ions having high mobility can be captured as a change in the measured value, and the influence of variations in characteristics of each switch component on the measured value can be inhibited. Further, the first switch SW1 and the second switch SW2 are preferably not integrated with the central control circuit 45. For example, the first switch SW1 and the second switch SW2 are mounted as an IC chip A, and the central control circuit 45 is mounted as an IC chip B. The central control circuit 45 may include a circuit system driven at high speed and may generate heat to reach a higher temperature. Accordingly, when the first switch SW1 and the second switch SW2 are not integrated with the central control circuit 45, an increase in temperature of the first switch SW1 and the second switch SW2 is reduced, and a leakage current through each switch is curbed. As a result, a change in the potential of the detection electrode 30 during the first discharging period T4 or the second discharging period T8 is more dominated by the action of the mobile ions, which is more suitable for measurement.

2. Second Embodiment

Hereinafter, a second embodiment of the present disclosure will be described. In each form illustrated below, the same reference numerals as those used in the first embodiment will be assigned to configurations common to the first embodiment, and detailed description thereof will be omitted as appropriate.

2.1. Outline of configuration of Liquid Crystal Device 2000

Figure 17:
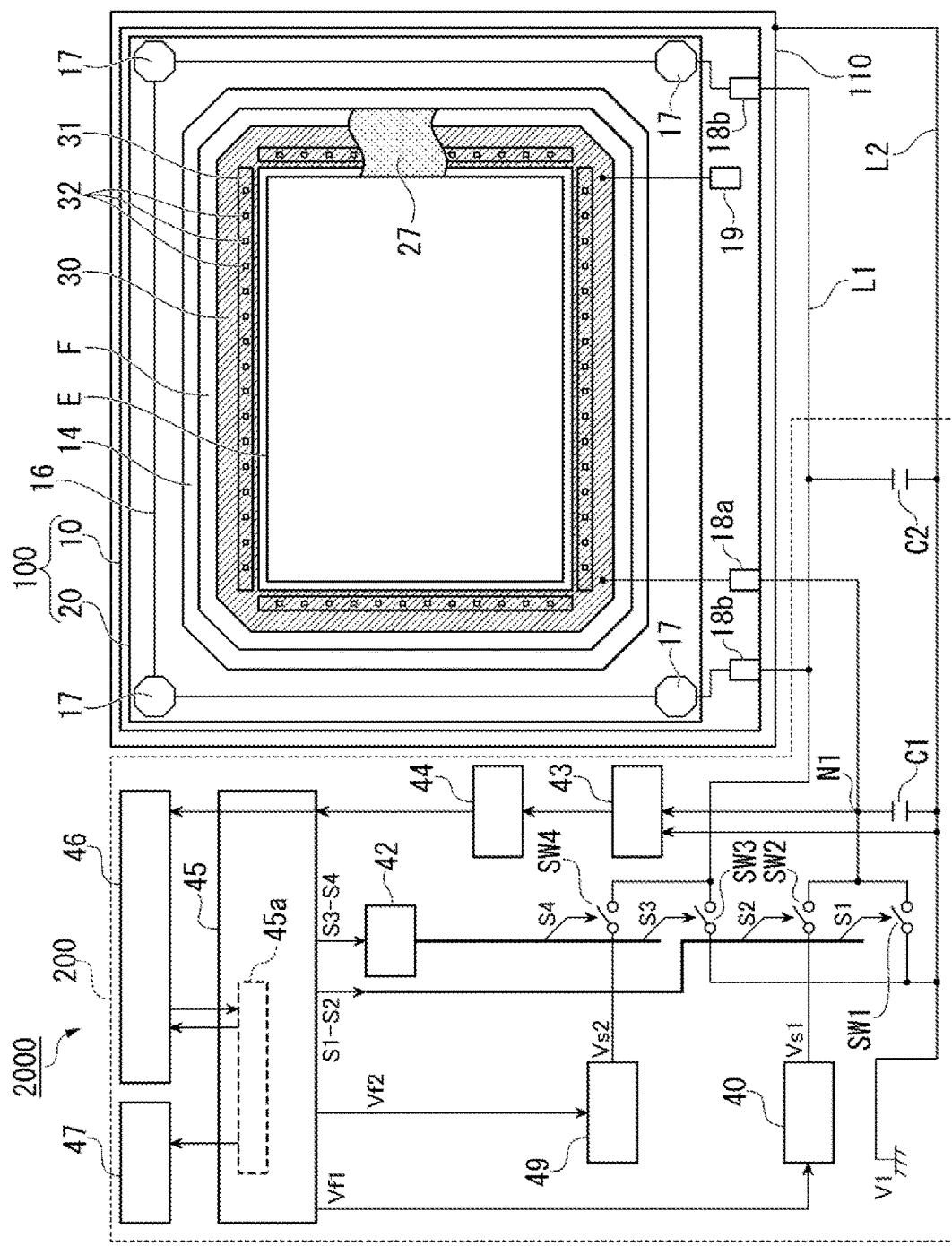
FIG. 17 is an explanatory diagram showing a schematic configuration of a liquid crystal device according to a second embodiment.

FIG. 17 is an explanatory diagram showing a schematic configuration of a liquid crystal device 2000 of the second embodiment. The liquid crystal device 2000 includes the same liquid crystal panel 100 as that of the first embodiment and a measurement circuit 300 different from that of the first embodiment.

The measurement circuit 300 includes the first feeder circuit 40, the fourth feeder circuit 49, the level shifter 42, an amplification circuit 43, an A/D converter 44, the central control circuit 45, the measured value storage circuit 46, the display information generation circuit 47, the first switch SW1, the second switch SW2, the third switch SW3, the fourth switch SW4, the first capacitor C1, the second capacitor C2, the common electrode line L1, the first potential line L2, and the first node N1.

The common electrode line L1 is electrically coupled to the second electrode coupling terminals 18b of the liquid crystal panel 100. That is, the common electrode line L1 is electrically coupled to the common electrode 21 via the second electrode coupling terminals 18b. The first potential line L2 is electrically coupled to a ground of the digital circuit system in the liquid crystal apparatus 2000 at one point. The first potential line L2 is electrically coupled to the common electrode line L1 via the second capacitor C2. That is, the second capacitor C2 is electrically coupled between the common electrode line L1 and the first potential line L2. Further, the first potential line L2 is electrically coupled to the holder 110 of the liquid crystal panel 100.

The first node N1 in the measurement circuit 300 is electrically coupled to the first electrode coupling terminal 18a of the liquid crystal panel 100. That is, the first node N1 is electrically coupled to the detection electrode 30 via the first electrode coupling terminal 18a. The first node N1 is electrically coupled to the first potential line L2 via the first switch SW1. The first node N1 is electrically coupled to the output terminal of the first feeder circuit 40 via the second switch SW2. The first node N1 is electrically coupled to the first potential line 12 via the first capacitor C1. That is, the first capacitor C1 is electrically coupled between the first node N1 and the first potential line L2.

A state of the first switch SW1 is controlled by a first control signal S1 output from the central control circuit 45. For example, as the first control signal S1, a logic signal having an amplitude of 5 V is output from the central control circuit 45, and the first switch SW1 comes to an ON state at a logic "H". A state of the second switch SW2 is controlled by a second control signal S2 output from the central control circuit 45. For example, as the second control signal S2, the logic signal having an amplitude of 5 V is output from the central control circuit 45, and the second switch SW2 comes to an ON state at the logic "H". That is, the first switch SW1 and the second switch SW2 are controlled so that the first switch SW1 and the second switch SW2 come to an ON state by the first voltage (5 V).

The common electrode line L1 is electrically coupled to the first potential line L2 via the third switch SW3. The common electrode line L1 is electrically coupled to an output terminal of the fourth feeder circuit 49 via the fourth switch SW4.

A state of the third switch SW3 is controlled by the third control signal S3 output from the central control circuit 45 via the level shifter 42. For example, the logic signal having an amplitude of 5 V is output from the central control circuit 45 as the third control signal S3, but this logic signal is converted into, for example, the logic signal having an amplitude of 15 V by the level shifter 42. That is, the third control signal S3 having an amplitude of 15 V is output from the level shifter 42, and the third switch SW3 comes to an ON state at the logic "H".

A state of the fourth switch SW4 is controlled by a fourth control signal S4 output from the central control circuit 45 via the level shifter 42. For example, as the fourth control signal S4, the logic signal having an amplitude of 5 V is output from the central control circuit 45, but this logic signal is converted into, for example, the logic signal having an amplitude of 15 V by the level shifter 42. That is, the fourth control signal S4 having an amplitude of 15 V is output from the level shifter 42, and the fourth switch SW4 comes to an ON state at the logic "H".

As described above, the third switch SW3 and the fourth switch SW4 are controlled so that the third switch SW3 and the fourth switch SW4 come to the ON state by the second voltage (15 V) higher than the first voltage (5 V).

The first feeder circuit 40 outputs a first measurement potential Vs1 corresponding to the first reference voltage Vf1 output from the central control circuit 45. For example, the first feeder circuit 40 outputs the first measurement potential Vs1 having the same polarity and absolute value as the first reference voltage Vf1. That is, the first measurement potential Vs1 output from the first feeder circuit 40 is variably controlled by the central control circuit 45. The first feeder circuit 40 can be realized by, for example, a voltage follower to which the first reference voltage Vf1 is input.

The fourth feeder circuit 49 outputs a second measurement potential Vs2 corresponding to the second reference voltage Vf2 output from the central control circuit 45. For example, the fourth feeder circuit 49 outputs the second measurement potential Vs2 having the same polarity and absolute value as the second reference voltage Vf2. That is, the second measurement potential Vs2 output from the fourth feeder circuit 49 is variably controlled by the central control circuit 45. The fourth feeder circuit 49 can be realized by, for example, a voltage follower to which the second reference voltage Vf2 is input.

The central control circuit 45 controls each circuit included in the measurement circuit 300 at the time of measuring the deterioration situation of the liquid crystal layer 5. To be specific, the central control circuit 45 outputs the first reference voltage Vf1 to the first feeder circuit 40 and outputs the second reference voltage Vf2 to the fourth feeder circuit 49. The central control circuit 45 outputs the first control signal S1 to the first switch SW1 and outputs the second control signal S2 to the second switch SW2. The central control circuit 45 outputs the third control signal S3 and the fourth control signal S4 to the third switch SW3 and the fourth switch SW4 via the level shifter 42. Thus, the central control circuit 45 according to the second embodiment corresponds to a control circuit that outputs the first reference voltage Vf1 to the first feeder circuit 40, outputs the second reference voltage Vf2 to the fourth feeder circuit 49, and controls the first to fourth switches SW1 and SW4.

In the normal driving of the liquid crystal panel 100, the central control circuit 45 outputs the first reference voltage Vf1 of +5 V to the first feeder circuit 40 and outputs the second reference voltage Vf2 of +5 V to the fourth feeder circuit 49. Accordingly, at the time of the normal driving, the first measurement potential Vs1 of +5 V is output from the first feeder circuit 40, and the second measurement potential Vs2 of +5 V is output from the fourth feeder circuit 49. Further, at the time of the normal driving, the central control circuit 45 controls the second switch SW2 and the fourth switch SW4 so that the second switch SW2 and the fourth switch SW4 come to the ON state and controls the first switch SW1 and the third switch SW3 so that the first switch SW1 and the third switch SW3 come to the OFF state. Accordingly, at the time of the normal driving, the output terminal of the first feeder circuit 40 is electrically coupled to the detection electrode 30, and the output terminal of the fourth feeder circuit 49 is electrically coupled to the common electrode 21.

Therefore, at the time of the normal driving, the first measurement potential Vs1 of +5 V is supplied to the detection electrode 30, and the second measurement potential Vs2 of +5 V is supplied to the common electrode 21. That is, at the time of the normal driving, the potential of the detection electrode 30 is +5 V, which is the same as the potential of the common electrode 21. In the normal driving, the second measurement potential Vs2 of +5 V output from the fourth feeder circuit 49 is used as the common potential.

Further, in the non-operation in which the normal driving, and physical property measurement of the liquid crystal layer 5 are not performed, the central control circuit 45 controls the first switch SW1 and the third switch SW3 so that the first switch SW1 and the third switch SW3 come to the ON state, and controls the second switch SW2 and the fourth switch SW4 so that the second switch SW2 and the fourth switch SW4 come to the OFF state. Accordingly, in the non-operation, the detection electrode 30 and the common electrode 21 are electrically coupled to the first potential line L2. Therefore, in the non-operation, the potential of each of the detection electrode 30 and the common electrode 21 becomes the first potential V1, that is, 0 V.

Among circuits included in the measurement circuit 300, circuits other than the circuits described above are the same as the circuits included in the measurement circuit 200 of the first embodiment.

2.2. Description of First Measurement Processing and Second Measurement Processing in Second Embodiment The central control circuit 45 in in the second embodiment alternately executes the first measurement processing and the second measurement processing until the count value K becomes equal to the upper limit value Kmax, as in the first embodiment. The content of the first measurement processing and the second measurement processing in the second embodiment are different from the content of the first measurement processing and the second measurement processing in the first embodiment. This is because the fourth feeder circuit 49 is used instead of the second feeder circuit 41 and the third feeder circuit 48 in the second embodiment. The potential control for the detection electrode 30 and the common electrode 21 is the same as that in the first embodiment.

Hereinafter, the first measurement processing and the second measurement processing according to the second embodiment will be described in detail with reference to FIGS. 5 and 6. Since the operation of the measurement circuit 300 in the reset period TO is the same as that in the first embodiment, description thereof will be omitted.

First, the first measurement processing performed in the first measurement period T10 will be described.

In the first reverse sweep period T1, the measurement circuit 300 supplies the first potential V1 to the detection electrode 30 and supplies the second potential V2 to the common electrode 21.

Specifically, in the first reverse sweep period T1, the central control circuit 45 outputs, for example, the second reference voltage Vf2 of +5 V to the fourth feeder circuit 49. Accordingly, the second measurement potential Vs2 of +5 V is output from the fourth feeder circuit 49. Further, in the first reverse sweep period T1, the central control circuit 45 controls the first switch SW1 and the fourth switch SW4 so that the first switch SW1 and the fourth switch SW4 come to the ON state, and controls the second switch SW2 and the third switch SW3 so that the second switch SW2 and the third switch SW3 come to the OFF state.

In the first reverse sweep period T1, the central control circuit 45 controls the first to fourth switches SW1 to SW4 as described above, so that the detection electrode 30 is electrically coupled to the first potential line L2, and the common electrode 21 is electrically coupled to the output terminal of the fourth feeder circuit 49. Thus, in the first reverse sweep period T1, the first potential V1 is supplied to the detection electrode 30, and the second measurement potential Vs2 of +5 V is supplied to the common electrode 21 as the second potential V2. As a result, as illustrated in FIG. 5, in the first reverse sweep period T1, the detection electrode potential Vd becomes 0 V, and the common electrode potential Vc becomes +5 V. Further, as illustrated in FIG. 6, in the first reverse sweep period T1, the potential difference Vp1 between the detection electrode 30 and the common electrode 21 becomes −5 V.

In the first relaxation period T2 after the first reverse sweep period T1, the measurement circuit 300 supplies the first potential V1 to the detection electrode 30 and supplies the third potential V3 to the common electrode 21.

Specifically, in the first relaxation period T2, the central control circuit 45 outputs, for example, the second reference voltage Vf2 of +1.25 V to the fourth feeder circuit 49. Accordingly, the second measurement potential Vs2 of +1.25 V is output from the fourth feeder circuit 49. Further, in the first relaxation period T2, the central control circuit 45 controls the first switch SW1 and the fourth switch SW4 so that the first switch SW1 and the fourth switch SW4 come to the ON state, and controls the second switch SW2 and the third switch SW3 so that the second switch SW2 and the third switch SW3 come to the OFF state.

In the first relaxation period T2, the central control circuit 45 controls the first to fourth switches SW1 to SW4 as described above, so that the detection electrode 30 is electrically coupled to the first potential line L2, and the common electrode 21 is electrically coupled to the output terminal of the fourth feeder circuit 49. Accordingly, in the first relaxation period T2, the first potential V1 of 0 V is supplied to the detection electrode 30, and the second measurement potential Vs2 of +1.25 V is supplied to the common electrode 21 as the third potential V3. As a result, as illustrated in FIG. 5, in the first relaxation period T2, the detection electrode potential Vd becomes 0 V, and the common electrode potential Vc becomes +1.25 V. Further, as illustrated in FIG. 6, in the first relaxation period T2, the potential difference Vp2 between the detection electrode 30 and the common electrode 21 becomes −1.25 V.

In the first charging period T3 after the first relaxation period T2, the measurement circuit 300 supplies the fourth potential V4 to the detection electrode 30 and supplies the third potential V3 to the common electrode 21.

To be specific, for example, in the first charging period T3, the central control circuit 45 outputs the first reference voltage Vf1 of +2.5 V to the first feeder circuit 40 and outputs the second reference voltage Vf2 of +1.25 V to the fourth feeder circuit 49. Accordingly, the first measurement potential Vs1 of +2.5 V is output from the first feeder circuit 40, and the second measurement potential Vs2 of +1.25 V is output from the fourth feeder circuit 49. Further, in the first charging period T3, the central control circuit 45 controls the second switch SW2 and the fourth switch SW4 so that the second switch SW2 and the fourth switch SW4 come to the ON state and controls the first switch SW1 and the third switch SW3 so that the first switch SW1 and the third switch SW3 come to the OFF state.

In the first charging period T3, the central control circuit 45 controls the first to fourth switches SW1 to SW4 as described above, so that the detection electrode 30 is electrically coupled to the output terminal of the first feeder circuit 40, and the common electrode 21 is electrically coupled to the output terminal of the fourth feeder circuit 49. Accordingly, in the first charging period T3, the first measurement potential Vs1 of +2.5 V is supplied to the detection electrode 30 as the fourth potential V4, and the second measurement potential Vs2 of +1.25 V is supplied to the common electrode 21 as the third potential V3. As a result, as illustrated in FIG. 5, in the first charging period T3, the detection electrode potential Vd becomes +2.5 V, and the common electrode potential Vc becomes +1.25 V. Further, as illustrated in FIG. 6, in the first charging period T3, the potential difference Vp3 between the detection electrode 30 and the common electrode 21 becomes +1.25 V.

In the first discharging period T4 after the first charging period T3, the measurement circuit 300 stops supplying the potential to the detection electrode 30 and supplies the third potential V3 to the common electrode 21 to measure the detection electrode potential Vd at least once, for example, at the time of the end of the first discharging period T4.

Specifically, in the first discharging period T4, the central control circuit 45 outputs the second reference voltage Vf2 of +1.25 V to the fourth feeder circuit 49. Accordingly, the second measurement potential Vs2 of +1.25 V is output from the fourth feeder circuit 49. Further, in the first discharging period T4, the central control circuit 45 controls the fourth switch SW4 so that the fourth switch SW4 comes to the ON state, and controls the first switch SW1, the second switch SW2, and the third switch SW3 so that the first switch SW1, the second switch SW2, and the third switch SW3 come to the OFF state.

In the first discharging period T4, the central control circuit 45 controls the first to fourth switches SW1 to SW4 as described above, so that the detection electrode 30 are electrically decoupled from both the first feeder circuit 40 and the first potential line L2, and the common electrode 21 are electrically coupled to the output terminal of the fourth feeder circuit 49. Accordingly, in the first discharging period T4, the third potential V3 of +1.25 V is continuously supplied to the common electrode 21, but since the supply of the potential to the detection electrode 30 is stopped, the liquid crystal layer 5 discharges charge accumulated the first charging period T3. As a result, as illustrated in FIG. 5, in the first discharging period T4, the detection electrode potential Vd1 gradually changes from the fourth potential V4 to the third potential V3 applied to the common electrode 21 and reaches the potential Vd1 at time t5.

For example, the central control circuit 45 measures the detection electrode potential Vd1 at time t5 when the first discharging period T4 ends. Specifically, the detection electrode potential Vd1 is amplified by the amplification circuit 43, and an output of the amplification circuit 43 is input to the A/D converter 44. The central control circuit 45 acquires a digital value output from the A/D converter 44 at time t5 as the measured value of the detection electrode potential Vd1. The central control circuit 45 stores the measured value of the detection electrode potential Vd1 obtained at time t5 in the measured value storage circuit 46.

Next, the second measurement processing performed in the second measurement period T20 will be described.

In the second reverse sweep period T5 after the first discharging period T4, the measurement circuit 300 supplies the second potential V2 to the detection electrode 30 and supplies the first potential V1 to the common electrode 21.

Specifically, in the second reverse sweep period T5, the central control circuit 45 outputs, for example, the first reference voltage Vf1 of +5 V to the first feeder circuit 40. Accordingly, the first measurement potential Vs1 of +5 V is output from the first feeder circuit 40. In the second reverse sweep period T5, the central control circuit 45 controls the second switch SW2 and the third switch SW3 so that the second switch SW2 and the third switch SW3 come to the ON state, and controls the first switch SW1 and the fourth switch SW4 so that the first switch SW1 and the fourth switch SW4 come to the OFF state.

In the second reverse sweep period T5, the central control circuit 45 controls the first to fourth switches SW1 to SW4 as described above, so that the detection electrode 30 is electrically coupled to the output terminal of the first feeder circuit 40, and the common electrode 21 is electrically coupled to the first potential line L2. Accordingly, in the second reverse sweep period T5, the first measurement potential Vs1 of +5 V is supplied to the detection electrode 30 as the second potential V2, and the first potential V1 of 0 V is supplied to the common electrode 21. As a result, as illustrated in FIG. 5, in the second reverse sweep period T5, the detection electrode potential Vd becomes +5 V, and the common electrode potential Vc becomes 0 V. Further, as illustrated in FIG. 6, in the second reverse sweep period T5, the potential difference Vp4 between the detection electrode 30 and the common electrode 21 becomes +5 V.

In the second relaxation period T6 after the second reverse sweep period T5, the measurement circuit 300 supplies the fourth potential V4 to the detection electrode 30 and supplies the third potential V3 to the common electrode 21.

For example, in the second relaxation period T6, the central control circuit 45 outputs the first reference voltage Vf1 of +2.5 V to the first feeder circuit 40 and outputs the second reference voltage Vf2 of +1.25 V to the fourth feeder circuit 49. Accordingly, the first measurement potential Vs1 of +2.5 V is output from the first feeder circuit 40, and the second measurement potential Vs2 of +1.25 V is output from the fourth feeder circuit 49. Further, in the second relaxation period T6, the central control circuit 45 controls the second switch SW2 and the fourth switch SW4 so that the second switch SW2 and the fourth switch SW4 come to the ON state and controls the first switch SW1 and the third switch SW3 so that the first switch SW1 and the third switch SW3 come to the OFF state.

In the second relaxation period T6, the central control circuit 45 controls the first to fifth switches SW1 to SW5 as described above, so that the detection electrode 30 is electrically coupled to the output terminal of the first feeder circuit 40, and the common electrode 21 is electrically coupled to the output terminal of the fourth feeder circuit 49. Accordingly, in the second relaxation period T6, the first measurement potential Vs1 of +2.5 V is supplied to the detection electrode 30 as the fourth potential V4, and the second measurement potential Vs2 of +1.25 V is supplied to the common electrode 21 as the third potential V3. As a result, as illustrated in FIG. 5, in the second relaxation period T6, the detection electrode potential Vd becomes +2.5 V, and the common electrode potential Vc becomes +1.25 V. Further, as illustrated in FIG. 6, in the second relaxation period T6, the potential difference between the detection electrode 30 and the common electrode 21 becomes +1.25 V.

In the second charging period T7 after the second relaxation period T6, the measurement circuit 300 supplies the first potential V1 to the detection electrode 30 and supplies the third potential V3 to the common electrode 21.

Specifically, in the second charging period T7, the central control circuit 45 outputs the second reference voltage Vf2 of +1.25 V to the fourth feeder circuit 49. Accordingly, the second measurement potential Vs2 of +1.25 V is output from the fourth feeder circuit 49. Further, in the second charging period 17, the central control circuit 45 controls the first switch SW1 and the fourth switch SW4 so that the first switch SW1 and the fourth switch SW4 come to the ON state, and controls the second switch SW2 and the third switch SW3 so that the second switch SW2 and the third switch SW3 come to the OFF state.

In the second charging period T7, the central control circuit 45 controls the first to fourth switches SW1 to SW4 as described above, so that the detection electrode 30 is electrically coupled to the first potential line L2, and the common electrode 21 is electrically coupled to the output terminal of the fourth feeder circuit 49. Accordingly, in the second charging period T7, the first potential V1 of 0 V is supplied to the detection electrode 30, and the second measurement potential Vs2 of +1.25 V is supplied to the common electrode 21 as the third potential V3. As a result, as illustrated in FIG. 5, in the second charging period T7, the detection electrode potential Vd becomes +0 V, and the common electrode potential Vc becomes +1.25 V. Further, as illustrated in FIG. 6, in the second charging period T7, the potential difference Vp6 between the detection electrode 30 and the common electrode 21 becomes −1.25 V.

In the second discharging period T8 after the second charging period T7, the measurement circuit 300 stops supplying the potential to the detection electrode 30 and supplies the third potential V3 to the common electrode 21 to measure the detection electrode potential Vd at least once, for example, at the time of the end of the second discharging period T8.

Specifically, in the second discharging period T8, the central control circuit 45 outputs the second reference voltage Vf2 of +1.25 V to the fourth feeder circuit 49. Accordingly, the second measurement potential Vs2 of +1.25 V is output from the fourth feeder circuit 49. Further, in the second discharging period T8, the central control circuit 45 controls the fourth switch SW4 so that the fourth switch SW4 comes to the ON state, and controls the first switch SW1, the second switch SW2, and the third switch SW3 so that the first switch SW1, the second switch SW2, and the third switch SW3 come to the OFF state.

In the second discharging period T8, the central control circuit 45 controls the first to fourth switches SW1 to SW4 as described above, so that the detection electrode 30 are electrically decoupled from both the first feeder circuit 40 and the first potential line L2, and the common electrode 21 are electrically coupled to the output terminal of the fourth feeder circuit 49. Accordingly, in the second discharging period T8, the second first measurement potential Vs2 of +1.25 V continues to be supplied as the third potential V3 to the common electrode 21, but since supply of the potential to the detection electrode 30 is stopped, the liquid crystal layer 5 discharges charge accumulated in the second charging period T7. As a result, as illustrated in FIG. 5, in the second discharging period T8, the detection electrode potential Vd1 gradually changes from the first potential V1 to the third potential V3 applied to the common electrode 21 and reaches the potential Vd2 at time t9.

The central control circuit 45, for example, measures the detection electrode potential Vd2 at time t9 when the second discharging period T8 ends. Specifically, the detection electrode potential Vd2 is amplified by the amplification circuit 43, and the output of the amplification circuit 43 is input to the A/D converter 44. The central control circuit 45 acquires a digital value output from the A/D converter 44 at time t9 as the measured value of the detection electrode potential Vd2. The central control circuit 45 stores the measured value of the detection electrode potential Vd2 obtained at time t9 in the measured value storage circuit 46.

Effects of Second Embodiment

In the liquid crystal apparatus 2000 of the second embodiment, the measurement circuit 300 includes the first node N1 electrically coupled to the detection electrode 30, the common electrode line L1 electrically coupled to the common electrode 21, the first potential line L2 to which the first potential V1 is applied, the first capacitor C1 electrically coupled between the first node N1 and the first potential line L2, the second capacitor C2 electrically coupled between the common electrode line L1 and the first potential line L2, the first switch SW1, the second switch SW2, the third switch SW3, the fourth switch SW4, the first feeder circuit 40 that outputs the first measurement potential Vs1 corresponding to the first reference voltage Vf1, the fourth feeder circuit 49 that outputs the second measurement potential Vs2 corresponding to the second reference voltage Vf2, the central control circuit 45 that outputs the first reference voltage Vs1 to the first feeder circuit 40, outputs the second reference voltage Vs2 to the fourth feeder circuit 49, and controls the first to fourth switches SW1 to SW4, and the potential measurement circuit (the amplification circuit 43 and the A/D converter 44) that measures the potential of the first node N1 as the potential of the detection electrode 30.

The first node N1 is electrically coupled to the first potential line L2 via the first switch SW1. The first node N1 is electrically coupled to the output terminal of the first feeder circuit 40 via the second switch SW2. The common electrode line L1 is electrically coupled to the first potential line L2 via the third switch SW3. The common electrode line L1 is electrically coupled to the output terminal of the fourth feeder circuit 49 via the fourth switch SW4.

It is possible to realize the functions necessary for the measurement circuit 300 with a simple circuit configuration, and to reduce a noise component included in the measured value of the potential of the detection electrode 30 by using the measurement circuit 300 having the above configuration, as compared with the measurement circuit 200 of the first embodiment.

In the liquid crystal apparatus 2000 of the second embodiment, the first switch SW1 and the second switch SW2 are controlled so that the first switch SW1 and the second switch SW2 come to the ON state by the first voltage (5 V), and the third switch SW3 and the fourth switch SW4 are controlled so that the third switch SW3 and the fourth switch SW4 come to the ON state by the second voltage (15 V) higher than the first voltage. Thus, since the third switch SW3 and the fourth switch SW4 electrically coupled to the common electrode line L1 are controlled by the relatively high second voltage so that the third switch SW3 and the fourth switch SW4 come to the ON state, it is possible to reduce on-resistances of each of these switches, and thus to improve the responsiveness of the common electrode line L1.

As a result, since the first charging period T3 and the second charging period T7 can be shortened, the action of the mobile ions having high mobility can be captured as a change in the measured value, and the influence of variations in characteristics of each switch component on the measured value can be inhibited. Further, since the improvement of the responsiveness of the common electrode line L1 means the improvement of the responsiveness of the common electrode 21, it is possible to curb the deterioration of display performance at the time of normal driving.

3. Overview of Electronic Device

Figure 18:
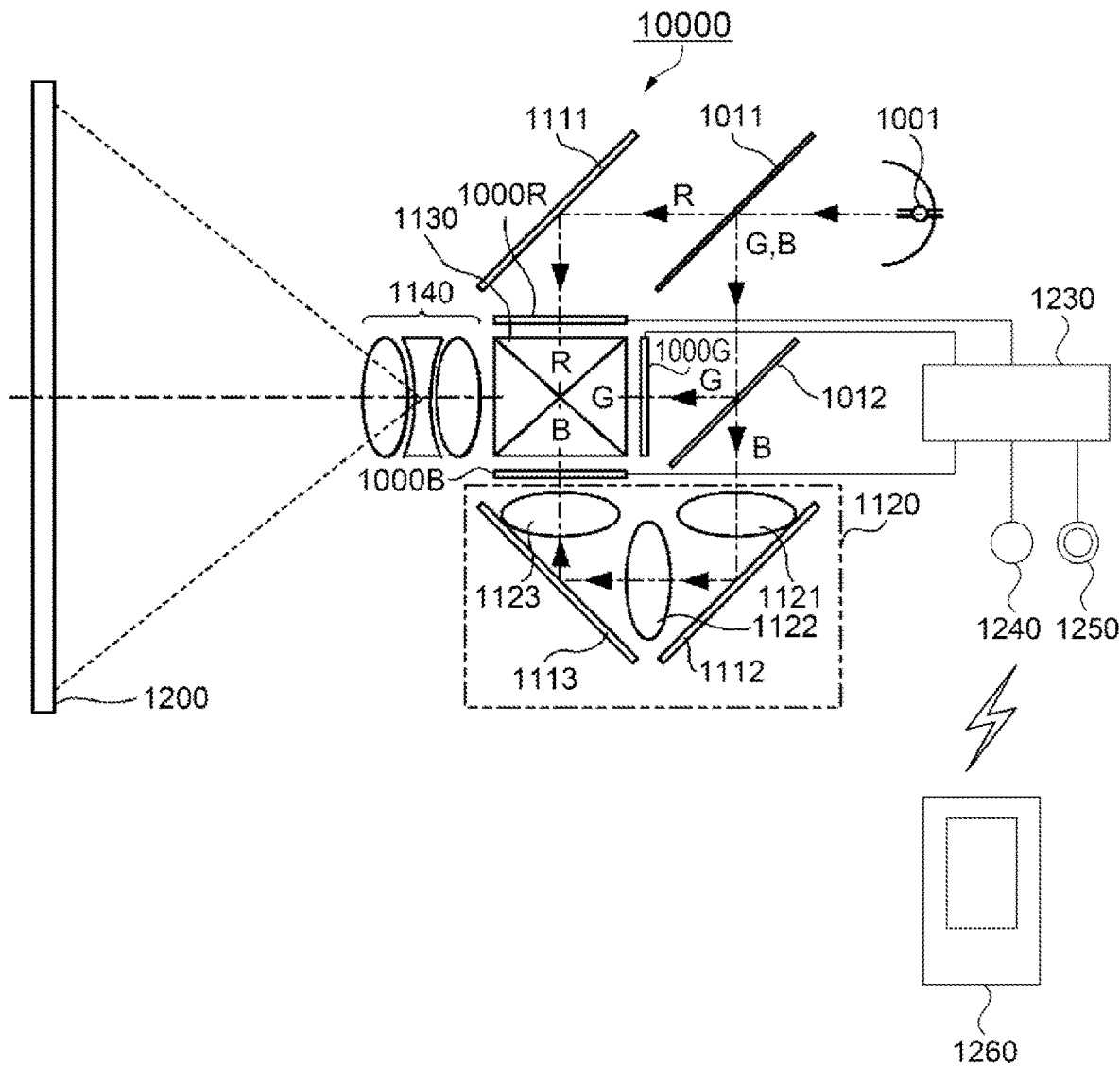
FIG. 18 is an illustrative diagram illustrating a schematic configuration of a projection-type display apparatus as an electronic device.

FIG. 18 is a schematic configuration diagram illustrating a configuration of a projection-type display apparatus serving as an electronic device according to the present embodiment. The projection-type display apparatus 10000 will be described below as an example of an electronic device including the liquid crystal apparatus 1000 of the first embodiment.

The projection-type display apparatus 10000 is a three-panel type projection-type display apparatus and includes a lamp unit 1001 serving as a light source, dichroic mirrors 1011 and 1012 serving as color separation optical systems, a liquid crystal apparatus 1000B corresponding to blue light B, a liquid crystal apparatus 1000G corresponding to green light G, a liquid crystal apparatus 1000R corresponding to red light R, three reflection mirrors 1111, 1112, and 1113, three relay lenses 1121, 1122, and 1123, a dichroic prism 1130 serving as a color synthesis optical system, and a projection lens 1140 serving as a projection optical system. A video is projected onto a screen 1200 by the projection optical system. Further, the relay lenses 1121, 1122, and 1123 and the reflection mirrors 1112 and 1113 form a relay lens system 1120.

In addition, the projection display device 10000 includes a panel control circuit 1230 that receives measurement data about the state of deterioration of the liquid crystal layer 5 transmitted from the liquid crystal devices 1000B, 1000G, and 1000R and performs predetermined control based on the received measurement data.

When the panel control circuit 1230 receives the data about the state of deterioration of each liquid crystal layer 5 from the liquid crystal devices 1000B, 1000G, and 1000R, it creates and displays display information regarding the state of deterioration of the liquid crystal layer 5 for each of the liquid crystal devices 1000B, 1000G, and 1000R.

Also, the panel control circuit 1230 can notify that the liquid crystal panel 100 is nearing the end of its life by lighting a pilot lamp 1240 based on the measurement data of the state of deterioration of the liquid crystal layer 5. For example, when the liquid crystal panel 100 of the liquid crystal apparatus 1000B corresponding to blue is reaching the end of the life, a blue pilot lamp 1240 is turned on. Further, the panel control circuit 1230 may report the deterioration state of the liquid crystal layer 5 of the liquid crystal panel 100 by voice using a speaker 1250. Further, the panel control circuit 1230 may report the deterioration state of the liquid crystal layer 5 of the liquid crystal panel 100 on a remote controller 1260 or a screen of a mobile terminal (not illustrated). A means for reporting the deterioration state of the liquid crystal layer 5 of the liquid crystal panel 100 may be provided, in addition to the display on the liquid crystal apparatuses 1000B, 1000G, and 1000R as described above.

Also, when the panel control circuit 1230 detects from the received measurement data that the liquid crystal panel 100 is nearing the end of its life, it changes control values for controlling the liquid crystal devices 1000B, 1000G, and 1000R in order to delay deterioration of the liquid crystal layer 5. For example, it is possible to extend a period of time in which the liquid crystal panel 100 is available, by correcting the control values and, for example, lowering brightness of the lamp unit 1001 that irradiates the liquid crystal apparatuses 1000B, 1000G, and 1000R or changing gradation voltages of the liquid crystal apparatuses 1000B, 1000G, and 1000R to voltage values according to a decrease in brightness of the lamp unit 1001.

4. Overview of Display Screen Example for Measurement Results

Figure 19:
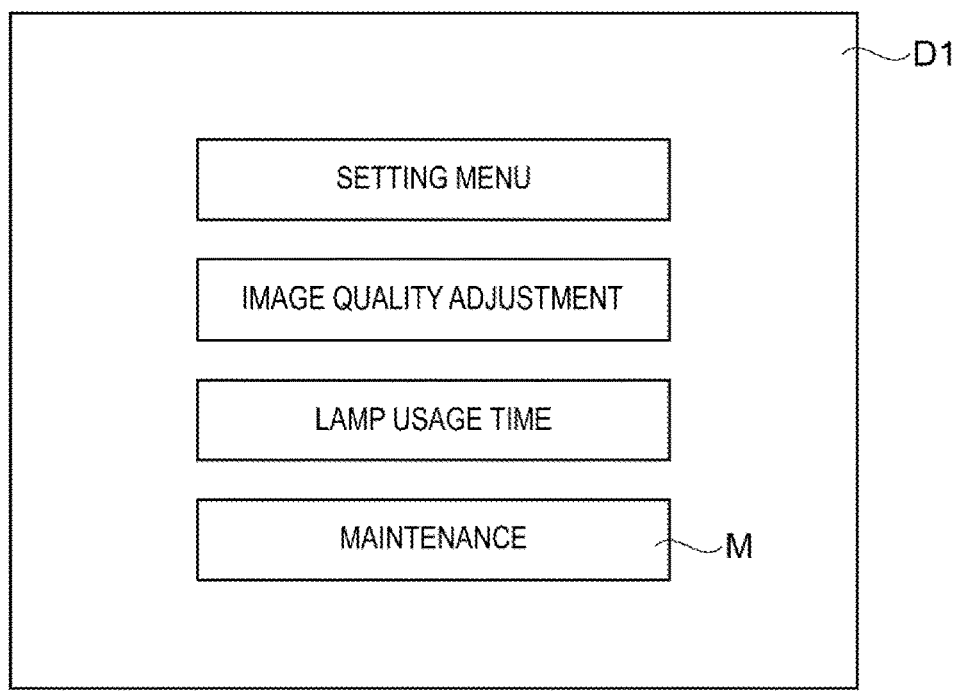
FIG. 19 is an illustrative diagram illustrating an example of a setting menu screen of the projection-type display apparatus.
Figure 20:
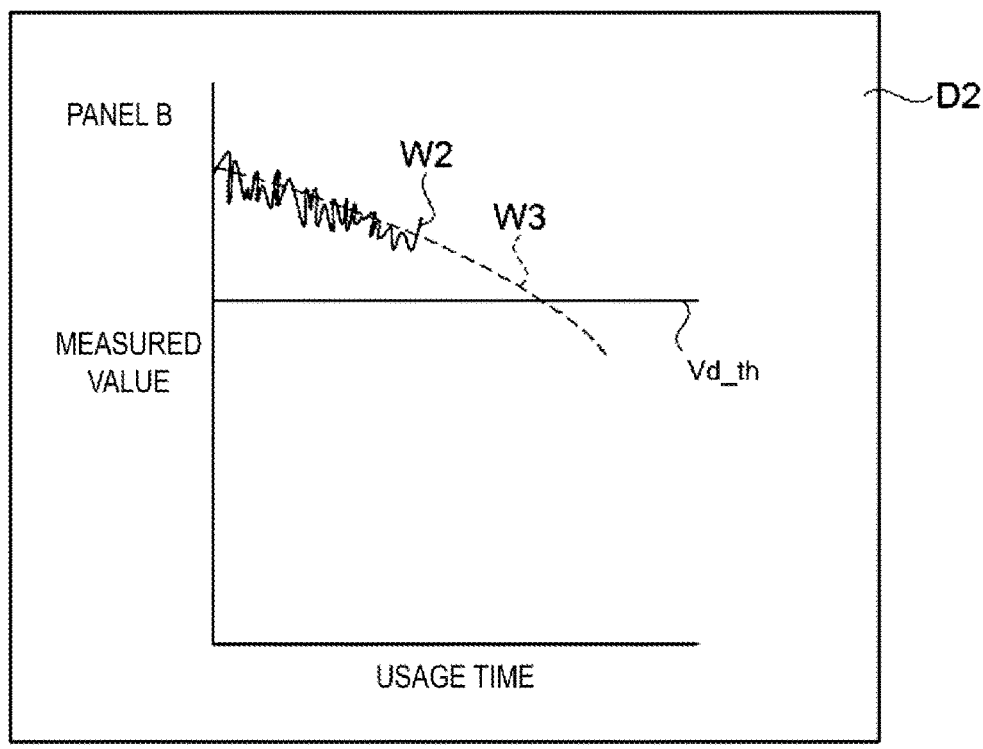
FIG. 20 is an illustrative diagram illustrating an example of a display screen for displaying a deterioration situation of the liquid crystal layer.

FIG. 19 is an illustrative diagram showing an example of a setting menu screen of the projection-type display apparatus 10000, and FIG. 20 is an illustrative diagram showing an example of a display screen for displaying the deterioration situation of the liquid crystal layer 5.

In FIG. 19, when maintenance M is selected from a setting menu screen D1 projected onto and displayed on the screen 1200, the maintenance menu is displayed, and when a display of a state of the liquid crystal panel 100 is selected therefrom, the panel control circuit 1230 transmits a transmission request for the measurement data for the deterioration situation of the liquid crystal layer 5 to the liquid crystal apparatuses 1000B, 1000G, and 1000R, and displays a display screen D2 as illustrated in FIG. 20 based on the received measurement data for the deterioration situation of the liquid crystal layer 5 of the liquid crystal apparatuses 1000B, 1000G, and 1000R.

The display screen D2 of FIG. 20 is a screen showing the deterioration situation of the liquid crystal layer 5 of the liquid crystal apparatus 1000B. Also, the screens indicating the state of deterioration of the liquid crystal layers 5 of the liquid crystal devices 1000G and 1000R may be individually displayed by screen switching.

On the display screen D2, a transition line W2 indicating a history of the measured value from the start of usage of the liquid crystal apparatus 1000B to the present, an expected transition line W3 under standard usage conditions, and a line of the threshold Vd_th indicating that the liquid crystal panel 100 is reaching the end of its like are displayed. Further, information on the liquid crystal apparatuses 1000G and 1000R may also be displayed together on the display screen D2. Since it is possible to determine whether or not the usage condition is severer than expected by comparing the transition line W2 with the expected transition line W3, it is possible to perform preventive maintenance such as limiting the brightness of the lamp unit 1001 that irradiates the liquid crystal apparatuses 1000B, 1000G, and 1000R. When the transition line W2 is improved to the expected transition line W3, limitation on the brightness of the lamp unit 1001 may be released.

For the transition line W2 indicating the history of the measured value, a smooth line obtained by averaging a plurality of measured values may be displayed in order to make it easier to discriminate a change trend of the transition line W2. Further, the measured value may be simply displayed as a numerical value, in addition to displaying the transition line W2 indicating the history of the measured value. In this case, a display color of the measured value may be changed through collation with the threshold Vd_th. For example, the measurement may be displayed in green in a state in which the value is greater than the threshold Vd_th, displayed in yellow in a state in which the value approaches the threshold Vd_th, and displayed in red in a state in which the value is equal to or smaller than the threshold Vd_th.

Further, the measured value may be displayed as an index value normalized by an arbitrary value. In this case, for example, when the index value is calculated from the measured value obtained in the first discharging period T4, an index value displayed shortly after the start of usage is, for example, a value close to "1". This value decreases as the deterioration of the liquid crystal layer 5 progresses. Typically, the value tends to decrease as the usage time of the projection-type display apparatus 10000 increases.

Alternatively, when it is expressed in percentage, the value is close to "100", for example. This value decreases as the liquid crystal layer 5 deteriorates. Typically, the value tends to decrease as the usage time of the projection-type display apparatus 10000 increases. Alternatively, when the index value is calculated from the measured value obtained in the second discharging period T8, the index value displayed shortly after the start of usage is, for example, a value close to "0". This value increases with the deterioration of the liquid crystal layer 5. Typically, the value tends to increase as the usage time of the projection-type display apparatus 10000 increases. Using such an index value, the state of deterioration of the liquid crystal panel 100 may be displayed using, for example, a bar graph or a pie graph.

When power of the projection display device 10000 is turned on, when the power is turned off, and when measurement of the state of deterioration of the liquid crystal layer 5 is instructed from the maintenance menu, the panel control circuit 1230 transmits a measurement instruction command for the state of deterioration of the liquid crystal layer 5 to the liquid crystal devices 1000B, 1000G, and 1000R. As described in step S10 of the flowchart of FIG. 4, when the liquid crystal devices 1000B, 1000G, and 1000R receive the measurement instruction command of the state of deterioration of the liquid crystal layer 5 from the panel control circuit 1230, the measurement is started.

In general, the preventive maintenance means performing planned maintenance in order to operate the device stably. For a determination of a guideline for replacement of components and the like in this case, there are a division method based on usage time of the components, and a method of evaluating a degree of progress of deterioration of the component. When the liquid crystal panel 100 according to the present disclosure is used, it is possible to obtain, as the measured value, an increase state of mobile ions serving as a deterioration index of the liquid crystal layer 5 of the liquid crystal panel 100. Since the change in the measured value can be observed with high sensitivity before display abnormality of the liquid crystal panel 100 appears, the preventive maintenance can be performed. Further, it is also possible to perform predictive maintenance by detecting a behavior of the measured value in which it is easy for stains, unevenness, or the like to occur through analysis using machine learning in comparison with a tendency of transition of the measured value in many individuals.

Although the embodiments of the present disclosure have been described above, the technical scope of the present disclosure is not limited to the above embodiments, and various modifications can be made without departing from the gist of the present disclosure.

In the first embodiment, the liquid crystal apparatus 1000 including the liquid crystal panel 100 and the measurement circuit 200 provided outside the liquid crystal panel 100 has been exemplified, but a configuration in which the measurement circuit 200 is provided inside the liquid crystal panel 100 may be adopted. That is, the measurement circuit 200 may be disposed on the element substrate 10 together with the data line driving circuit 23, the scanning line driving circuit 24, and the like. The same applies to the second embodiment.

In the present embodiment, the projection-type display apparatus 10000 has been exemplified as an electronic device, but the electronic device to which the liquid crystal apparatus 1000 is applied is not limited thereto. For example, the present disclosure may be applied to an electronic device such as a 3D printer that cures a resin liquid using light emitted from the liquid crystal panel 100, a head-up display (HUD), a head mounted display (HMD), a personal computer, a digital camera, or a liquid crystal television. For example, some 3D printers using the liquid crystal panel 100 use UV light, and the deterioration of the liquid crystal panel 100 is a problem. When modeling is started without notice of the fact that the liquid crystal panel 100 is reaching the end of the life, poor curing of the resin liquid or the like may occur during the modeling and may not be noticed until the modeling ends. Here, when the liquid crystal panel 100 according to the present disclosure is used, a deterioration state of the liquid crystal panel 100 can be known. Accordingly, it is possible to replace the liquid crystal panel 100 at an appropriate time as the preventive maintenance by anticipating in advance that poor curing of the resin liquid or the like will occur before the modeling is started.

In the above embodiment, a transmissive liquid crystal apparatus has been exemplified as the liquid crystal apparatus 1000, but a reflective liquid crystal apparatus or a liquid crystal on silicon (LCOS) liquid crystal apparatus may be used as the liquid crystal apparatus 1000.

Conclusion of Present Disclosure

A conclusion of the present disclosure will be appended below.

Appendix 1

A liquid crystal apparatus including: a first electrode, a liquid crystal layer, a second electrode facing the first electrode via the liquid crystal layer, and a measurement circuit configured to supply a potential to each of the first electrode and the second electrode and measure a potential of the first electrode, wherein the measurement circuit supplies a first potential to the first electrode, and supplies a second potential higher than the first potential to the second electrode in a first period, supplies the first potential to the first electrode and supplies a third potential higher than the first potential and lower than the second potential to the second electrode in a second period after the first period, supplies a fourth potential higher than the third potential and lower than the second potential to the first electrode and supplies the third potential to the second electrode in a third period after the second period, and stops supply of the potential to the first electrode and supplies the third potential to the second electrode in a fourth period after the third period.

In the liquid crystal apparatus described in appendix 1, the first period is inserted before the third period and the fourth period. Thus, in the first period, the mobile ions contained in the liquid crystal layer can be effectively initially disposed in one of the first electrode and the second electrode. It is possible to obtain measurement reproducibility for the measured value of the potential of the first electrode obtained in the fourth period by adjusting the initial disposition of the mobile ions before the third period starts in this manner. Further, since the influence of the internal electric field due to the mobile ions is also reflected in the measured value, it is easy for an increase in the mobile ions to appear as the change in the measured value. As a result, the progress of the deterioration of the liquid crystal layer can be tracked with high sensitivity from the initial stage of the usage of the liquid crystal panel including the first electrode, the second electrode, and the liquid crystal layer.

In the liquid crystal apparatus described in appendix 1, it is possible to perform transition from the first period to the third period without moving the mobile ions initially disposed in the first period by inserting the second period between the first period and the third period.

Accordingly, according to the liquid crystal apparatus described in appendix 1, it is possible to track the progress of the deterioration of the liquid crystal layer with higher sensitivity from the initial stage of the usage of the liquid crystal panel with higher measurement reproducibility.

In the liquid crystal apparatus described in appendix 1, the potential supplied to the second electrode is fixed to the third potential in the second period, the third period, and the fourth period. In the charging operation in the third period, since there is only a slight potential variation received from the first electrode, time until the potential of the second electrode is recovered to a predetermined potential is shortened. Therefore, the time until the completion of charging is shortened, the time from the start of charging to the start of discharging is shortened, and for example, it is easier for the action of mobile ions having high mobility to be observed. In other words, for example, when the charging time is about 5 ms, the high-mobility ions are likely to be removed, whereas according to the liquid crystal apparatus described in appendix 1, the charging time can be shortened to 1 ms or less, for example, to about 200 µs.

Appendix 2

The liquid crystal device according to appendix 1, further comprising a pixel electrode provided in a display region, wherein the first electrode is provided outside the display region.

According to the liquid crystal apparatus described in appendix2, since the first electrode is adjacent to the vicinity of the display region, it is easy for the mobile ions generated in the display region to be detected. Therefore, it is possible to improve the sensitivity to an increase in the mobile ions involved in the deterioration of the liquid crystal layer.

Appendix 3

The liquid crystal apparatus described in appendix 2, wherein the first period is longer than one frame period of the display region, and an absolute value of a potential difference between the first electrode and the second electrode in the first period is equal to or greater than a maximum applied voltage of the liquid crystal layer in the display region.

As in appendix 3, it is possible to effectively initially dispose, particularly, mobile ions having low mobility on one of the first electrode and the second electrode by setting the first period longer than one frame period of the display region.

Further, it is possible to effectively initially dispose mobile ions that move at about the maximum applied voltage on one of the first electrode and the second electrode by setting the absolute value of the potential difference in the first period, that is, the voltage applied to the liquid crystal layer in the first period to be equal to or higher than the maximum applied voltage of the liquid crystal layer in the display region.

Accordingly, according to the liquid crystal device described in appendix 3, it is possible to track the progress of deterioration of the liquid crystal layer with higher sensitivity from the beginning of usage of the liquid crystal panel with higher measurement reproducibility.

Appendix 4

The liquid crystal apparatus described in appendix 2 or 3, wherein an absolute value of a potential difference between the first electrode and the second electrode in the second period is greater than 0 V and smaller than a threshold voltage of the liquid crystal layer.

As in appendix 4, the absolute value of the potential difference in the second period, that is, the voltage applied to the liquid crystal layer in the second period is set to be greater than 0 V and smaller than the threshold voltage of the liquid crystal layer, thereby enhancing an effect of curbing the influence of the dielectric anisotropy of the liquid crystal layer.

Accordingly, according to the liquid crystal device described in Appendix 4, it is possible to track the progress of deterioration of the liquid crystal layer with higher sensitivity from the beginning of usage of the liquid crystal panel with higher measurement reproducibility.

Appendix 5

The liquid crystal apparatus described in any one of appendices 2 to 4, wherein the third period is shorter than one frame period of the display region, and an absolute value of a potential difference between the first electrode and the second electrode in the third period is greater than 0 V and smaller than the threshold voltage of the liquid crystal layer.

As in appendix 5, it is easy for the action of the mobile ions having high mobility to be captured as change in the measured value by setting the third period to be shorter than one frame period of the display region.

Further, it is possible to measure the potential of the first electrode in the fourth period while curbing the influence of the dielectric anisotropy of the liquid crystal layer by setting the absolute value of the potential difference in the third period, that is, the voltage applied to the liquid crystal layer in the third period to be greater than 0 V and smaller than the threshold voltage of the liquid crystal layer.

Accordingly, according to the liquid crystal device described in appendix 5, the progress of deterioration of the liquid crystal layer can be tracked with higher sensitivity from the initial stage of usage of the liquid crystal panel with higher measurement reproducibility.

Appendix 6

The liquid crystal apparatus described in any one of appendices 2 to 5, wherein the measurement circuit supplies the second potential to the first electrode and supplies the first potential to the second electrode in a fifth period after the fourth period, supplies the fourth potential to the first electrode and supplies the third potential to the second electrode in a sixth period after the fifth period, and supplies the first potential to the first electrode and supplies the third potential to the second electrode in a seventh period after the sixth period, and stops the supply of the potential to the first electrode and supplies the third potential to the second electrode in an eighth period after the seventh period.

In the liquid crystal apparatus described in appendix 6, the fifth period is inserted before the seventh period and the eighth period. Thus, in the fifth period, the mobile ions contained in the liquid crystal layer can be effectively initially disposed in one of the first electrode and the second electrode. It is possible to obtain measurement reproducibility for the measured value of the potential of the first electrode obtained in the eighth period by adjusting the initial disposition of the mobile ions before the seventh period starts in this manner. Further, since the influence of the internal electric field due to the mobile ions is also reflected in the measured value, it is easy for an increase in the mobile ions to appear as the change in the measured value. As a result, the progress of the deterioration of the liquid crystal layer can be tracked with high sensitivity from the initial stage of the usage of the liquid crystal panel including the first electrode, the second electrode, and the liquid crystal layer.

Further, according to the liquid crystal apparatus described in appendix 6, since the liquid crystal layer is AC-driven, it is possible to curb deterioration of the liquid crystal layer caused due to application of a DC voltage to the liquid crystal layer at the time of measurement of the potential of the first electrode.

In the liquid crystal apparatus described in appendix 6, it is possible to perform transition from the fifth period to the seventh period without moving the mobile ions initially disposed in the fifth period by inserting the sixth period between the fifth period and the seventh period.

Accordingly, according to the liquid crystal device described in appendix 6, it is possible to track the progress of deterioration of the liquid crystal layer with higher sensitivity from the beginning of usage of the liquid crystal panel with higher measurement reproducibility.

In the liquid crystal apparatus described in appendix 6, the potential supplied to the second electrode is fixed to the third potential in the sixth period, the seventh period, and the eighth period. In the charging operation in the seventh period, since there is only a slight potential variation received from the first electrode, time until the potential of the second electrode is recovered to a predetermined potential is shortened. Therefore, the time until the completion of charging is shortened, the time from the start of charging to the start of discharging is shortened, and for example, it is easier for the action of mobile ions having high mobility to be observed.

Appendix 7

The liquid crystal apparatus described in appendix 6, wherein the fifth period is longer than one frame period of the display region, and an absolute value of a potential difference between the first electrode and the second electrode in the fifth period is equal to or greater than a maximum applied voltage of the liquid crystal layer in the display region.

As in appendix 7, it is possible to effectively initially dispose, particularly, mobile ions having low mobility on one of the first electrode and the second electrode by setting the fifth period longer than one frame period of the display region.

Further, it is possible to effectively initially dispose mobile ions that move at about the maximum applied voltage on one of the first electrode and the second electrode by setting the absolute value of the potential difference in the fifth period, that is, the voltage applied to the liquid crystal layer in the fifth period to be equal to or higher than the maximum applied voltage of the liquid crystal layer in the display region.

Accordingly, according to the liquid crystal apparatus described in appendix 7, it is possible to track the progress of the deterioration of the liquid crystal layer with higher sensitivity from the initial stage of the usage of the liquid crystal panel with higher measurement reproducibility.

Appendix 8

The liquid crystal apparatus described in appendix 6 or 7, wherein an absolute value of a potential difference between the first electrode and the second electrode in the sixth period is greater than 0 V and smaller than the threshold voltage of the liquid crystal layer.

As in appendix 8, the absolute value of the potential difference in the sixth period, that is, the voltage applied to the liquid crystal layer in the sixth period is set to be greater than 0 V and smaller than the threshold voltage of the liquid crystal layer, thereby enhancing an effect of curbing the influence of the dielectric anisotropy of the liquid crystal layer.

Accordingly, according to the liquid crystal apparatus described in appendix 8, it is possible to track the progress of the deterioration of the liquid crystal layer with higher sensitivity from the initial stage of the usage of the liquid crystal panel with higher measurement reproducibility.

Appendix 9

The liquid crystal apparatus described in any one of appendices 6 to 8, wherein the seventh period is shorter than one frame period of the display region, and an absolute value of a potential difference between the first electrode and the second electrode in the seventh period is greater than 0 V and smaller than the threshold voltage of the liquid crystal layer.

As in appendix 9, it is easy for the action of the mobile ions having high mobility to be captured as change in the measured value by setting the seventh period to be shorter than one frame period of the display region.

Further, it is possible to measure the potential of the first electrode in the eighth period while curbing the influence of the dielectric anisotropy of the liquid crystal layer by setting the absolute value of the potential difference in the seventh period, that is, the voltage applied to the liquid crystal layer in the seventh period to be greater than 0 V and smaller than the threshold voltage of the liquid crystal layer.

Accordingly, according to the liquid crystal apparatus described in appendix 9, it is possible to track the progress of the deterioration of the liquid crystal layer with higher sensitivity from the initial stage of the usage of the liquid crystal panel with higher measurement reproducibility.

Appendix 10

A liquid crystal apparatus including: a first electrode, a liquid crystal layer, a second electrode facing the first electrode via the liquid crystal layer, and a measurement circuit configured to supply a potential to each of the first electrode and the second electrode and measure a potential of the first electrode, wherein the measurement circuit supplies a first potential to the second electrode and supplies a second potential higher than the first potential to the first electrode in a first period, supplies a third potential higher than the first potential and lower than the second potential to the second electrode and supplies a fourth potential higher than the third potential and lower than the second potential to the first electrode in a second period after the first period, supplies the first potential to the first electrode and supplies the third potential to the second electrode in a third period after the second period, and stops supply of the potential to the first electrode and supplies the third potential to the second electrode in a fourth period after the third period.

In the liquid crystal apparatus described in appendix 10, it is possible to perform transition from the first period to the third period without moving the mobile ions initially disposed in the first period by inserting the second period between the first period and the third period.

Accordingly, according to the liquid crystal device described in appendix 10, it is possible to track the progress of deterioration of the liquid crystal layer with higher sensitivity from the beginning of usage of the liquid crystal panel with higher measurement reproducibility.

In the liquid crystal apparatus described in appendix 10, the potential supplied to the second electrode is fixed to the third potential in the second period, the third period, and the fourth period. In the charging operation in the third period, since there is only a slight potential variation received from the first electrode, time until the potential of the second electrode is recovered to a predetermined potential is shortened. Therefore, the time until the completion of charging is shortened, the time from the start of charging to the start of discharging is shortened, and for example, it is easier for the action of mobile ions having high mobility to be observed. In other words, for example, when the charging time is about 5 ms, the high-mobility ions are likely to be removed, whereas according to the liquid crystal apparatus described in appendix 10, the charging time can be shortened to 1 ms or less, for example, to about 200 µs.

Appendix 11

The liquid crystal apparatus described in any one of appendices 1 to 10, wherein the measurement circuit includes a first node electrically coupled to the first electrode, a second electrode line electrically coupled to the second electrode, a first potential line to which the first potential is applied, a first capacitor electrically coupled between the first node and the first potential line, a second capacitor electrically coupled between the second electrode line and the first potential line, a first switch, a second switch, a third switch, a fourth switch, a fifth switch, a first feeder circuit configured to output a first measurement potential corresponding to a first reference voltage, a second feeder circuit configured to output the second potential, a third feeder circuit configured to output the third potential, a control circuit configured to output the first reference voltage to the first feeder circuit and control the first to fifth switches, and a potential measurement circuit configured to measure the potential of the first node as the potential of the first electrode, wherein the first node is electrically coupled to the first potential line via the first switch, the first node is electrically coupled to an output terminal of the first feeder circuit via the second switch, the second electrode line is electrically coupled to the first potential line via the third switch, the second electrode line is electrically coupled to an output terminal of the third feeder circuit via the fourth switch, and the second electrode line is electrically coupled to an output terminal of the second feeder circuit via the fifth switch.

It is possible to realize functions required for the measurement circuit with a simple circuit configuration and to reduce a noise component included in the measured value of the potential of the detection electrode by using the measurement circuit having the above configuration described in appendix 11.

Appendix 12

The liquid crystal apparatus described in appendix 11, wherein the first switch and the second switch are controlled by a first voltage, and the third switch, the fourth switch, and the fifth switch are controlled by a second voltage higher than the first voltage.

As in appendix 12, since the third to fifth switches electrically coupled to the second electrode line are controlled by the relatively high second voltage, it is possible to reduce on-resistances of the third to fifth switches, and thus it is to improve the responsiveness of the second electrode line and to curb a leakage current from the first electrode.

As a result, since the third period and the seventh period can be shortened, it is possible to capture the action of the mobile ions having high mobility as change in the measured value, and to curb an influence of variation in characteristics of each switch component on the measured value.

Appendix 13

The liquid crystal apparatus described in any one of appendices 1 to 10, wherein the measurement circuit includes a first node electrically coupled to the first electrode, a second electrode line electrically coupled to the second electrode, a first potential line to which the first potential is applied, a first capacitor electrically coupled between the first node and the first potential line, a second capacitor electrically coupled between the second electrode line and the first potential line, a first switch, a second switch, a third switch, a fourth switch, a first feeder circuit configured to output a first measurement potential corresponding to the first reference voltage, a fourth feeder circuit configured to output a second measurement potential corresponding to the second reference voltage, a control circuit configured to output the first reference voltage to the first feeder circuit, output the second reference voltage to the fourth feeder circuit, and control the first to fourth switches, and a potential measurement circuit configured to measure a potential of the first node as the potential of the first electrode, wherein the first node is electrically coupled to the first potential line via the first switch, the first node is electrically coupled to an output terminal of the first feeder circuit via the second switch, the second electrode line is electrically coupled to the first potential line via the third switch, and the second electrode wire is electrically coupled to an output terminal of the fourth feeder circuit via the fourth switch.

It is possible to realize functions required for the measurement circuit with a simple circuit configuration and to reduce a noise component included in the measured value of the potential of the detection electrode, as compared with the measurement circuit described in appendix 10, by using the measurement circuit having the above configuration described in appendix 13.

Appendix 14

The liquid crystal apparatus described in appendix 13, wherein the first switch and the second switch are controlled by a first voltage, and the third switch and the fourth switch are controlled by a second voltage higher than the first voltage.

As in appendix 14, since the third switch and the fourth switch electrically coupled to the second electrode line are controlled so that the third switch and the fourth switch come to the ON state by the relatively high second voltage, an ON resistance of the third switch and the fourth switch can be reduced, and thus, the responsiveness of the second electrode line can be improved, and the leakage current from the first electrode can be curbed.

As a result, since the third period and the seventh period can be shortened, it is possible to capture the action of the mobile ions having high mobility as change in the measured value, and to curb an influence of variation in characteristics of each switch component on the measured value.

Appendix 15

An electronic device including the liquid crystal apparatus according to any one of appendices 1 to 14.

What is claimed is:

1. A liquid crystal apparatus comprising:
a first electrode;
a liquid crystal layer;
a second electrode facing the first electrode via the liquid crystal layer; and
a measurement circuit configured to supply a potential to each of the first electrode and the second electrode and measure a potential of the first electrode, wherein
the measurement circuit
supplies a first potential to the first electrode, and supplies a second potential higher than the first potential to the second electrode in a first period,
supplies the first potential to the first electrode and supplies a third potential higher than the first potential and lower than the second potential to the second electrode in a second period after the first period,
supplies a fourth potential higher than the third potential and lower than the second potential to the first electrode and supplies the third potential to the second electrode in a third period after the second period, and
stops supply of the potential to the first electrode and supplies the third potential to the second electrode in a fourth period after the third period.

2. The liquid crystal device according to claim 1 further comprising a pixel electrode provided in a display region, wherein
the first electrode is provided outside the display region.

3. The liquid crystal apparatus according to claim 2, wherein
the first period is longer than one frame period of the display region, and
an absolute value of a potential difference between the first electrode and the second electrode in the first period is equal to or greater than a maximum applied voltage of the liquid crystal layer in the display region.

4. The liquid crystal apparatus according to claim 2, wherein
an absolute value of a potential difference between the first electrode and the second electrode in the second period is greater than 0 V and smaller than a threshold voltage of the liquid crystal layer.

5. The liquid crystal apparatus according to claim 2, wherein
the third period is shorter than one frame period of the display region, and
an absolute value of a potential difference between the first electrode and the second electrode in the third period is greater than 0 V and smaller than a threshold voltage of the liquid crystal layer.

6. The liquid crystal apparatus according to claim 2, wherein
the measurement circuit
supplies the second potential to the first electrode and supplies the first potential to the second electrode in a fifth period after the fourth period,
supplies the fourth potential to the first electrode and supplies the third potential to the second electrode in a sixth period after the fifth period, and
supplies the first potential to the first electrode and supplies the third potential to the second electrode in a seventh period after the sixth period, and
stops the supply of the potential to the first electrode and supplies the third potential to the second electrode in an eighth period after the seventh period.

7. The liquid crystal apparatus according to claim 6, wherein
the fifth period is longer than one frame period of the display region, and
an absolute value of a potential difference between the first electrode and the second electrode in the fifth period is equal to or greater than a maximum applied voltage of the liquid crystal layer in the display region.

8. The liquid crystal apparatus according to claim 6, wherein
an absolute value of a potential difference between the first electrode and the second electrode in the sixth period is greater than 0 V and smaller than the threshold voltage of the liquid crystal layer.

9. The liquid crystal apparatus according to claim 6, wherein
the seventh period is shorter than one frame period of the display region, and
an absolute value of a potential difference between the first electrode and the second electrode in the seventh period is greater than 0 V and smaller than the threshold voltage of the liquid crystal layer.

10. The liquid crystal apparatus according to claim 1, wherein
the measurement circuit includes
a first node electrically coupled to the first electrode;
a second electrode line electrically coupled to the second electrode;
a first potential line to which the first potential is applied;
a first capacitor electrically coupled between the first node and the first potential line;
a second capacitor electrically coupled between the second electrode line and the first potential line;
a first switch;
a second switch;
a third switch;
a fourth switch;
a fifth switch;
a first feeder circuit configured to output a first measurement potential corresponding to a first reference voltage;
a second feeder circuit configured to output the second potential;
a third feeder circuit configured to output the third potential;
a control circuit configured to output the first reference voltage to the first feeder circuit and control the first to fifth switches; and
a potential measurement circuit configured to measure a potential of the first node as the potential of the first electrode, wherein
the first node is electrically coupled to the first potential line via the first switch,
the first node is electrically coupled to an output terminal of the first feeder circuit via the second switch,
the second electrode line is electrically coupled to the first potential line via the third switch, the second electrode line is electrically coupled to an output terminal of the third feeder circuit via the fourth switch, and the second electrode line is electrically coupled to an output terminal of the second feeder circuit via the fifth switch.

11. The liquid crystal apparatus according to claim 10, wherein the first switch and the second switch are controlled by a first voltage, and the third switch, the fourth switch, and the fifth switch are controlled by a second voltage higher than the first voltage.

12. The liquid crystal apparatus according to claim 1, wherein the measurement circuit includes a first node electrically coupled to the first electrode;

a second electrode line electrically coupled to the second electrode;

a first potential line to which the first potential is applied;

a first capacitor electrically coupled between the first node and the first potential line;

a second capacitor electrically coupled between the second electrode line and the first potential line;

a first switch;

a second switch;

a third switch;

a fourth switch;

a first feeder circuit configured to output a first measurement potential corresponding to a first reference voltage;

a fourth feeder circuit configured to output a second measurement potential corresponding to a second reference voltage;

a control circuit configured to output the first reference voltage to the first feeder circuit, output the second reference voltage to the fourth feeder circuit, and control the first to fourth switches; and a potential measurement circuit configured to measure a potential of the first node as the potential of the first electrode, wherein the first node is electrically coupled to the first potential line via the first switch, the first node is electrically coupled to an output terminal of the first feeder circuit via the second switch, the second electrode line is electrically coupled to the first potential line via the third switch, and the second electrode wire is electrically coupled to an output terminal of the fourth feeder circuit via the fourth switch.

13. The liquid crystal apparatus according to claim 12, wherein the first switch and the second switch are controlled by a first voltage, and the third switch and the fourth switch are controlled by a second voltage higher than the first voltage.

14. An electronic device comprising the liquid crystal apparatus according to claim 1.

15. A liquid crystal apparatus comprising:

a first electrode;

a liquid crystal layer;

a second electrode facing the first electrode via the liquid crystal layer; and a measurement circuit configured to supply a potential to each of the first electrode and the second electrode and measure a potential of the first electrode, wherein the measurement circuit supplies a first potential to the second electrode and supplies a second potential higher than the first potential to the first electrode in a first period, supplies a third potential higher than the first potential and lower than the second potential to the second electrode, and supplies a fourth potential higher than the third potential and lower than the second potential to the first electrode in a second period after the first period, supplies the first potential to the first electrode and supplies the third potential to the second electrode in a third period after the second period, and stops supply of the potential to the first electrode and supplies the third potential to the second electrode in a fourth period after the third period.

* * * * *